United States Patent
Persaud et al.

(10) Patent No.: US 12,496,303 B2
(45) Date of Patent: Dec. 16, 2025

(54) CONDITIONING AGENTS FOR USE IN ALLOGENEIC HEMATOPOIETIC STEM CELL TRANSPLANTATION

(71) Applicants: Stephen Persaud, St. Louis, MO (US); John DiPersio, St. Louis, MO (US)

(72) Inventors: Stephen Persaud, St. Louis, MO (US); John DiPersio, St. Louis, MO (US)

(73) Assignee: Washington University, St. Louis, MO (US)

( * ) Notice: Subject to any disclaimer, the term of this patent is extended or adjusted under 35 U.S.C. 154(b) by 22 days.

(21) Appl. No.: 17/504,656

(22) Filed: Oct. 19, 2021

(65) Prior Publication Data

US 2022/0118022 A1 Apr. 21, 2022

Related U.S. Application Data

(60) Provisional application No. 63/093,643, filed on Oct. 19, 2020.

(51) Int. Cl.
| | | |
|---|---|---|
| *A61K 39/00* | (2006.01) | |
| *A61K 31/519* | (2006.01) | |
| *A61K 35/28* | (2015.01) | |
| *A61K 47/68* | (2017.01) | |
| *A61P 37/06* | (2006.01) | |
| *C12N 5/0789* | (2010.01) | |
| *A61K 35/12* | (2015.01) | |

(52) U.S. Cl.
CPC ............ *A61K 31/519* (2013.01); *A61K 35/28* (2013.01); *A61K 39/001* (2013.01); *A61K 47/68035* (2023.08); *A61K 47/6849* (2017.08); *A61P 37/06* (2018.01); *C12N 5/0647* (2013.01); *A61K 2035/122* (2013.01); *A61K 2035/124* (2013.01)

(58) Field of Classification Search
None
See application file for complete search history.

(56) References Cited

U.S. PATENT DOCUMENTS

| 9,795,604 | B2 | 10/2017 | Byrd et al. | |
|---|---|---|---|---|
| 2018/0078558 | A1 | 3/2018 | Blazar et al. | |
| 2018/0236002 | A1 | 8/2018 | Liu et al. | |
| 2018/0311247 | A1 | 11/2018 | Di Paolo et al. | |
| 2018/0318306 | A1 | 11/2018 | Betts et al. | |
| 2019/0183930 | A1 | 6/2019 | Lamb et al. | |
| 2019/0192682 | A1 | 6/2019 | Nixon et al. | |
| 2021/0069199 | A1* | 3/2021 | Betts | A61K 31/5355 |
| 2021/0322421 | A1* | 10/2021 | Huang | A61P 31/14 |
| 2021/0379195 | A1* | 12/2021 | Palchaudhuri | A61K 35/28 |
| 2023/0390412 | A1* | 12/2023 | Gillard | A61K 47/6849 |

FOREIGN PATENT DOCUMENTS

| WO | WO 2016/090034 A2 | 6/2016 |
|---|---|---|
| WO | WO 2018/223101 A1 | 12/2018 |
| WO | WO 2019/106156 A1 | 6/2019 |

OTHER PUBLICATIONS

Pelot, M.R., et al. Biol. Blood Marrow Transplant.; 5(3):133-143 (Year: 1999).*
Afram et al. (2018) Reduced intensity conditioning increases risk of severe cGVHD: identification of risk factors for cGVHD in a multicenter setting. Med Oncol. vol. 35, No. 79, 8 pages.
Agarwal et al. (2019) Toxicity-Free Hematopoietic Stem Cell Engraftment Achieved with Anti-CD117 Monoclonal Antibody Conditioning. Biol. Blood Marrow Transplant. vol. 25, No. 3 Supplement, p. S92.
Almeida et al. (2016) Acute myeloid leukemia in the older adults. Leuk Res Rep. vol. 6, pp. 1-7.
Amend et al. (2016) Murine Hind Limb Long Bone Dissection and Bone Marrow Isolation. J Vis Exp. vol. 110, No. 53936, 4 pages.
Armand et al. (2007) Impact of cytogenetics on outcome of de novo and therapy-related AML and MDS after allogeneic transplantation. Biol Blood Marrow Transplant. vol. 13, No. 6, pp. 655-664.
Baron et al. (2005) HLA-matched unrelated donor hematopoietic cell transplantation after nonmyeloablative conditioning for patients with chronic myeloid leukemia. Biol Blood Marrow Transplant. vol. 11, No. 4, pp. 272-279.
Beilke et al. (2010) The requirement for NKG2D in NK cell-mediated rejection of parental bone marrow grafts is determined by MHC class I expressed by the graft recipient. Blood. vol. 116, No. 24, pp. 5208-5216.
Bottos et al. (2016) Decreased NK-cell tumour immunosurveillance consequent to JAK inhibition enhances metastasis in breast cancer models. Nat Commun. vol. 7, No. 12258, 12 pages.
Burt et al. (2019) Effect of Nonmyeloablative Hematopoietic Stem Cell Transplantation vs Continued Disease-Modifying Therapy on Disease Progression in Patients With Relapsing-Remitting Multiple Sclerosis: A Randomized Clinical Trial. JAMA. vol. 321, No. 2, pp. 165-174.
Byrd et al. (2002) Pretreatment cytogenetic abnormalities are predictive of induction success, cumulative incidence of relapse, and overall survival in adult patients with de novo acute myeloid leukemia: results from Cancer and Leukemia Group B (CALGB 8461). Blood. vol. 100, No. 13, pp. 4325-4336.
Castiello et al. (2020) Efficacy and safety of anti-CD45-saporin as conditioning agent for RAG deficiency. J Allergy Clin Immunol. vol. 147, No. 1, pp. 309-320.e6.

(Continued)

*Primary Examiner* — Michail A Belyavskyi

(57) ABSTRACT

Among the various aspects of the present disclosure is the provision of conditioning agents for use in allogeneic hematopoietic stem cell transplantation. An aspect of the present disclosure provides for a method of treating a subject or inhibiting alloreactivity in the host-versus-graft direction comprising administering a combination of conditioning agents comprising an anti-body-drug conjugate (ADC) and a JAK1/JAK2 inhibitor for use in allogeneic hematopoietic stem cell transplantation in an amount sufficient to permit engraftment of allogeneic bone marrow. In some embodiments, the ADC is selected from CD45-SAP, cKit-SAP, CD117-Amanitin, and CD45-PBD. In some embodiments, the JAK1/JAK2 inhibitor is selected from baricitinib and ruxolitinib. In some embodiments, the method further comprises administering a cancer therapeutic.

21 Claims, 46 Drawing Sheets

(56) References Cited

OTHER PUBLICATIONS

Champlin et al. (2000) T-cell depletion of bone marrow transplants for leukemia from donors other than HLA-identical siblings: advantage of T-cell antibodies with narrow specificities. Blood. vol. 95, No. 12, pp. 3996-4003.
Cheng et al. (2017) Murine Full-thickness Skin Transplantation. J Vis Exp. vol. 119, No. 55105, 5 pages.
Chhabra et al. (2016) Hematopoietic stem cell transplantation in immunocompetent hosts without radiation or chemotherapy. Sci Transl Med. vol. 8, No. 351, 351ra105, 11 pages.
Choi et al. (2014) Pharmacologic Blockade of JAK1JAK2 Reduces GvHD and Preserves the Graft-Versus-Leukemia Effect. PLoS One. vol. 9, No. 10, e109799, 6 pages.
Choi et al. (2018) Baricitinib-induced blockade of interferon gamma receptor and interleukin-6 receptor for the prevention and treatment of graft-versus-host disease. Leukemia. vol. 32, No. 11, pp. 2483-2494.
Clark et al. (2014) Discovery and development of Janus kinase (JAK) inhibitors for inflammatory diseases. J Med Chem. vol. 57, No. 12, pp. 5023-5038.
Cooke et al. (1996) An experimental model of idiopathic pneumonia syndrome after bone marrow transplantation: I. The roles of minor H antigens and endotoxin. Blood. vol. 88, No. 8, pp. 3230-3239.
Cooper et al. (2009) Cytokine-induced memory-like natural killer cells. Proc Natl Acad Sci U S A. vol. 106, No. 6, pp. 1915-1919.
Copsel et al. (2019) The Promise Of CD4+FoxP3+ Regulatory T-Cell Manipulation In Vivo: Applications For Allogeneic Hematopoietic Stem Cell Transplantation. Haematologica. vol. 104, No. 7, pp. 1309-1321.
Czechowicz et al. (2007) Efficient transplantation via antibody-based clearance of hematopoietic stem cell niches. Science. vol. 318, No. 5854, pp. 1296-1299.
Czechowicz et al. (2011) Purified hematopoietic stem cell transplantation: the next generation of blood and immune replacement. Hematol Oncol Clin North Am. vol. 25, No. 1, pp. 75-87.
Czechowicz et al. (2019) Selective hematopoietic stem cell ablation using CD117-antibody-drug-conjugates enables safe and effective transplantation with immunity preservation. Nat Commun. vol. 10, No. 617, 12 pages.
De Kouchkovsky et al. (2016) 'Acute myeloid leukemia: a comprehensive review and 2016 update'. Blood Cancer J. vol. 6, No. 7, e441, 10 pages.
Dickinson et al. (2017) Graft-versus-Leukemia Effect Following Hematopoietic Stem Cell Transplantation for Leukemia. Front Immunol. vol. 8, No. 496, 16 pages.
Edinger et al. (2003) CD4+CD25+regulatory T cells preserve graft-versus-tumor activity while inhibiting graft-versus-host disease after bone marrow transplantation. Nat Med. vol. 9, No. 9, pp. 1144-1150.
Fehniger et al. (2007) Acquisition of murine NK cell cytotoxicity requires the translation of a pre-existing pool of granzyme B and perforin mRNAs. Immunity. vol. 26, No. 6, pp. 798-811.
Festing et al. (2002) Guidelines for the design and statistical analysis of experiments using laboratory animals. ILAR J. Vol. 43, No. 4, pp. 244-258.
Furumoto et al. (2013) The arrival of JAK inhibitors: advancing the treatment of immune and hematologic disorders. BioDrugs. vol. 27, No. 5, pp. 431-438.
Gao et al. (2019) Nongenotoxic antibody-drug conjugate conditioning enables safe and effective platelet gene therapy of hemophilia A mice. Blood Adv. vol. 3, No. 18, pp. 2700-2711.
Gavegnano et al. (2019) Baricitinib reverses HIV-associated neurocognitive disorders in a SCID mouse model and reservoir seeding in vitro. J Neuroinflammation. vol. 16, No. 182, 12 pages.
George et al. (2019) Antibody Conditioning Enables MHC-Mismatched Hematopoietic Stem Cell Transplants and Organ Graft Tolerance. Cell Stem Cell. vol. 25, No. 2, pp. 185-192.e3.

Ghobrial et al. (1989) In vivo use of monoclonal antibodies against murine T cell antigens. Clin Immunol Immunopathol. vol. 52, No. 3, pp. 486-506.
Giralt et al. (1997) Engraftment of allogeneic hematopoietic progenitor cells with purine analog-containing chemotherapy: harnessing graft-versus-leukemia without myeloablative therapy. Blood. vol. 89, No. 12, pp. 4531-4536.
Gotthardt et al. (2019) JAK/STAT Cytokine Signaling at the Crossroad of NK Cell Development and Maturation. Front Immunol. vol. 10, No. 2590, 16 pages.
Gupta et al. (2019) HIV-1 remission following CCR5Delta32/Delta32 haematopoietic stem-cell transplantation. Nature. vol. 568, No. 7751, pp. 244-248.
Gyurkocza et al. (2014) Conditioning regimens for hematopoietic cell transplantation: one size does not fit all. Blood. vol. 124, No. 3, pp. 344-353.
Henden et al. (2015) Cytokines in Graft-versus-Host Disease. J Immunol. vol. 194, No. 10, pp. 4604-4612.
Horch et al. (2011) Regulatory T-cell immunotherapy for allogeneic hematopoietic stem-cell transplantation. Ther Adv Hematol. vol. 3, No. 1, pp. 29-44.
Im et al. (2020) Risk Factors for Graft-versus-Host Disease in Haploidentical Hematopoietic Cell Transplantation Using Post-Transplant Cyclophosphamide. Biol Blood Marrow Transplant. vol. 26, No. 8, pp. 1459-1468.
Kleppe et al. (2017) Jak1 Integrates Cytokine Sensing to Regulate Hematopoietic Stem Cell Function and Stress Hematopoiesis. Cell Stem Cell. vol. 21, No. 4, pp. 489-501e7.
Kwon et al. (2019) Anti-human CD117 antibody-mediated bone marrow niche clearance in nonhuman primates and humanized NSG mice. Blood. vol. 133, No. 19, pp. 2104-2108.
Levine et al. (2003) Lowered-intensity preparative regimen for allogeneic stem cell transplantation delays acute graft-versus-host disease but does not improve outcome for advanced hematologic malignancy. Biol Blood Marrow Transplant. vol. 9, pp. 189-197.
Li et al. (2019) Hematopoietic chimerism and donor-specific skin allograft tolerance after non-genotoxic CD117 antibody-drug-conjugate conditioning in MHC-mismatched allotransplantation. Nat Commun. vol. 10, No. 616, 7 pages.
Macdonald et al. (2017) Cytokine mediators of chronic graft-versus-host disease. J Clin Invest. vol. 127, No. 7, pp. 2452-2463.
Mielcarek et al. (2003) Graft-versus-host disease after nonmyeloablative versus conventional hematopoietic stem cell transplantation. Blood. vol. 102, pp. 756-762.
Morris et al. (2011) Alloreactivity is limited by the endogenous peptide repertoire. Proc Natl Acad Sci U S A. vol. 108, pp. 3695-3700.
Nakasone et al. (2015) Impact of conditioning intensity and TBI on acute GVHD after hematopoietic cell transplantation. Bone Marrow Transplant. vol. 50, No. 4, pp. 559-565.
National Institutes of Health Clinical Center. (2016) Study of Baricitinib, a JAK ½ Inhibitor, in Chronic Graft-Versus-Host Disease After Allogeneic Hematopoietic Stem Cell Transplantation. Obtained on Dec. 13, 2022 from https://clinicaltrials.gov/ct2/show/NCT02759731. 8 pages.
National Cancer Institute (2019) Cancer Stat Facts: Acute Myeloid Leukemia (AML). Accessed on Dec. 12, 2022 from https://web.archive.org/web/20190505190450/https://seer.cancer.gov/statfacts/html/amyl.html. 11 pages.
Neubauer et al. (1998) Jak2 deficiency defines an essential developmental checkpoint in definitive hematopoiesis. Cell. vol. 93, No. 3, pp. 397-409.
Ossenkoppele et al. (2015) How I treat the older patient with acute myeloid leukemia. Blood. vol. 125, No. 5, pp. 767-774.
Palchaudhuri et al. (2016) Non-genotoxic conditioning for hematopoietic stem cell transplantation using a hematopoietic-cell-specific internalizing immunotoxin. Nat Biotechnol. vol. 34, No. 7, pp. 738-745.
Pearse et al. (2019) A CD117-Amanitin Antibody Drug Conjugate (ADC) Effectively Depletes Human and Non-Human Primate Hematopoietic Stem and Progenitor Cells (HSPCs): targeted Non-Genotoxic Conditioning for Bone Marrow Transplant. Biol Blood Marrow Transplant. vol. 25, No. 3, pp. S29-S30.

(56) References Cited

OTHER PUBLICATIONS

Perkey et al. (2018) New Insights into Graft-Versus-Host Disease and Graft Rejection. Annu Rev Pathol. vol. 13, pp. 219-245.

Pilon et al. (2014) Administration of low doses of IL-2 combined to rapamycin promotes allogeneic skin graft survival in mice. Am J Transplant. vol. 14, No. 12, pp. 2874-2882.

Polito et al. (2013) Saporin-S6: a useful tool in cancer therapy. Toxins (Basel). vol. 5, No. 10, pp. 1698-1722.

Quah et al. (2007) Monitoring lymphocyte proliferation in vitro and in vivo with the intracellular fluorescent dye carboxyfluorescein diacetate succinimidyl ester. Nat Protoc. vol. 2, No. 9, pp. 2049-2056.

Ritchie et al. (2020) Venetoclax or Ruxolitinib Depletion of Recipient NK Cells, in Combination with Reduced Intensity Conditioning, Improves Donor Cell Engraftment without Gvhd in a Mouse Model of Allosct. Biol Blood Marrow Transplant. vol. 26, No. 3, p. S171.

Rodig et al. (1998) Disruption of the Jak1 gene demonstrates obligatory and nonredundant roles of the Jaks in cytokine-induced biologic responses. Cell. vol. 93, No. 3, pp. 373-383.

Schaue (2017) A Century of Radiation Therapy and Adaptive Immunity. Front Immunol. vol. 8, No. 431, 15 pages.

Schonberg et al. (2015) JAK Inhibition Impairs NK Cell Function in Myeloproliferative Neoplasms. Cancer Res. vol. 75, No. 11, pp. 2187-2199.

Schroeder et al. (2011) Mouse models of graft-versus-host disease: advances and limitations. Dis Model Mech. vol. 4, No. 3, pp. 318-333.

Schwartz (2003) T cell anergy. Annu Rev Immunol. vol. 21, pp. 305-334.

Scott et al. (2017) Myeloablative Versus Reduced-Intensity Hematopoietic Cell Transplantation for Acute Myeloid Leukemia and Myelodysplastic Syndromes. J Clin Oncol. vol. 35, No. 11, pp. 1154-1161.

Slatter et al. (2018) Hematopoietic cell transplantation in primary immunodeficiency—conventional and emerging indications. Expert Rev Clin Immunol. vol. 14, No. 2, pp. 103-114.

Srikanthan et al. (2020) Effective Multi-lineage Engraftment in a Mouse Model of Fanconi Anemia Using Non-genotoxic Antibody-Based Conditioning. Mol Ther Methods Clin Dev. vol. 17, pp. 455-464.

Sykes (2014) Transplantation: moving to the next level. Immunol Rev. vol. 258, No. 1, pp. 5-11.

Tisdale et al. (2019) A Single Dose of CD117 Antibody Drug Conjugate Enables Autologous Gene-Modified Hematopoietic Stem Cell Transplant (Gene Therapy) in Nonhuman Primates. Blood. vol. 134, No. 610, 7 pages.

Toubai et al. (2016) Danger Signals and Graft-versus-host Disease: Current Understanding and Future Perspectives. Front Immunol. vol. 7, No. 539, 15 pages.

Weisdorf (2017) Reduced-intensity versus myeloablative allogeneic transplantation. Hematol Oncol Stem Cell Ther. vol. 10, No. 4, pp. 321-326.

Yada S. et al. (2005) The role of p53 and Fas in a model of acute murine graft-versus-host disease. J Immunol. vol. 174, No. 3, pp. 1291-1297.

\* cited by examiner

CD45-SAP cKit-SAP

Months post transplant

Proliferation

Cell death

CONDITIONING AGENTS FOR USE IN ALLOGENEIC HEMATOPOIETIC STEM CELL TRANSPLANTATION

CROSS-REFERENCE TO RELATED APPLICATIONS

This application claims priority from U.S. Provisional Application Ser. No. 63/093,643 filed on Oct. 19, 2020, which is incorporated herein by reference in its entirety.

STATEMENT REGARDING FEDERALLY SPONSORED RESEARCH OR DEVELOPMENT

This invention was made with government support under CA210084 awarded by the National Institutes of Health. The government has certain rights in the invention.

MATERIAL INCORPORATED-BY-REFERENCE

Not applicable.

FIELD

The present disclosure generally relates to therapies for allogeneic hematopoietic stem cell transplantation (HSCT).

SUMMARY

Among the various aspects of the present disclosure is the provision of conditioning agents for use in allogeneic hematopoietic stem cell transplantation.

An aspect of the present disclosure provides for a method of inhibiting alloreactivity in a subject in need of an allogeneic hematopoietic stem cell transplant (allo-HSCT), comprising: administering a hematopoietic stem cell (HSC)-depleting antibody-drug conjugate (ADC) in an amount effective to deplete recipient-derived hematopoietic stem cells (HSCs) or to create space for transplanted donor HSCs; and/or administering an amount of a conditioning agent comprising a JAK inhibitor in an amount effective to permit engraftment of allogeneic bone marrow. Another aspect of the present disclosure provides for a method of conditioning a subject in need of an allogeneic hematopoietic stem cell transplant (allo-HSCT) or preventing graft versus host disease (GvHD) or graft rejection in a recipient, comprising: administering a hematopoietic stem cell (HSC)-depleting antibody-drug conjugate in an amount effective to deplete recipient-derived hematopoietic stem cells (HSCs) or to create space for transplanted donor HSCs; and/or administering a JAK inhibitor in an amount effective to suppress the immune system of the subject. In some embodiments, the method further comprises administering allogeneic hematopoietic stem cell transplant (allo-HSCT) to the subject. In some embodiments, the HSC-depleting ADC and JAK inhibitor is administered before allo-HSCT and/or the JAK inhibitor is continually infused for an amount of time before and after the allo-HSCT effective to permit donor chimerism of at least about 80%. In some embodiments, at least about 90% donor chimerism is achieved in the subject. In some embodiments, the HSC-depleting ADC targets CD45 or CD117, optionally the HSC-depleting ADC is selected from CD45-SAP, cKit-SAP, CD117-Amanitin, or CD45-PBD. In some embodiments, the HSC-depleting ADC is administered prior to the subject receiving an allogeneic hematopoietic stem cell transplant. In some embodiments, the HSC-depleting ADC is administered in a single dose prior to transplant. In some embodiments, the JAK inhibitor is a JAK1/JAK2 inhibitor, optionally, baricitinib, or ruxolitinib. In some embodiments, the JAK inhibitor is continuously infused for an amount of time sufficient to result in donor chimerism of at least about 80% (optionally over a course of 1 day to about 1 month, about 6 months, or about 1 year). In some embodiments, the JAK inhibitor is administered prior to, during, and/or after the subject receives an allogeneic hematopoietic stem cell transplant. In some embodiments, the JAK inhibitor is not injected as a bolus. In some embodiments, the JAK inhibitor is administered continuously after allo-HSCT for an amount of time sufficient to achieve at least about 80% or at least about 90% donor chimerism. In some embodiments, the JAK inhibitor is administered continuously for between about three weeks and about four weeks post-transplant. In some embodiments, the subject does not receive chemotherapy, irradiation, or pan T cell depletion (pan-TCD) prior to allo-HSCT. In some embodiments, the administering of HSC-depleting ADC and JAK inhibitor impairs T cell and NK cell survival, enables multilineage alloengraftment, permits allogeneic donor engraftment, prevents Graft versus Host Disease (GvHD), and enhances Graft versus Leukemia (GvL) effects. In some embodiments, the subject has a cancer of the blood or bone marrow, optionally, multiple myeloma or leukemia. In some embodiments, the subject has, is suspected of having, or at risk for a hematologic malignancy, optionally, acute myeloid leukemia or myelodysplastic syndrome (MDS); an autoimmune diseases, optionally, multiple sclerosis or type I diabetes; or an immunodeficiency, optionally, Fanconi anemia or recombinase-activating gene (RAG) deficiency; or a solid organ transplantation, a tolerance induction for solid organ transplantation (SOT), chronic infection, sickle cell disease, thalassemia, or hemophilia. In some embodiments, the subject: does not experience significant treatment-related toxicities; does not experience or GvHD after allo-HSCT; or has poor functional status or medical comorbidities. In some embodiments, the method further comprises administering a cancer therapeutic to the subject. An aspect of the present disclosure provides for a method of treating a subject comprising administering a conditioning agent comprising a JAK1/JAK2 inhibitor for use in allogeneic hematopoietic stem cell transplantation. Another aspect of the present disclosure provides for a method of inhibiting alloreactivity in the host-versus-graft direction comprising administering a therapeutically effective amount of a conditioning agent comprising a JAK1/JAK2 inhibitor in an amount sufficient to permit engraftment of allogeneic bone marrow. In some embodiments, the conditioning agent is selected from baricitinib. In some embodiments, the method comprises administering a cancer therapeutic. In some embodiments, the subject has a cancer of the blood or bone marrow, such as multiple myeloma or leukemia. In some embodiments, the method comprises pre-transplant T cell depletion. In some embodiments, the conditioning agent is continuously infused.

Other objects and features will be in part apparent and in part pointed out hereinafter.

DESCRIPTION OF THE DRAWINGS

Those of skill in the art will understand that the drawings, described below, are for illustrative purposes only. The drawings are not intended to limit the scope of the present teachings in any way.

DETAILED DESCRIPTION

Figure 1A:
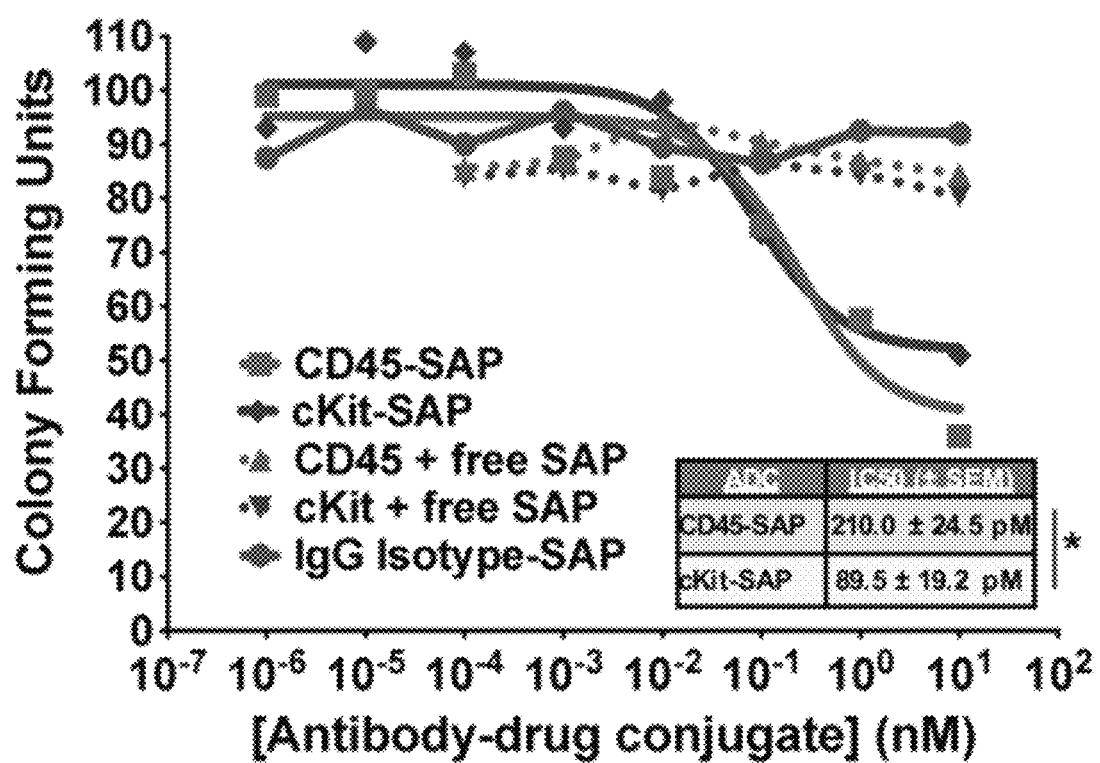
FIG. 1A-FIG. 1E. CD45-SAP and cKit-SAP are similarly effective conditioning agents for syngeneic HSCT. (A) Inhibition of B6 bone marrow colony formation in vitro by ADCs or control conjugates. Mean colony counts from one representative of three experiments are shown. (B) In vivo depletion of bone marrow CD150$^+$CD48$^-$ LSK cells (HSC) and colony forming units (CFU) 7 days post-infusion with the indicated conjugates. Mice were pooled from 2-4 experiments; please note that the same cohort of untreated mice was used to compare with the CD45-SAP and cKit-SAP treatment groups. (C and D) Schema and results for syngeneic HSCT in mice conditioned with the indicated conjugates. Donor chimerism overall and for T, B, and myeloid (Gr1$^+$ and/or CD11b$^+$) lineages (D) and CBCs (D) are displayed. Mice were pooled from 2-3 experiments. Overall donor chimerism between active and inactive ADC was significantly different at all timepoints ($p<0.0001$ for CD45-SAP vs. CD45+free SAP; $p<0.001$ for cKit-SAP 10 µg vs. cKit+free SAP 10 µg). (E) Secondary HSCT using whole marrow from B6-GFP→B6 primary recipients that were conditioned with the indicated ADCs, analyzed at 4 months post-transplant. The % GFP$^+$ of HSCs infused to the secondary recipients is shown; mice were pooled from 2 experiments. Data points and error bars represent mean±SEM. For statistical comparisons, ns=not significant, *=$p<0.05$, =$p<0.01$, *=$p<0.001$, ****=$p<0.0001$.

The present disclosure is based, at least in part, on the discovery that the selective JAK1/JAK2 inhibitor baricitinib can be used as a conditioning agent for allogeneic hematopoietic stem cell transplantation. Furthermore, CD45-ADC plus a JAK1/JAK2 inhibitor, such as baricitinib is a novel, minimally-toxic conditioning regimen for allogeneic hematopoietic stem cell transplantation.

As described herein, the combination of ADCs for CD45 and JAK1/2 inhibitors have a synergistic effect and not lust an additive effect. The finding that daily baricitinib synergized with pre-HSCT TCD in the MHC-mismatched model was a surprising result. Due to baricitinib's utility in blocking graft-versus-host immune responses, it was hypothesized that baricitinib may be useful in blocking host-versus-graft immune responses that cause graft rejection in allogeneic hematopoietic stem cell transplantation. Here is shown, the combined use of baricitinib with other experimental therapies in mouse models, such as antibody-drug conjugates targeting hematopoietic stem cells, to perform alloHSCT in a minimally toxic way that does not require chemotherapy or radiation. This is of great potential relevance to diseases treated with alloHSCT like acute myeloid leukemia, which are diagnosed predominantly in older patients who may not be able to tolerate aggressive chemotherapy or radiation-based conditioning protocols.

Baricitinib, in the disclosed mouse models, has been useful alone in combination with other treatments for performing allogeneic hematopoietic stem cell transplantation between MHC-mismatched strains of mice. Unlike typical methods of conditioning for alloHSCT, this method does not require chemotherapy or irradiation to get engraftment of donor cells. If applicable to humans undergoing alloHSCT, this method would be of potential utility for patients unable to tolerate toxicities from chemotherapy or radiation-based conditioning regimens.

Successful allogeneic hematopoietic stem cell transplantation (alloHSCT) requires overcoming two major barriers: depletion of the recipient hematopoietic niche to make space for incoming donor hematopoietic stem cells (HSC), and mitigation of immune responses mounted by donor and recipient against one another which may lead to graft versus host disease (GvHD) or graft rejection. These barriers are typically overcome with a pre-transplant conditioning regimen consisting of chemotherapy and/or irradiation. These pose a significant risk of treatment-related toxicities, which may preclude the use of alloHSCT for patients with poor functional status or medical comorbidities.

As described herein, a novel approach to alloHSCT conditioning has been developed that is effective at overcoming the barriers to transplantation, but with minimal toxicities.

Treatment-related toxicities from conventional alloHSCT conditioning regimens pose a significant barrier to this potentially curative therapy. This is particularly important for treatment of life-threatening hematologic diseases associated with advancing age, such as acute myeloid leukemia (AML) and myelodysplastic syndrome (MDS). For AML and MDS, alloHSCT represents the only chance for cure, yet patients may be unable to undergo the procedure due to age, poor functional status, and/or their medical comorbidities. Advancement and optimization of minimally toxic yet effective conditioning regimens may therefore expand access to alloHSCT for patients otherwise unable to tolerate it.

Hematopoietic Stem Cells (HSCs)-Depleting Antibody Drug Conjugates (ADCs)

ADCs as described herein can be any ADC capable of depleting recipient-derived HSCs, such as cKit ADCs, CD45 ADCs (e.g., cKit-SAP, CD45-SAP, CD117-Amanitin, CD45-PBD) (see e.g., Czechowicz, Nature Communications volume 10, Article number: 617 (2019)).

JAK Inhibitors

As described herein, JAK inhibitors can be used as conditioning agents. For example, a conditioning agent can be a JAK inhibitor (e.g., pan-JAK, JAK1, JAK2, JAK3, JAK1/2, JAK2/3, JAK1/3 inhibitors) selected from AT9283, AG-490, AZ 960, AZD1480, baricitinib, BMS-911543, CEP-33779, cerdulatinib, CHZ868, cucurbitacin, JSI-124, curcumol, decernotinib, fedratinib, filgotinib, FLLL32, gandotinib, GLPG0634 analogue, GLPG0634, Go6976, itacitnib (INCB039110), lestaurtinib (CEP701, KT-5555), momelotinib, NS-018, Ilginatinib, NVP-BSK805, oclacitinib, pacritinib, peficitinib, ruxolitinib, solcitinib (GSK 2586184), S-Ruxolitinib, TG101209, tofacitinib, upadacitinib, WHI-P154, WP1066, XL019, or ZM 39923.

Diseases, Disorders, and Conditions

The compositions and methods described herein can be used in the treatment and prevention of many diseases, disorders, and conditions, such as hematologic malignancies (e.g., acute myeloid leukemia, myelodysplastic syndrome (MDS)), autoimmune diseases (e.g., multiple sclerosis, type I diabetes), immunodeficiency (e.g., Fanconi anemia, recombinase-activating gene (RAG) deficiency), chronic infection, tolerance induction for solid organ transplantation (SOT), sickle cell disease, thalassemia, and hemophilia.

Hematopoietic Cancers

The agents and compositions described herein can be used in the treatment of cancers, such as hematopoietic cancers or blood cancers. Hematopoietic cancers (HCs) are malignancies of immune system cells. HCs are commonly associated with gross chromosomal abnormalities such as translocations. Leukemias are "liquid tumors" in the blood and are derived from the transformation of either a hematopoietic precursor in the bone marrow or a mature hematopoietic cell in the blood. Leukemias can be lymphoid or myeloid, and acute or chronic, such as acute myeloid leukemia (AML). In the case of myelomas, the transformed cell is a fully differentiated plasma cell that may be present as a dispersed collection of malignant cells or as a solid mass in the bone marrow. In the case of lymphomas, a transformed lymphocyte in a secondary lymphoid tissue generates a solid mass. Lymphomas are classified as either Hodgkin lymphoma (HL) or non-Hodgkin lymphoma (NHL). In HL, a reactive infiltrate of non-transformed cells surrounds a malignant clone of Reed-Sternberg cells. In NHL, the entire cancerous mass develops from a transformed lymphocyte. Subtypes of HL and NHL are defined based on tumor architecture, cell morphology and differentiation, surface markers, and genetic aberrations. Identification of an HC's genetic aberration can optimize treatment. Improvements in diagnosis and therapy, including hematopoietic stem cell transplantation and molecularly targeted strategies, have increased patient survival.

Myelodysplastic Syndrome (MDS)

The conditioning regimen described herein can be used for alloHSCT in myelodysplastic syndrome (MDS). Myelodysplastic syndromes are a group of disorders caused by blood cells that are poorly formed or don't work properly. Myelodysplastic syndromes result from something amiss in the spongy material inside your bones where blood cells are made (bone marrow).

In a healthy person, bone marrow makes new, immature blood cells that mature over time. Myelodysplastic syndromes occur when something disrupts this process so that the blood cells don't mature.

Management of myelodysplastic syndromes is most often intended to slow the disease, ease symptoms, and prevent complications. Common measures include blood transfusions and medications to boost blood cell production. In certain situations, a bone marrow transplant, also known as a stem cell transplant, may be recommended to replace your bone marrow with healthy bone marrow from a donor.

The World Health Organization divides myelodysplastic syndromes into subtypes based on the type of blood cells—red cells, white cells, and platelets—involved.

Myelodysplastic syndrome subtypes can include:

Myelodysplastic syndromes with single-lineage dysplasia. One blood cell type—white blood cells, red blood cells, or platelets—is low in number and appears abnormal under the microscope.

Myelodysplastic syndromes with multilineage dysplasia. In this subtype, two or three blood cell types are abnormal.

Myelodysplastic syndromes with ring sideroblasts. This subtype involves a low number of one or more blood cell types. A characteristic feature is that existing red blood cells in the bone marrow contain rings of excess iron.

Myelodysplastic syndromes with isolated del(5q) chromosome abnormality. People with this subtype have low numbers of red blood cells, and the cells have a specific mutation in their DNA.

Myelodysplastic syndromes with excess blasts. In this subtype, any of the three types of blood cells—red blood cells, white blood cells, or platelets—might be low and appear abnormal under a microscope. Very immature blood cells (blasts) are found in the blood and bone marrow.

Myelodysplastic syndromes, unclassifiable. In this subtype, there are reduced numbers of one or more types of mature blood cells and the cells might look abnormal under the microscope. Sometimes the blood cells appear normal, but analysis might find that the cells have DNA changes that are associated with myelodysplastic syndromes.

Formulation

The agents and compositions described herein can be formulated by any conventional manner using one or more pharmaceutically acceptable carriers or excipients as described in, for example, Remington's Pharmaceutical Sciences (A. R. Gennaro, Ed.), 21st edition, ISBN: 0781746736 (2005), incorporated herein by reference in its entirety. Such formulations will contain a therapeutically effective amount of a biologically active agent described herein, which can be in purified form, together with a suitable amount of carrier so as to provide the form for proper administration to the subject.

The term "formulation" refers to preparing a drug in a form suitable for administration to a subject, such as a human. Thus, a "formulation" can include pharmaceutically acceptable excipients, including diluents or carriers.

The term "pharmaceutically acceptable" as used herein can describe substances or components that do not cause unacceptable losses of pharmacological activity or unacceptable adverse side effects. Examples of pharmaceutically acceptable ingredients can be those having monographs in United States Pharmacopeia (USP 29) and National Formulary (NF 24), United States Pharmacopeial Convention, Inc, Rockville, Maryland, 2005 ("USP/NF"), or a more recent edition, and the components listed in the continuously updated Inactive Ingredient Search online database of the FDA. Other useful components that are not described in the USP/NF, etc. may also be used.

The term "pharmaceutically acceptable excipient," as used herein, can include any and all solvents, dispersion media, coatings, antibacterial and antifungal agents, isotonic, or absorption delaying agents. The use of such media and agents for pharmaceutically active substances is well known in the art (see generally Remington's Pharmaceutical Sciences (A. R. Gennaro, Ed.), 21st edition, ISBN: 0781746736 (2005)). Except insofar as any conventional media or agent is incompatible with an active ingredient, its use in the therapeutic compositions is contemplated. Supplementary active ingredients can also be incorporated into the compositions.

A "stable" formulation or composition can refer to a composition having sufficient stability to allow storage at a convenient temperature, such as between about 0° C. and about 60° C., for a commercially reasonable period of time, such as at least about one day, at least about one week, at least about one month, at least about three months, at least about six months, at least about one year, or at least about two years.

The formulation should suit the mode of administration. The agents of use with the current disclosure can be formulated by known methods for administration to a subject using several routes which include, but are not limited to, parenteral, pulmonary, oral, topical, intradermal, intratumoral, intranasal, inhalation (e.g., in an aerosol), implanted, intramuscular, intraperitoneal, intravenous, subcutaneous, intranasal, epidural, ophthalmic, transdermal, buccal, and rectal. The individual agents may also be administered in combination with one or more additional agents or together with other biologically active or biologically inert agents. Such biologically active or inert agents may be in fluid or mechanical communication with the agent(s) or attached to the agent(s) by ionic, covalent, Van der Waals, hydrophobic, hydrophilic, or other physical forces.

Controlled-release (or sustained-release) preparations may be formulated to extend the activity of the agent(s) and reduce dosage frequency. Controlled-release preparations can also be used to affect the time of onset of action or other characteristics, such as blood levels of the agent, and consequently, affect the occurrence of side effects. Controlled-release preparations may be designed to initially release an amount of an agent(s) that produces the desired therapeutic effect, and gradually and continually release other amounts of the agent to maintain the level of therapeutic effect over an extended period of time. In order to maintain a near-constant level of an agent in the body, the agent can be released from the dosage form at a rate that will replace the amount of agent being metabolized or excreted from the body. The controlled-release of an agent may be stimulated by various inducers, e.g., change in pH, change in temperature, enzymes, water, or other physiological conditions or molecules.

Agents or compositions described herein can also be used in combination with other therapeutic modalities, as described further below. Thus, in addition to the therapies described herein, one may also provide to the subject other therapies known to be efficacious for treatment of the disease, disorder, or condition.

Therapeutic Methods

Also provided is a process of conditioning a subject or treating or preventing a cancer of the blood or bone marrow, such as multiple myeloma or leukemia in a subject in need of administration of a therapeutically effective amount of a conditioning agent (e.g., HSC-depleting ADC or JAK inhibitor), so as to sufficiently permit engraftment of allogeneic bone marrow.

Methods described herein are generally performed on a subject in need thereof. A subject in need of the therapeutic methods described herein can be a subject having, diagnosed with, suspected of having, or at risk for developing a condition wherein the subject may need a transplant, or having a hematopoietic cancer or a blood cancer. A determination of the need for treatment will typically be assessed by a history, physical exam, or diagnostic tests consistent with the disease or condition at issue. Diagnosis of the various conditions treatable by the methods described herein is within the skill of the art. The subject can be an animal subject, including a mammal, such as horses, cows, dogs, cats, sheep, pigs, mice, rats, monkeys, hamsters, guinea pigs, and humans or chickens. For example, the subject can be a human subject.

Generally, a safe and effective amount of a conditioning agent (e.g., HSC-depleting ADC or JAK inhibitor) is, for example, that amount that would cause the desired therapeutic effect in a subject while minimizing undesired side effects. In various embodiments, an effective amount of a conditioning agent described herein can substantially inhibit a hematopoietic cancer or a blood cancer, slow the progress of a hematopoietic cancer or a blood cancer, or limit the development of a hematopoietic cancer or a blood cancer.

According to the methods described herein, administration can be parenteral, pulmonary, oral, topical, intradermal, intramuscular, intraperitoneal, intravenous, subcutaneous, intranasal, epidural, ophthalmic, buccal, or rectal administration.

When used in the treatments described herein, a therapeutically effective amount of a conditioning agent can be employed in pure form or, where such forms exist, in pharmaceutically acceptable salt form and with or without a pharmaceutically acceptable excipient. For example, the compounds of the present disclosure can be administered, at a reasonable benefit/risk ratio applicable to any medical treatment, in a sufficient amount to substantially inhibit a hematopoietic cancer or a blood cancer, slow the progress of a hematopoietic cancer or a blood cancer, or limit the development of a hematopoietic cancer or a blood cancer.

The amount of a composition described herein that can be combined with a pharmaceutically acceptable carrier to produce a single dosage form will vary depending upon the host treated and the particular mode of administration. It will be appreciated by those skilled in the art that the unit content of agent contained in an individual dose of each dosage form need not in itself constitute a therapeutically effective amount, as the necessary therapeutically effective amount could be reached by administration of a number of individual doses.

Toxicity and therapeutic efficacy of compositions described herein can be determined by standard pharmaceutical procedures in cell cultures or experimental animals for determining the $LD_{50}$ (the dose lethal to 50% of the population) and the $ED_{50}$, (the dose therapeutically effective in 50% of the population). The dose ratio between toxic and therapeutic effects is the therapeutic index that can be expressed as the ratio $LD_{50}/ED_{50}$, where larger therapeutic indices are generally understood in the art to be optimal.

The specific therapeutically effective dose level for any particular subject will depend upon a variety of factors including the disorder being treated and the severity of the disorder; activity of the specific compound employed; the specific composition employed; the age, body weight, general health, sex and diet of the subject; the time of administration; the route of administration; the rate of excretion of the composition employed; the duration of the treatment; drugs used in combination or coincidental with the specific compound employed; and like factors well known in the medical arts (see e.g., Koda-Kimble et al. (2004) Applied Therapeutics: The Clinical Use of Drugs, Lippincott Williams & Wilkins, ISBN 0781748453; Winter (2003) Basic Clinical Pharmacokinetics, $4^{th}$ ed., Lippincott Williams & Wilkins, ISBN 0781741475; Sharqel (2004) Applied Biopharmaceutics & Pharmacokinetics, McGraw-Hill/Appleton & Lange, ISBN 0071375503). For example, it is well within the skill of the art to start doses of the composition at levels lower than those required to achieve the desired therapeutic effect and to gradually increase the dosage until the desired effect is achieved. If desired, the effective daily dose may be divided into multiple doses for purposes of administration. Consequently, single dose compositions may contain such amounts or submultiples thereof to make up the daily dose. It will be understood, however, that the total daily usage of the compounds and compositions of the present disclosure will be decided by an attending physician within the scope of sound medical judgment.

Again, each of the states, diseases, disorders, and conditions, described herein, as well as others, can benefit from compositions and methods described herein. Generally, treating a state, disease, disorder, or condition includes preventing or delaying the appearance of clinical symptoms in a mammal that may be afflicted with or predisposed to the state, disease, disorder, or condition but does not yet experience or display clinical or subclinical symptoms thereof. Treating can also include inhibiting the state, disease, disorder, or condition, e.g., arresting or reducing the development of the disease or at least one clinical or subclinical symptom thereof. Furthermore, treating can include relieving the disease, e.g., causing regression of the state, disease, disorder, or condition or at least one of its clinical or subclinical symptoms. A benefit to a subject to be treated can be either statistically significant or at least perceptible to the subject or a physician.

Administration of the conditioning agent can occur as a single event or over a time course of treatment. For example, the conditioning agent can be administered daily, weekly, bi-weekly, or monthly. For treatment of acute conditions, the time course of treatment will usually be at least several days. Certain conditions could extend treatment from several days to several weeks. For example, treatment could extend over one week, two weeks, or three weeks. For more chronic conditions, treatment could extend from several weeks to several months or even a year or more.

Treatment in accord with the methods described herein can be performed prior to, concurrent with, or after conventional treatment modalities for a hematopoietic cancer or a blood cancer.

A conditioning agent can be administered simultaneously or sequentially with another agent, such as an antibiotic, an anti-inflammatory, or another agent. For example, a conditioning agent can be administered simultaneously with another agent, such as a cancer therapeutic (e.g., immunotherapy, chemotherapy), an antibiotic, or an anti-inflammatory. Simultaneous administration can occur through administration of separate compositions, each containing one or more of a conditioning agent, a cancer therapeutic (e.g., immunotherapy, chemotherapy), an antibiotic, an anti-inflammatory, or another agent. Simultaneous administration can occur through administration of one composition containing two or more of a conditioning agent, a cancer therapeutic (e.g., immunotherapy, chemotherapy), an antibiotic, an anti-inflammatory, or another agent. A conditioning agent can be administered sequentially with a cancer therapeutic (e.g., immunotherapy, chemotherapy), an antibiotic, an anti-inflammatory, or another agent. For example, a conditioning agent can be administered before or after administration of a cancer therapeutic (e.g., immunotherapy, chemotherapy), an antibiotic, an anti-inflammatory, or another agent.

Active compounds are administered at a therapeutically effective dosage sufficient to treat a condition associated with a condition in a patient. For example, the efficacy of a compound can be evaluated in an animal model system that may be predictive of efficacy in treating the disease in a human or another animal, such as the model systems shown in the examples and drawings.

An effective dose range of a therapeutic can be extrapolated from effective doses determined in animal studies for a variety of different animals. In general, a human equivalent dose (HED) in mg/kg can be calculated in accordance with the following formula (see e.g., Reagan-Shaw et al., *FASEB J.*, 22(3):659-661, 2008, which is incorporated herein by reference):

HED (mg/kg)=Animal dose (mg/kg)×(Animal $K_m$/Human $K_m$)

Use of the $K_m$ factors in conversion results in more accurate HED values, which are based on body surface area (BSA) rather than only on body mass. $K_m$ values for humans and various animals are well known. For example, the $K_m$ for an average 60 kg human (with a BSA of 1.6 m$^2$) is 37, whereas a 20 kg child (BSA 0.8 m$^2$) would have a $K_m$ of 25. $K_m$ for some relevant animal models are also well known, including: mice $K_m$ of 3 (given a weight of 0.02 kg and BSA of 0.007); hamster $K_m$ of 5 (given a weight of 0.08 kg and BSA of 0.02); rat $K_m$ of 6 (given a weight of 0.15 kg and BSA of 0.025) and monkey $K_m$ of 12 (given a weight of 3 kg and BSA of 0.24).

Precise amounts of the therapeutic composition depend on the judgment of the practitioner and are peculiar to each individual. Nonetheless, a calculated HED dose provides a general guide. Other factors affecting the dose include the physical and clinical state of the patient, the route of administration, the intended goal of treatment, and the potency, stability, and toxicity of the particular therapeutic formulation.

The actual dosage amount of a compound of the present disclosure or composition comprising a compound of the present disclosure administered to a subject may be determined by physical and physiological factors such as type of animal treated, age, sex, body weight, severity of condition, the type of disease being treated, previous or concurrent therapeutic interventions, idiopathy of the subject and on the route of administration. These factors may be determined by a skilled artisan. The practitioner responsible for administration will typically determine the concentration of active ingredient(s) in a composition and appropriate dose(s) for the individual subject. The dosage may be adjusted by the individual physician in the event of any complication.

In some embodiments, the conditioning agent may be administered in an amount (optionally infused) from about 1 mg/day to about 4 mg/day. For example, the conditioning agent may be administered in an amount (optionally infused) selected from about 0.1 mg, about 0.2 mg, about 0.3 mg, about 0.4 mg, about 0.5 mg, about 0.6 mg, about 0.7 mg, about 0.8 mg, about 0.9 mg, about 1 mg, about 1.1 mg, about 1.2 mg, about 1.3 mg, about 1.4 mg, about 1.5 mg, about 1.6 mg, about 1.7 mg, about 1.8 mg, about 1.9 mg, about 2 mg, about 2.1 mg, about 2.2 mg, about 2.3 mg, about 2.4 mg, about 2.5 mg, about 2.6 mg, about 2.7 mg, about 2.8 mg, about 2.9 mg, about 3 mg, about 3.1 mg, about 3.2 mg, about 3.3 mg, about 3.4 mg, about 3.5 mg, about 3.6 mg, about 3.7 mg, about 3.8 mg, about 3.9 mg, about 4 mg, about 4.1 mg, about 4.2 mg, about 4.3 mg, about 4.4 mg, about 4.5 mg, about 4.6 mg, about 4.7 mg, about 4.8 mg, about 4.9 mg, about 5 mg, about 5.1 mg, about 5.2 mg, about 5.3 mg, about 5.4 mg, about 5.5 mg, about 5.6 mg, about 5.7 mg, about 5.8 mg, about 5.9 mg, about 6 mg, about 6.1 mg, about 6.2 mg, about 6.3 mg, about 6.4 mg, about 6.5 mg, about 6.6 mg, about 6.7 mg, about 6.8 mg, about 6.9 mg, about 7 mg, about 7.1 mg, about 7.2 mg, about 7.3 mg, about 7.4 mg, about 7.5 mg, about 7.6 mg, about 7.7 mg, about 7.8 mg, about 7.9 mg, about 8 mg, about 8.1 mg, about 8.2 mg, about 8.3 mg, about 8.4 mg, about 8.5 mg, about 8.6 mg, about 8.7 mg, about 8.8 mg, about 8.9 mg, about 9 mg, about 9.1 mg, about 9.2 mg, about 9.3 mg, about 9.4 mg, about 9.5 mg, about 9.6 mg, about 9.7 mg, about 9.8 mg, about 9.9 mg, or about 10 mg.

In some embodiments, the conditioning agent such as a JAK inhibitor (e.g., baricitinib) may be administered in an amount from about 0.01 mg/kg to about 10 mg/kg, or about 00.1 mg/kg to about 5 mg/kg, or about 0.01 mg/kg to about 2.5 mg/kg, or about 0.1 mg/kg to about 1.5 mg/kg, or about 0.01 mg/kg to about 1.0 mg/kg, or about 0.01 mg/kg to about 0.5 mg/kg, or about 0.03 mg/kg. In some embodiments, a conditioning agent such as a JAK inhibitor (e.g., baricitinib) may be administered in a range of about 1 mg/kg to about 200 mg/kg, or about 50 mg/kg to about 200 mg/kg, or about 50 mg/kg to about 100 mg/kg, or about 75 mg/kg to about 100 mg/kg, or about 100 mg/kg.

The effective amount may be less than 0.01 mg/kg/day, less than 0.5 mg/kg/day, less than 0.25 mg/kg/day, less than 1 mg/kg/day, less than 5 mg/kg/day, less than 2.5 mg/kg/day or less than 1.0 mg/kg/day. It may alternatively be in the range of 0.01 mg/kg/day to 4 mg/kg/day.

In other non-limiting examples, a dose may also comprise from about 1 microgram/kg/body weight, about 5 microgram/kg/body weight, about 10 microgram/kg/body weight, about 50 microgram/kg/body weight, about 100 microgram/kg/body weight, about 200 microgram/kg/body weight, about 350 microgram/kg/body weight, about 500 microgram/kg/body weight, about 1 milligram/kg/body weight, about 5 milligram/kg/body weight, about 10 milligram/kg/body weight, about 50 milligram/kg/body weight, about 100 milligram/kg/body weight, about 200 milligram/kg/body weight, about 350 milligram/kg/body weight, about 500 milligram/kg/body weight, to about 1000 mg/kg/body weight or more per administration, and any range derivable therein. In non-limiting examples of a derivable range from the numbers listed herein, a range of about 5 mg/kg/body weight to about 100 mg/kg/body weight, about 5 microgram/kg/body weight to about 500 milligram/kg/body weight, etc., can be administered, based on the numbers described above.

Cell Therapy

Cells generated according to the methods described herein can be used in cell therapy. Cell therapy (also called cellular therapy, cell transplantation, or cytotherapy) can be a therapy in which viable cells are injected, grafted, or implanted into a patient in order to effectuate a medicinal effect or therapeutic benefit. For example, transplanting T-cells capable of fighting cancer cells via cell-mediated immunity can be used in the course of immunotherapy, grafting stem cells can be used to regenerate diseased tissues, or transplanting beta cells can be used to treat diabetes.

Stem cell and cell transplantation has gained significant interest by researchers as a potential new therapeutic strategy for a wide range of diseases, in particular for degenerative and immunogenic pathologies.

Allogeneic cell therapy or allogenic transplantation uses donor cells from a different subject than the recipient of the cells. A benefit of an allogenic strategy is that unmatched allogenic cell therapies can form the basis of "off the shelf" products.

Autologous cell therapy or autologous transplantation uses cells that are derived from the subject's own tissues. It could also involve the isolation of matured cells from diseased tissues, to be later re-implanted at the same or neighboring tissues. A benefit of an autologous strategy is that there is limited concern for immunogenic responses or transplant rejection.

Xenogeneic cell therapies or xenotransplantation uses cells from another species. For example, pig derived cells can be transplanted into humans. Xenogeneic cell therapies can involve human cell transplantation into experimental animal models for assessment of efficacy and safety or enable xenogeneic strategies to humans as well.

Administration

Agents and compositions described herein can be administered according to methods described herein in a variety of means known to the art. The agents and composition can be used therapeutically either as exogenous materials or as endogenous materials. Exogenous agents are those produced or manufactured outside of the body and administered to the body. Endogenous agents are those produced or manufactured inside the body by some type of device (biologic or other) for delivery within or to other organs in the body.

As discussed above, administration can be parenteral, pulmonary, oral, topical, intradermal, intramuscular, intraperitoneal, intravenous, subcutaneous, intranasal, epidural, ophthalmic, buccal, or rectal administration.

Agents and compositions described herein can be administered in a variety of methods well known in the arts. Administration can include, for example, methods involving oral ingestion, direct injection (e.g., systemic or stereotactic), implantation of cells engineered to secrete the factor of interest, drug-releasing biomaterials, polymer matrices, gels, permeable membranes, osmotic systems, multilayer coatings, microparticles, implantable matrix devices, mini-osmotic pumps, implantable pumps, injectable gels and hydrogels, liposomes, micelles (e.g., up to 30 µm), nanospheres (e.g., less than 1 µm), microspheres (e.g., 1-100 µm), reservoir devices, a combination of any of the above, or other suitable delivery vehicles to provide the desired release profile in varying proportions. Other methods of controlled-release delivery of agents or compositions will be known to the skilled artisan and are within the scope of the present disclosure.

Delivery systems may include, for example, an infusion pump which may be used to administer the agent or composition in a manner similar to that used for delivering insulin or chemotherapy to specific organs or tumors. Typically, using such a system, an agent or composition can be administered in combination with a biodegradable, biocompatible polymeric implant that releases the agent over a controlled period of time at a selected site. Examples of polymeric materials include polyanhydrides, polyorthoesters, polyglycolic acid, polylactic acid, polyethylene vinyl acetate, and copolymers and combinations thereof. In addition, a controlled release system can be placed in proximity of a therapeutic target, thus requiring only a fraction of a systemic dosage.

Agents can be encapsulated and administered in a variety of carrier delivery systems. Examples of carrier delivery systems include microspheres, hydrogels, polymeric implants, smart polymeric carriers, and liposomes (see generally, Uchegbu and Schatzlein, eds. (2006) Polymers in Drug Delivery, CRC, ISBN-10: 0849325331). Carrier-based systems for molecular or biomolecular agent delivery can: provide for intracellular delivery; tailor biomolecule/agent release rates; increase the proportion of biomolecule that reaches its site of action; improve the transport of the drug to its site of action; allow colocalized deposition with other agents or excipients; improve the stability of the agent in vivo; prolong the residence time of the agent at its site of action by reducing clearance; decrease the nonspecific delivery of the agent to nontarget tissues; decrease irritation caused by the agent; decrease toxicity due to high initial doses of the agent; alter the immunogenicity of the agent; decrease dosage frequency, improve taste of the product; or improve shelf life of the product.

Kits

Also provided are kits. Such kits can include an agent or composition described herein and, in certain embodiments, instructions for administration. Such kits can facilitate performance of the methods described herein. When supplied as a kit, the different components of the composition can be packaged in separate containers and admixed immediately before use. Components include, but are not limited to conditioning agents, cancer therapeutic agents, or T-cell depletion agent. Such packaging of the components separately can, if desired, be presented in a pack or dispenser device which may contain one or more unit dosage forms containing the composition. The pack may, for example, comprise metal or plastic foil such as a blister pack. Such packaging of the components separately can also, in certain instances, permit long-term storage without losing activity of the components.

Kits may also include reagents in separate containers such as, for example, sterile water or saline to be added to a lyophilized active component packaged separately. For example, sealed glass ampules may contain a lyophilized component and in a separate ampule, sterile water, or sterile saline, each of which has been packaged under a neutral non-reacting gas, such as nitrogen. Ampules may consist of any suitable material, such as glass, organic polymers, such as polycarbonate, polystyrene, ceramic, metal, or any other material typically employed to hold reagents. Other examples of suitable containers include bottles that may be fabricated from similar substances as ampules and envelopes that may consist of foil-lined interiors, such as aluminum or an alloy. Other containers include test tubes, vials, flasks, bottles, syringes, and the like. Containers may have a sterile access port, such as a bottle having a stopper that can be pierced by a hypodermic injection needle. Other containers may have two compartments that are separated by a readily removable membrane that upon removal permits the components to mix. Removable membranes may be glass, plastic, rubber, and the like.

In certain embodiments, kits can be supplied with instructional materials. Instructions may be printed on paper or other substrate, and/or may be supplied as an electronic-readable medium or video. Detailed instructions may not be physically associated with the kit; instead, a user may be directed to an Internet web site specified by the manufacturer or distributor of the kit.

Compositions and methods described herein utilizing molecular biology protocols can be according to a variety of standard techniques known to the art (see, e.g., Sambrook and Russel (2006) Condensed Protocols from Molecular Cloning: A Laboratory Manual, Cold Spring Harbor Laboratory Press, ISBN-10: 0879697717; Ausubel et al. (2002) Short Protocols in Molecular Biology, 5th ed., Current Protocols, ISBN-10: 0471250929; Sambrook and Russel (2001) Molecular Cloning: A Laboratory Manual, 3d ed., Cold Spring Harbor Laboratory Press, ISBN-10: 0879695773; Elhai, J. and Wolk, C. P. 1988. Methods in Enzymology 167, 747-754; Studier (2005) Protein Expr Purif. 41(1), 207-234; Gellissen, ed. (2005) Production of Recombinant Proteins: Novel Microbial and Eukaryotic Expression Systems, Wiley-VCH, ISBN-10: 3527310363; Baneyx (2004) Protein Expression Technologies, Taylor & Francis, ISBN-10: 0954523253).

Definitions and methods described herein are provided to better define the present disclosure and to guide those of ordinary skill in the art in the practice of the present disclosure. Unless otherwise noted, terms are to be understood according to conventional usage by those of ordinary skill in the relevant art.

In some embodiments, numbers expressing quantities of ingredients, properties such as molecular weight, reaction conditions, and so forth, used to describe and claim certain embodiments of the present disclosure are to be understood as being modified in some instances by the term "about." In some embodiments, the term "about" is used to indicate that a value includes the standard deviation of the mean for the device or method being employed to determine the value. In some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the present disclosure are approximations, the numerical values set forth in the specific examples are reported as precisely as practicable. The numerical values presented in some embodiments of the present disclosure may contain certain errors necessarily resulting from the standard deviation found in their respective testing measurements. The recitation of ranges of values herein is merely intended to serve as a shorthand method of referring individually to each separate value falling within the range. Unless otherwise indicated herein, each individual value is incorporated into the specification as if it were individually recited herein. The recitation of discrete values is understood to include ranges between each value.

In some embodiments, the terms "a" and "an" and "the" and similar references used in the context of describing a particular embodiment (especially in the context of certain of the following claims) can be construed to cover both the singular and the plural, unless specifically noted otherwise. In some embodiments, the term "or" as used herein, including the claims, is used to mean "and/or" unless explicitly indicated to refer to alternatives only or the alternatives are mutually exclusive.

The terms "comprise," "have" and "include" are open-ended linking verbs. Any forms or tenses of one or more of these verbs, such as "comprises," "comprising," "has," "having," "includes" and "including," are also open-ended. For example, any method that "comprises," "has" or "includes" one or more steps is not limited to possessing only those one or more steps and can also cover other unlisted steps. Similarly, any composition or device that "comprises," "has" or "includes" one or more features is not limited to possessing only those one or more features and can cover other unlisted features.

All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the present disclosure and does not pose a limitation on the scope of the present disclosure otherwise claimed. No language in the specification should be construed as indicating any non-claimed element essential to the practice of the present disclosure.

Groupings of alternative elements or embodiments of the present disclosure disclosed herein are not to be construed as limitations. Each group member can be referred to and claimed individually or in any combination with other members of the group or other elements found herein. One or more members of a group can be included in, or deleted from, a group for reasons of convenience or patentability. When any such inclusion or deletion occurs, the specification is herein deemed to contain the group as modified thus fulfilling the written description of all Markush groups used in the appended claims.

All publications, patents, patent applications, and other references cited in this application are incorporated herein by reference in their entirety for all purposes to the same extent as if each individual publication, patent, patent application, or other reference was specifically and individually indicated to be incorporated by reference in its entirety for all purposes. Citation of a reference herein shall not be construed as an admission that such is prior art to the present disclosure.

Having described the present disclosure in detail, it will be apparent that modifications, variations, and equivalent embodiments are possible without departing the scope of the present disclosure defined in the appended claims. Furthermore, it should be appreciated that all examples in the present disclosure are provided as non-limiting examples.

EXAMPLES

The following non-limiting examples are provided to further illustrate the present disclosure. It should be appreciated by those of skill in the art that the techniques disclosed in the examples that follow represent approaches the inventors have found function well in the practice of the present disclosure, and thus can be considered to constitute examples of modes for its practice. However, those of skill in the art should, in light of the present disclosure, appreciate that many changes can be made in the specific embodiments that are disclosed and still obtain a like or similar result without departing from the spirit and scope of the present disclosure.

Example 1: Antibody-Drug Conjugates Targeting CD45 Plus Janus Kinase Inhibitors Effectively Condition for Allogeneic Hematopoietic Stem Cell Transplantation This example describes the combination of JAK1/JAK2 (JAK1/2) inhibitors and CD45-ADC. The approach combines antibody-drug conjugates targeting CD45 (to make room for transplanted donor HSCs) and the selective JAK1/JAK2 inhibitor baricitinib (to suppress the host immune system). In minor- and major-mismatched alloHSCT models in mice, up to 90% donor chimerism has been achieved in at least 70% of the mice treated with CD45-ADC (single dose at d-7 relative to transplant) plus baricitinib (starting d-3 post-transplant and continuing for 3-4 weeks).

Abstract

Despite the curative potential of hematopoietic stem cell transplantation (HSCT), transplant conditioning-associated toxicities preclude broader clinical application. Antibody-drug conjugates (ADC) provide an attractive approach to HSCT conditioning that minimizes toxicity while retaining efficacy. Initial studies of ADC conditioning have largely involved syngeneic HSCT, however, for treatment of acute leukemias or tolerance induction for solid organ transplantation, strategies for allogeneic HSCT (allo-HSCT) are needed. Using murine allo-HSCT models, shown herein is that combining CD45-targeted ADCs with the Janus kinase inhibitor baricitinib enables multilineage alloengraftment with >80-90% donor chimerism. Mechanistically, baricitinib impaired T and NK cell survival, proliferation and effector function, with NK cells being particularly susceptible due to inhibited IL-15 signaling. Unlike irradiated mice, CD45-ADC-conditioned mice did not manifest graft-versus-host alloreactivity when challenged with mismatched T cells. These studies demonstrate novel allo-HSCT conditioning strategies that exemplify the promise of immunotherapy to improve the safe application of HSCT for treating hematologic diseases.

Introduction

Hematopoietic stem cell transplantation (HSCT) has therapeutic potential for hematologic malignancies, autoimmunity, immunodeficiency, chronic infection, or tolerance induction for solid organ transplantation (SOT). However, two formidable barriers must be overcome to achieve successful HSCT outcomes. First, recipient-derived hematopoietic stem cells (HSCs) must be depleted to create space for incoming donor HSCs. Second, in allogeneic HSCT (allo-HSCT), host and donor immune responses must be controlled to prevent graft rejection and graft-versus-host-disease (GvHD), respectively. To overcome these barriers, HSCT patients undergo conditioning regimens comprised of chemotherapy and/or irradiation, whose toxicities limit the use of HSCT to life-threatening conditions like acute myeloid leukemia (AML).

For AML, allo-HSCT offers the best chance for disease control. Donor T lymphocytes in the HSC allograft mediate graft-versus-leukemia (GvL) effects that protect against relapse. Myeloablative conditioning is preferable for AML as its antileukemia activity also mitigates relapse risk. However, since the median age at diagnosis for AML is 68, patients' medical comorbidities or functional status may prevent them from undergoing this potentially curative therapy. Moreover, older AML patients have cytogenetically and clinically higher-risk disease that is more treatment-resistant and relapse-prone. This presents a clinical dilemma: the patients most likely to suffer from AML with adverse features are those who most require aggressive therapy, yet they are often the least able to tolerate it.

Novel allo-HSCT conditioning approaches that avoid treatment-related toxicities without sacrificing therapeutic efficacy are urgently needed. Recently, conditioning strategies have emerged using antibody-drug conjugates (ADCs) to target the hematopoietic niche. Initial studies used ADCs comprised of the ribosome inactivator saporin linked to antibodies recognizing the phosphatase CD45 (CD45-SAP) or the tyrosine kinase c-Kit (cKit-SAP) to specifically deplete HSCs. In mouse models, CD45-SAP and cKit-SAP were well-tolerated and effectively permitted syngeneic HSCT with high-level donor chimerism. Moreover, these conditioning regimens were used therapeutically in mouse models of sickle cell disease, hemophilia, Fanconi anemia, and recombinase-activating gene (RAG) deficiency.

Fewer studies, however, have studied ADCs as conditioning for allo-HSCT, in which T- and/or NK cell-mediated rejection must be overcome to enable engraftment. Such studies are critical for applying ADC-based conditioning to AML or for tolerance induction in SOT. Prior reports using cKit-targeted regimens have achieved engraftment in major histocompatibility complex (MHC)-mismatched allo-HSCT models. Herein, CD45-SAP is used to develop minimally-toxic conditioning regimens for murine allo-HSCT, with particular emphasis on how these therapies impact host and donor immunity. Using minor histocompatibility antigen (miHA)- and MHC-mismatched models, it is demonstrated that CD45-SAP plus pan-T cell depletion (TCD) is sufficient to permit allogeneic donor engraftment. Furthermore, the selective and balanced Janus kinase 1/2 (JAK1/2) inhibitor baricitinib, previously shown to prevent GvHD while enhancing GvL effects, permits robust alloengraftment after CD45-SAP conditioning without requiring pan-TCD. Finally, unlike total body irradiation (TBI) conditioning, CD45-SAP did not promote pathogenic graft-versus-host alloreactivity in mice challenged with allogeneic splenocytes. Taken together, this study provides a novel strategy for allo-HSCT whose biological effects—reducing rejection and GvHD while sparing GvL activity—provide the ideal blend of immunomodulatory activities for the treatment of AML.

Results

CD45 and cKit Antibody-Drug Conjugates for Syngeneic HSCT Conditioning

Figure 1B:
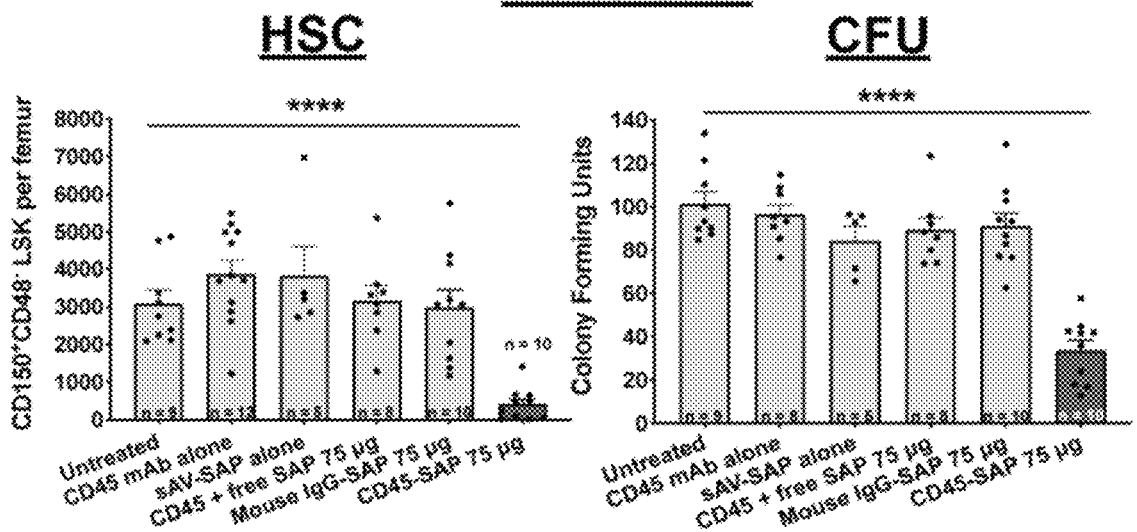
Figure 1B:
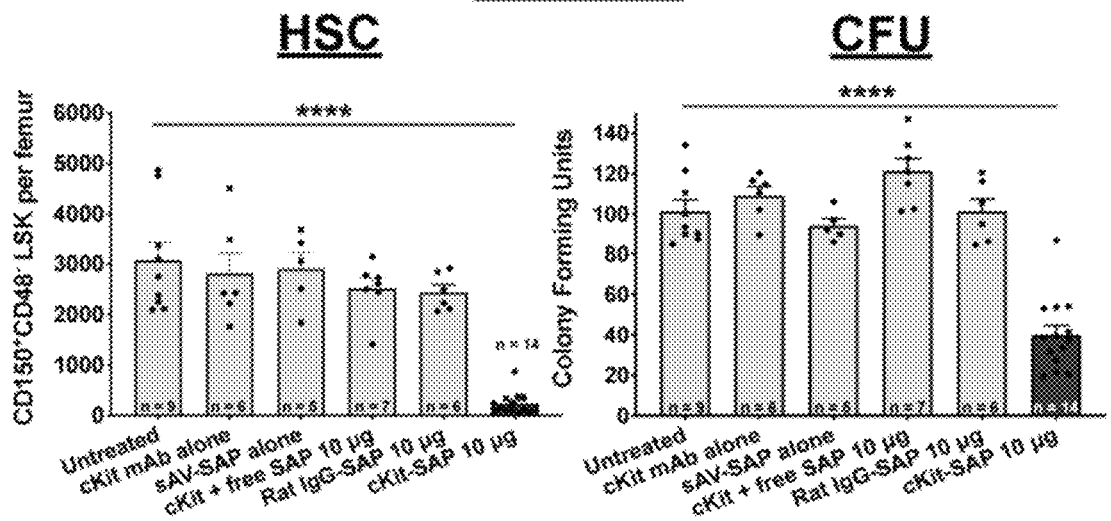
Figure 1C:
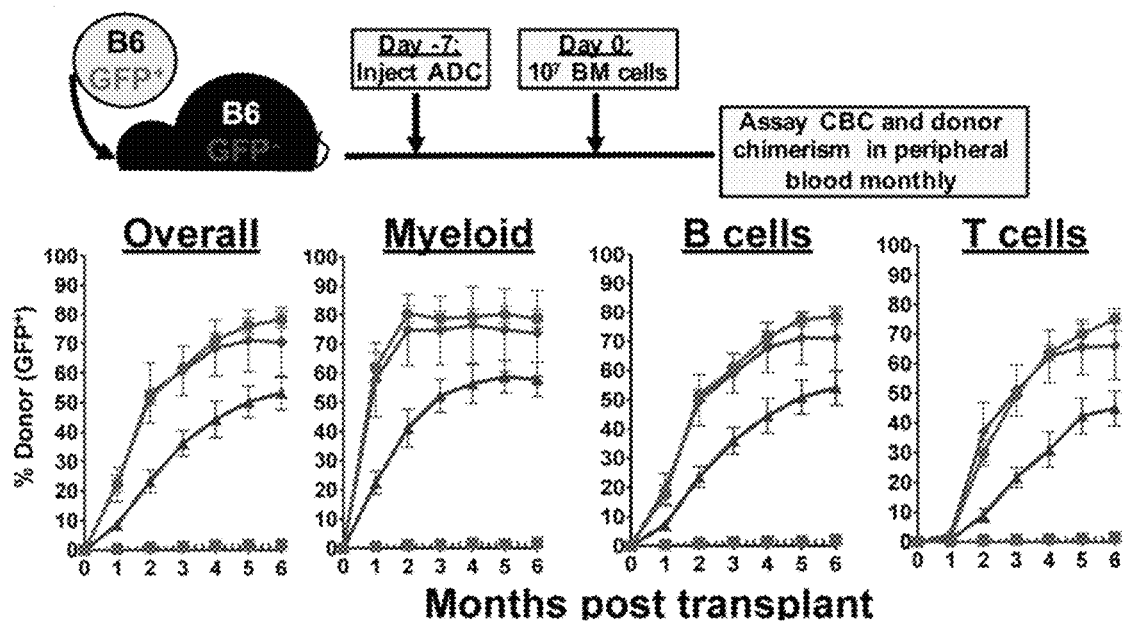
Figure 1D:
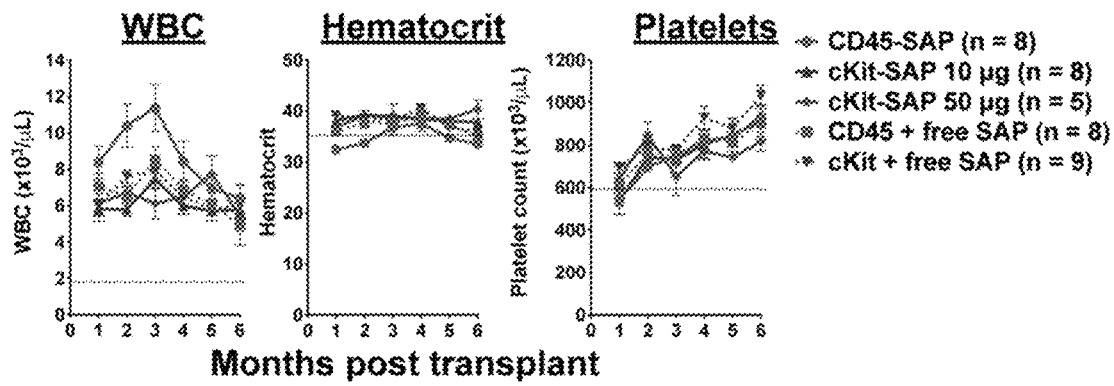
Figure 8A:
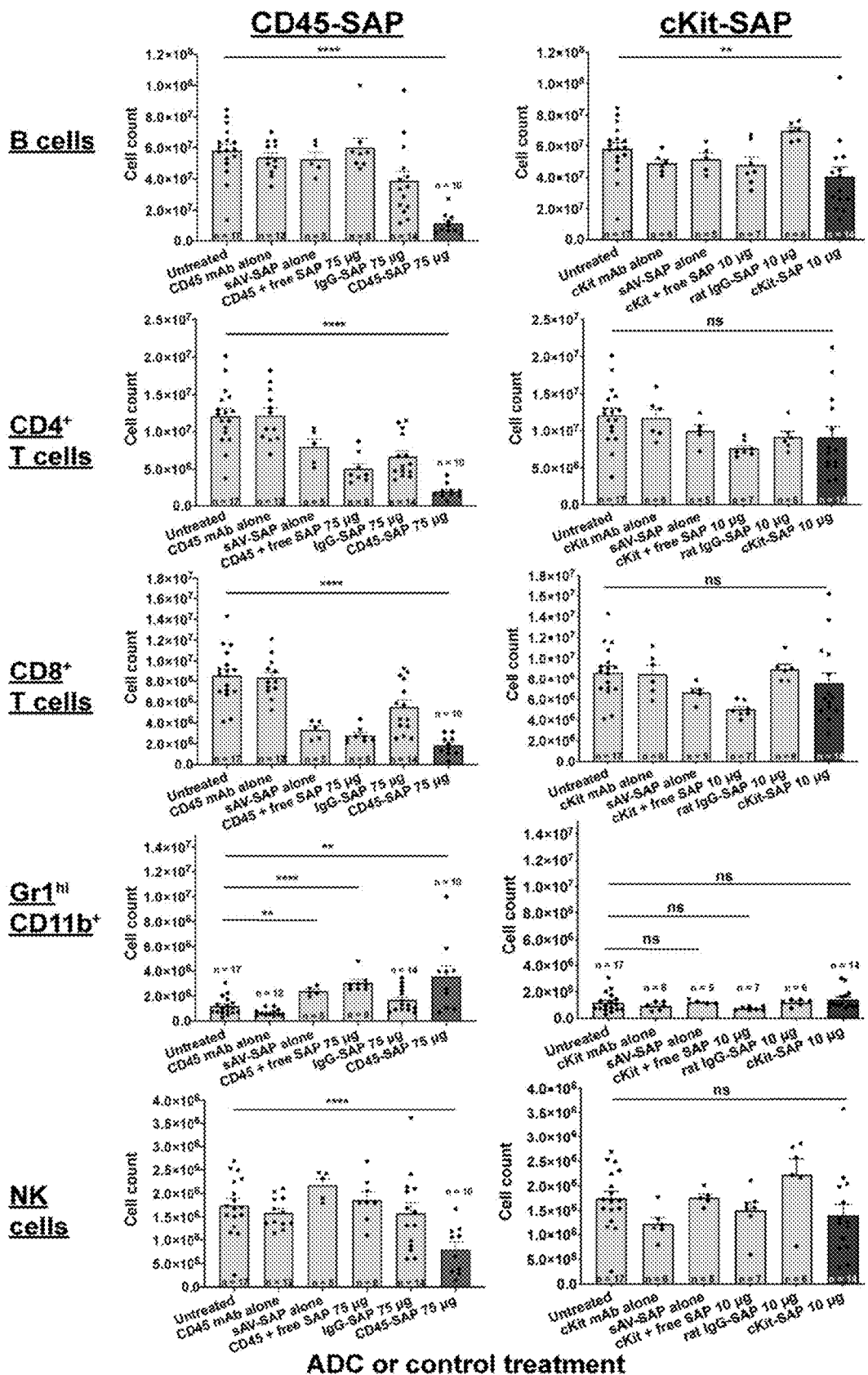
FIG. 8A-FIG. 8B. Acute hematologic effects of CD45-SAP and cKit-SAP conditioning. (A and B) Absolute leukocyte counts by subset in mouse spleen (A) and CBCs (B) 7 days after administration of CD45-SAP, cKit-SAP, or control ADCs. Dotted lines for the CBC assays indicate the lower reference limits; groups whose means were statistically below the lower reference limit are indicated. Please note that the same cohort of untreated mice was used to compare with mice in the CD45-SAP and cKit-SAP groups. Data points and error bars represent mean±SEM. For statistical comparisons: ns=not significant, *=p<0.05, =p<0.01, *=p<0.001, and ****=p<0.0001.
Figure 8B:
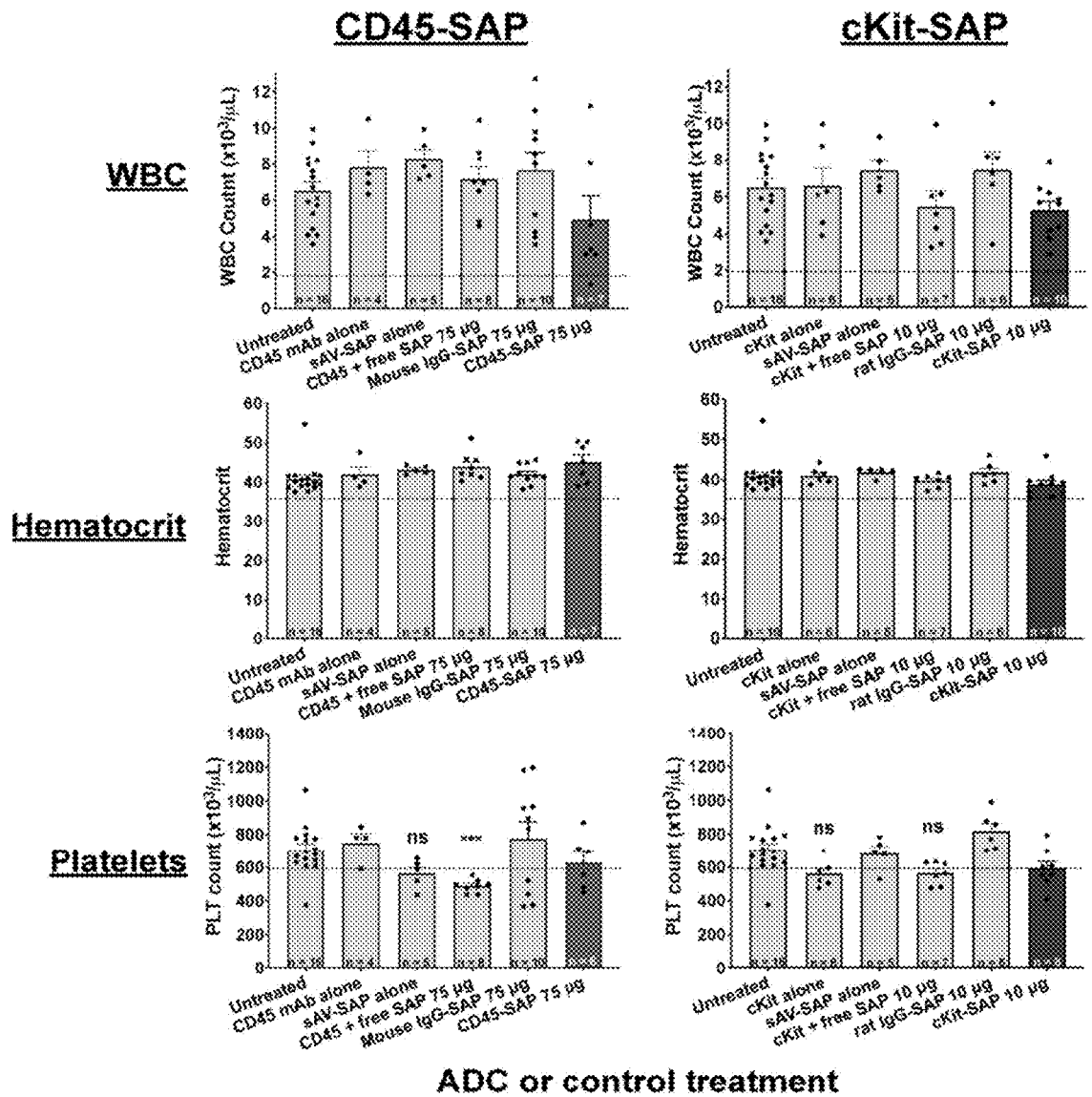

To evaluate saporin-conjugated CD45 and cKit antibodies as conditioning agents for allo-HSCT, their previously described abilities to deplete murine HSCs and promote syngeneic HSCT were compared. In vitro, CD45-SAP and cKit-SAP inhibited hematopoietic colony formation with picomolar-range IC50 values (see e.g., FIG. 1A). Both ADCs effectively depleted HSCs in vivo, as defined phenotypically (LSK CD48$^-$CD150$^+$) or by colony formation (see e.g., FIG. 1B). Importantly, HSC depletion required an intact ADC comprised of the relevant antibody linked to saporin; controls lacking either of these components were devoid of activity. As previously reported, CD45-SAP was strongly lymphodepleting, whereas cKit-SAP lacked this activity (see e.g., FIG. 8A). Notably, reduced CD4$^+$ and CD8$^+$ T cells and increased granulocytes were noted in control mice receiving sAV-SAP or IgG-SAP (see e.g., FIG. 8A). These effects were more pronounced in the CD45-SAP group, which received higher doses than the cKit-SAP group, possibly reflecting a dose-dependent effect of sAV-SAP itself. Finally, all ADC-treated mice had CBCs within the reference range (see e.g., FIG. 8B).

Figure 1E:
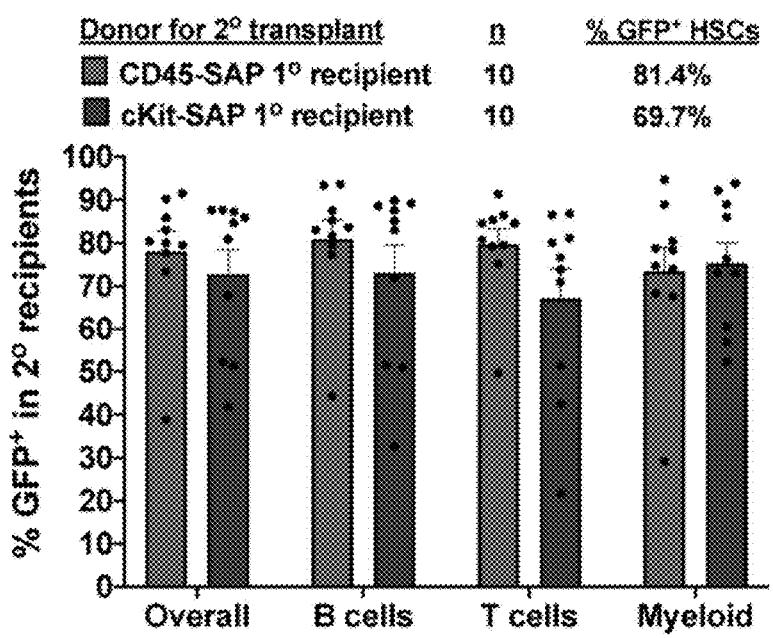
Figure 9A:
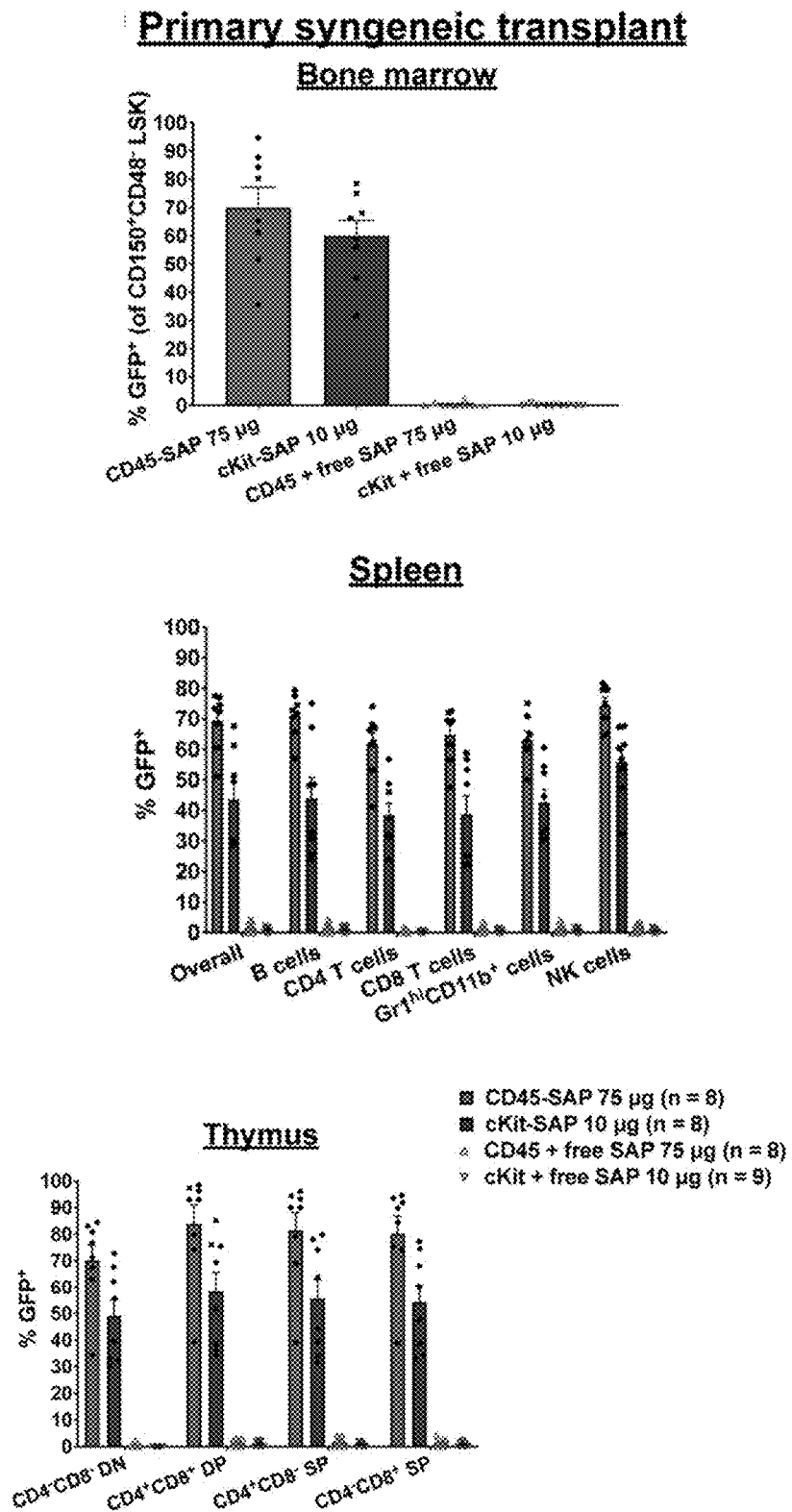
FIG. 9A-FIG. 9B. Donor engraftment in lymphoid organs of primary and secondary syngeneic HSCT. (A) Donor chimerism in bone marrow, spleen and thymus 6 months after primary syngeneic (B6-GFP→B6) HSCT; these data correspond to the peripheral blood donor chimerism data shown in FIG. 10. For thymus, DN=double negative. DP=double positive, SP=single positive. (B) Donor chimerism in bone marrow, spleen, and thymus 4 months after secondary transplantation of bone marrow obtained from B6-GFP→B6 primary recipients to a new cohort of lethally-irradiated B6 mice; these data correspond to the peripheral blood donor chimerism data shown in FIG. 1E. The percentages of primary recipient-derived, GFP+ HSC that were infused into the secondary recipients is provided. Data points and error bars represent mean±SEM.
Figure 9B:
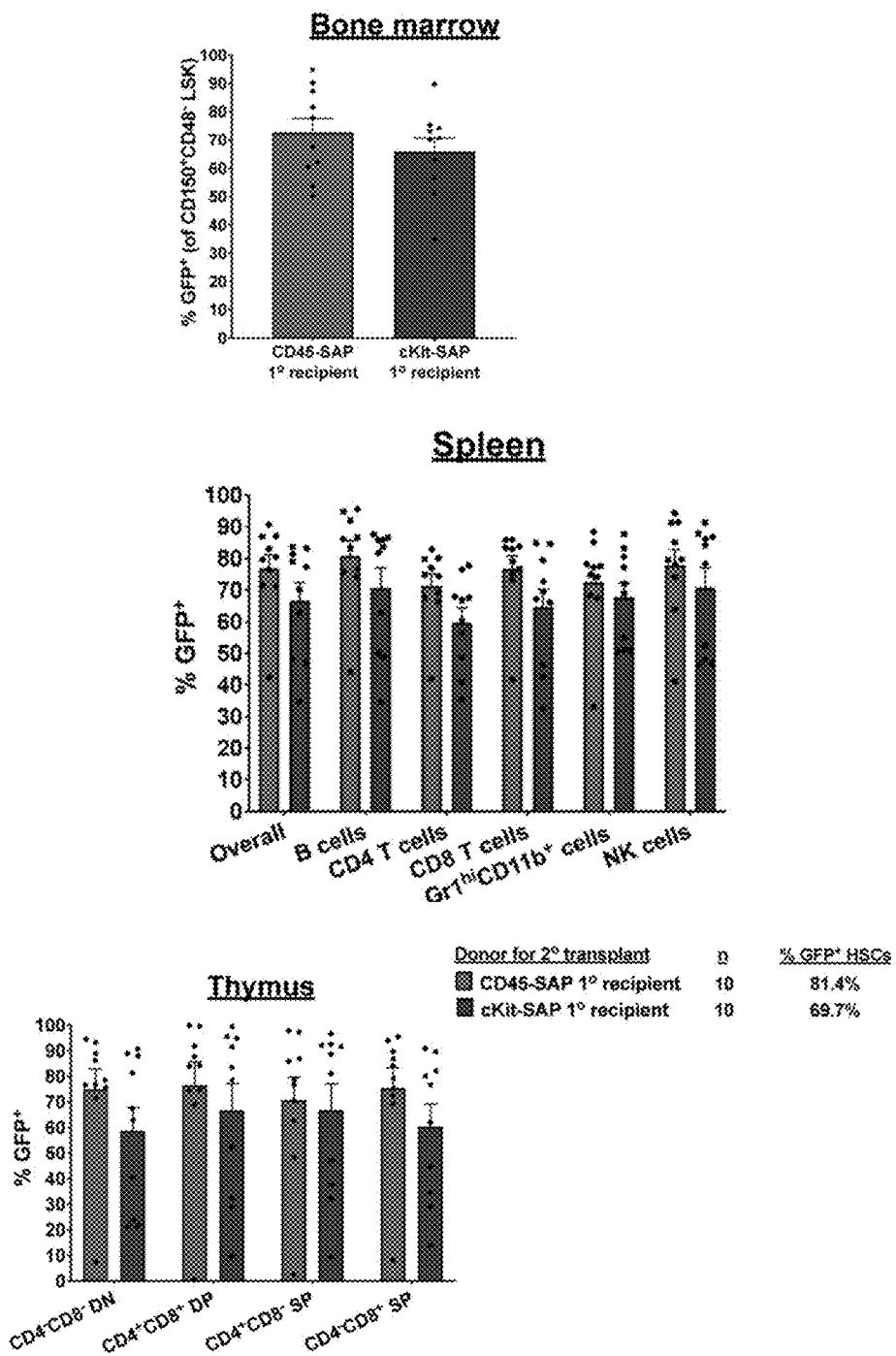
Figure 10:
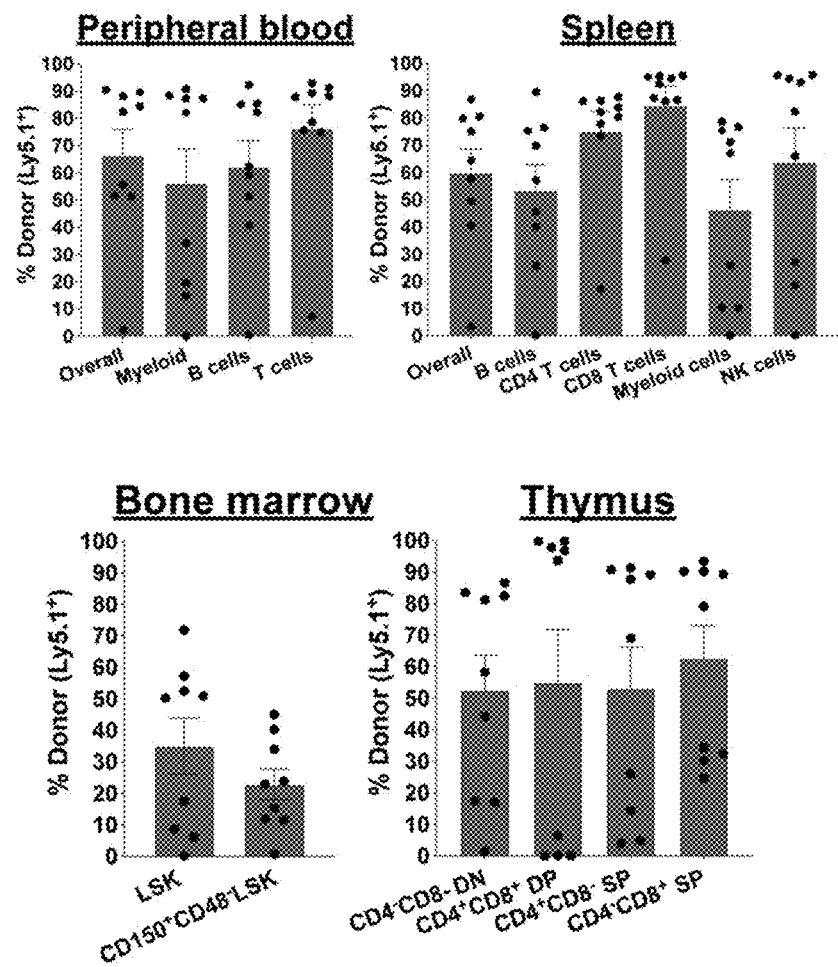
FIG. 10. Serial transplantation in CD45-SAP conditioned, miHA-mismatched alloHSCT. 107 whole bone marrow cells isolated from BALB/c-Ly5.1→DBA/2 mixed chimeras were infused to a new cohort of lethally-irradiated DBA/2 mice. The percentage of primary recipient-derived, Ly5.1+ HSCs that were transferred to secondary recipients was ~76%. Donor chimerism in peripheral blood, bone marrow, spleen, and thymus of secondary recipients were assessed at 4 months post-transplant. Data points and error bars represent mean±SEM of 9 mice from one experiment.

In a syngeneic HSCT model (B6-GFP→B6), 3 mg/kg CD45-SAP (75 µg) was well-tolerated and permitted stable, high-level donor engraftment comparable to that reported previously (see e.g., FIG. 10). Although cKit-SAP depleted HSCs as effectively as CD45-SAP, even when dosed at 0.4 mg/kg (10 µg), it was somewhat less effective at promoting engraftment. When the cKit-SAP dose was increased to 2 mg/kg (50 µg), donor engraftment of all lineages was equivalent to that seen with CD45-SAP. Donor chimerism in spleen, bone marrow and thymus mirrored that observed in peripheral blood (see e.g., FIG. 9A). Finally, successful serial transplantation of bone marrow from CD45-SAP and cKit-SAP conditioned primary transplant recipients confirmed that these primary recipients had engrafted functional HSCs (see e.g., FIG. 1E and FIG. 9B). Taken together, these studies confirm the efficacy of CD45-SAP and cKit-SAP as conditioning for HSCT in the absence of immunologic barriers.

CD45-SAP Plus In Vivo T Cell Depletion Enables Engraftment in miHA- and MHC-Mismatched Allo-HSCT To investigate the efficacy of ADCs for allo-HSCT conditioning, two transplant models were used (see e.g., FIG. 2A): a miHA-mismatched BALB/c-Ly5.1→DBA/2 model and a haploidentical CB6F1→B6 (F1-to-parent) model MHC-mismatched for H-2d in the host-versus-graft direction. CD45-SAP was chosen for conditioning in these studies to leverage its lymphodepleting activity to overcome graft rejection. However, CD45-SAP alone was insufficient to allow donor engraftment in either model, suggesting that stronger immunosuppression was necessary.

Figure 2A:
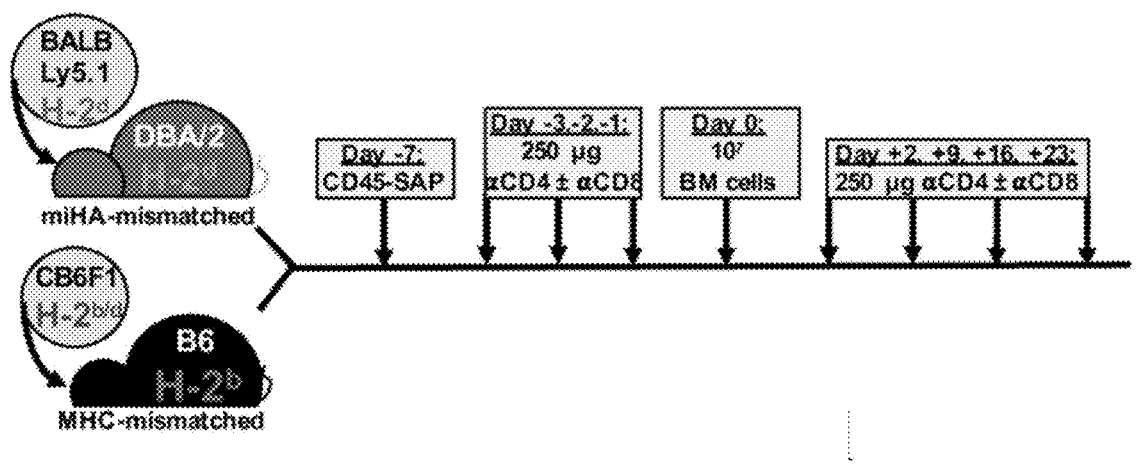
FIG. 2A-FIG. 2E. αβ T cell depletion in CD45-SAP conditioned mice permits engraftment in miHA- and MHC-mismatched allo-HSCT. (A) Schema for miHA- and MHC-mismatched allo-HSCT models utilizing CD4+ and CD8$^+$ T cell depletion (TCD) during the peritransplant period. (B and C) Peripheral blood donor chimerism for individual mice in the miHA-mismatched (B) and MHC-mismatched alloHSCT models (C). Overall donor chimerism in CD4/CD8 TCD mice was significantly higher than mice receiving isotype control (miHA-mismatched model: $p<0.0001$ all timepoints; MHC-mismatched model: $p<0.0001$ month 2, $p<0.01$ all other timepoints). Data point marked with "X" indicates mouse euthanized for severe head tilt unrelated to the experimental treatment. (D and E) Serial CBCs for miHA-(D) and MHC-mismatched (e) models. Data points and error bars in panels (D) and (E) represent mean±SEM. For statistical comparisons: ns=not significant, *=$p<0.05$, =$p<0.01$, *=$p<0.001$, ****=$p<0.0001$.
Figure 2B:
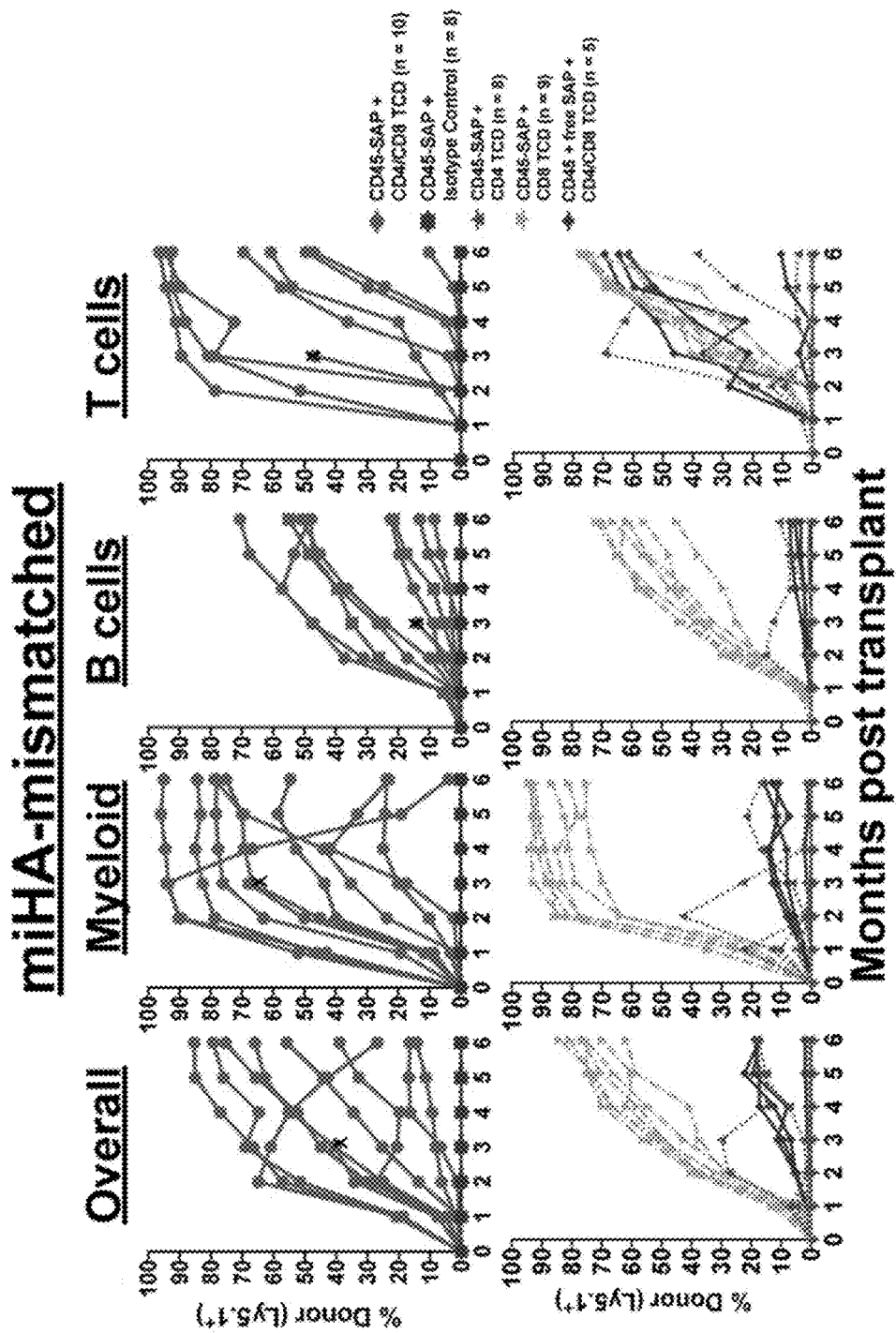

To achieve a fuller, sustained T cell ablation, CD45-SAP conditioned animals were treated with depleting CD4$^+$ and/or CD8$^+$ antibodies throughout the peritransplant period (see e.g., FIG. 2A). In the miHA model, while in vivo CD4$^+$ TCD did not permit significant engraftment, CD8$^+$ TCD was sufficient to observe engraftment in 7 of 9 recipient mice. In vivo CD4$^+$ and CD8$^+$ pan-TCD of CD45-SAP conditioned mice resulted in multilineage engraftment in all treated mice, albeit with significant variability in donor chimerism (see e.g., FIG. 2B). Serial CBCs showed stable counts in all lineages (see e.g., FIG. 2D). Gradual loss of donor chimerism was noted in only 1 of 10 pan-TCD mice with myeloid cells declining faster than the longer-lived B cells, a pattern suggestive of inability to engraft or maintain long-term HSCs. Some persistent, low-level donor engraftment, comprised mostly of T cells, was observed in pan-TCD mice conditioned with an inactive ADC. Finally, serial transplantation studies using marrow from CD45-SAP-conditioned, pan-TCD recipients confirmed that these mice engrafted functional donor-derived HSCs (see e.g., FIG. 10).

Figure 2C:
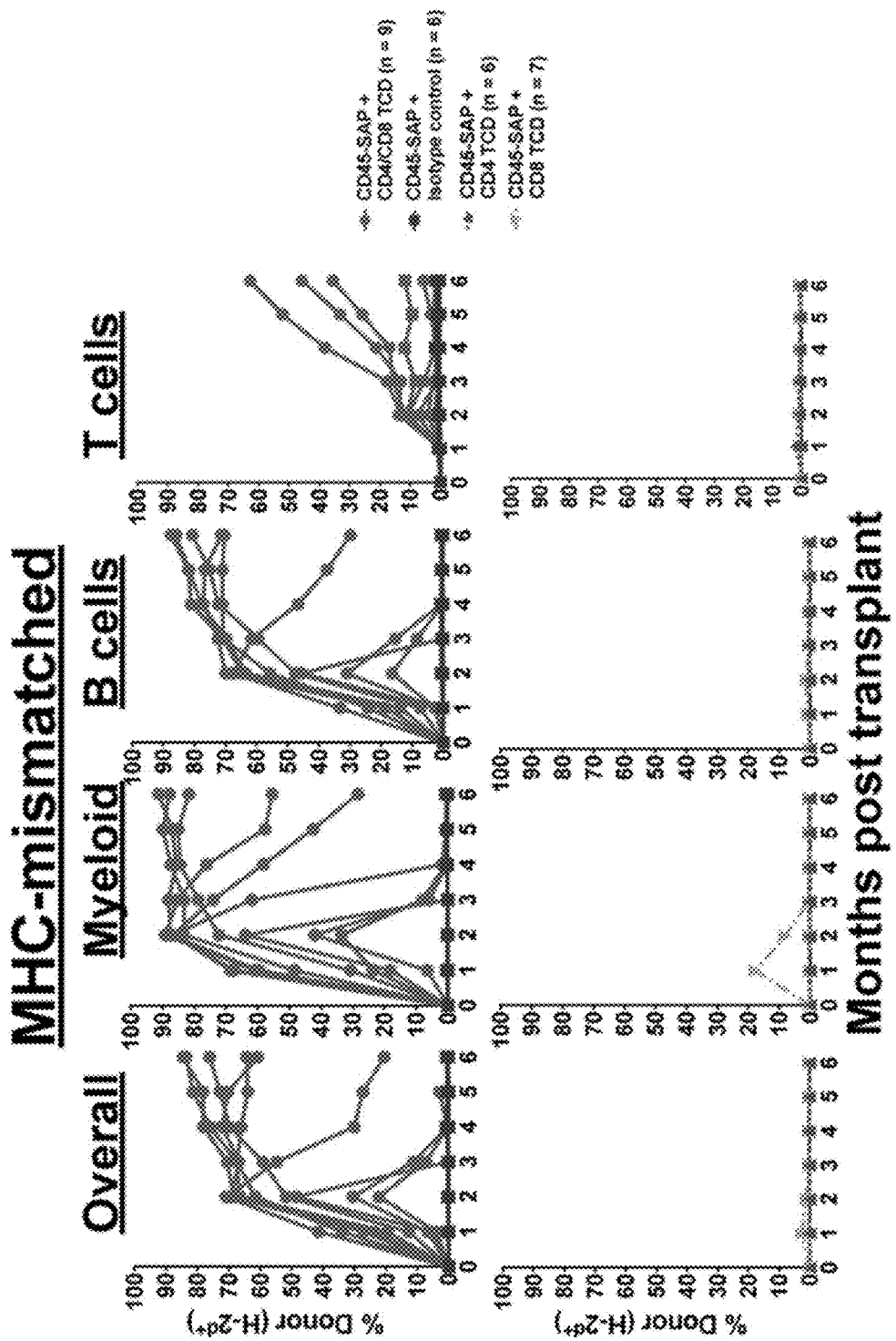
Figure 2D:
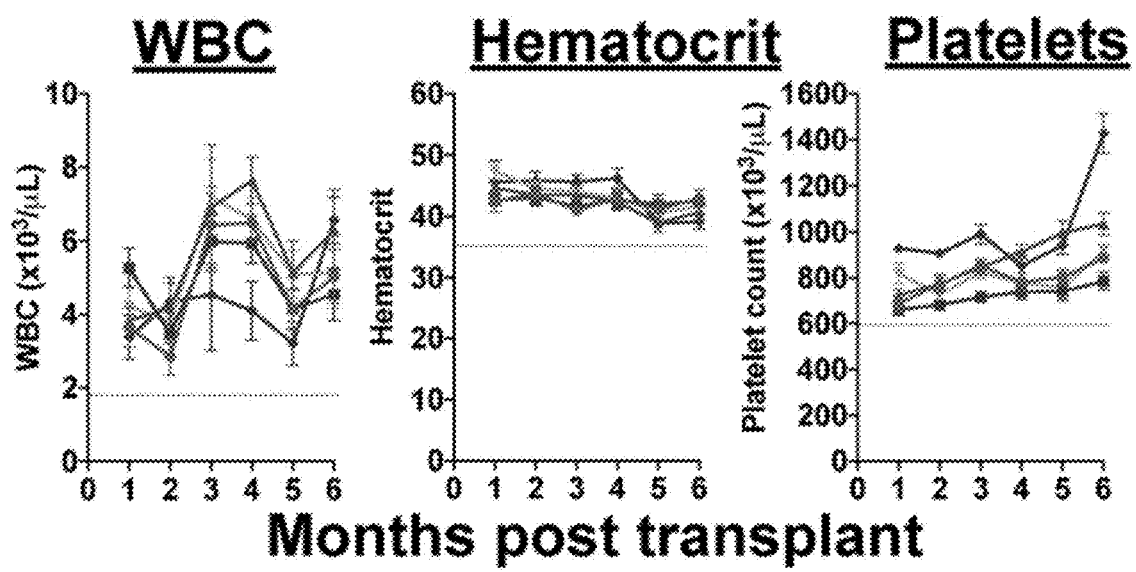
Figure 2E:
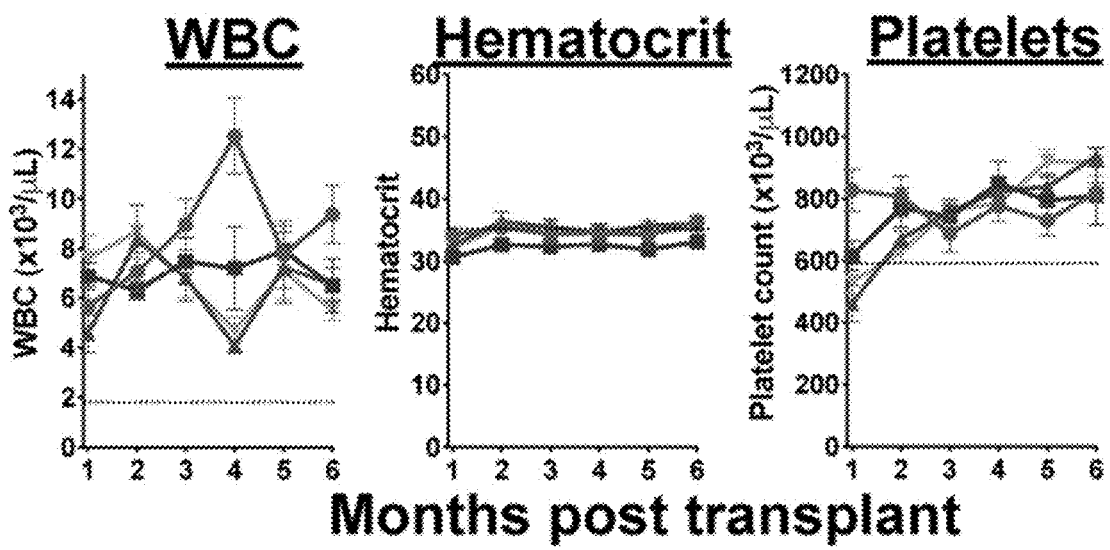

In the MHC-mismatched model, CD4$^+$ and CD8$^+$ pan-TCD was required for engraftment (see e.g., FIG. 2C). High-level donor chimerism of B cells and myeloid cells and lower T cell chimerism were routinely observed in this system. Although all pan-TCD animals developed donor chimerism in the first two months post-HSCT, 5 of 9 mice showed a gradual loss of donor-derived cells at later timepoints, similar in pace to that seen with one mouse in the miHA model. One recipient showed a sudden, multilineage loss of donor-derived cells, indicative of graft rejection. Serial CBCs were largely stable without any significant periods of post-transplant pancytopenia (see e.g., FIG. 2E).

Figure 11A:
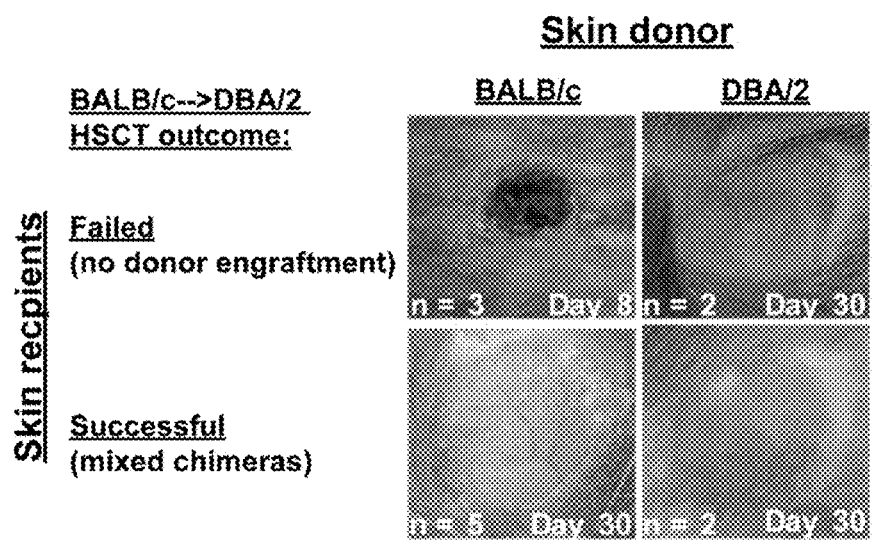
FIG. 11A-FIG. 11B. BALB/c→DBA/2 mixed chimeras are cross-tolerant to donor and recipient-derived antigen. (A) BALB/c or DBA/2 ear skin was surgically engrafted at 6 months post-HSCT to CD45-SAP-conditioned, BALB/c→DBA/2 recipients that had either rejected or successfully engrafted donor HSC. Skin grafts were monitored for 30 days for signs of rejection; inset text indicates the number of skin graft recipients analyzed across two experiments (lower left) and the time post-skin graft when images were acquired (lower right). (B) In vivo MLRs in which CFSE-labeled T cells from BALB/c-DBA/2 mixed chimeras were infused to new cohorts of BALB/c, DBA/2, or CB6F1 mice. The indicated numbers of recipient mice per group were analyzed across two experiments, with CFSE histograms from three representative mice per group presented.
Figure 11B:
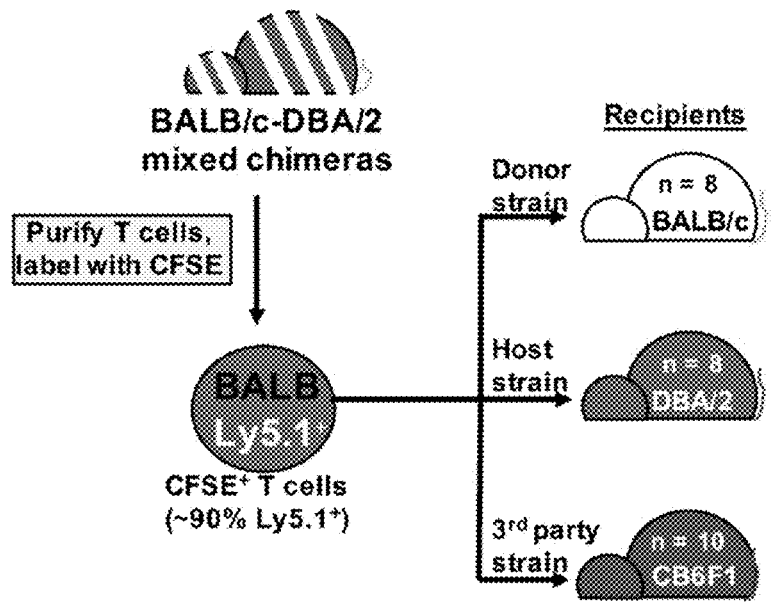
Figure 11B:
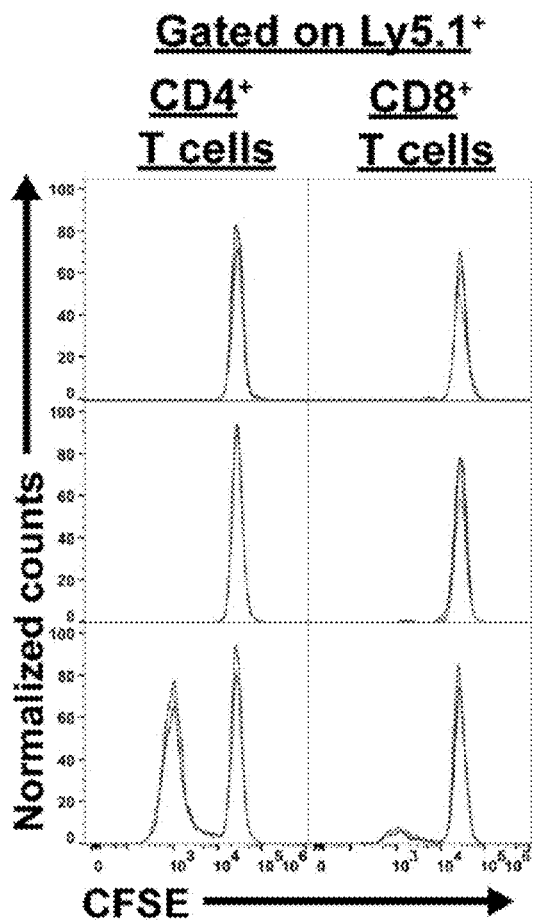

Although the miHA model has potential for bidirectional alloreactivity, no overt graft rejection or GvHD was observed in miHA-mismatched recipients. This suggested that donor and recipient-derived cells coexisted in stable mixed chimerism, a requirement for tolerance induction for SOT. To directly test for allotolerance, BALB/c or DBA/2 skin was surgically grafted into BALB-DBA mixed chimeric mice (see e.g., FIG. 11A). Whereas DBA/2 mice that failed to engraft BALB/c HSCs rejected BALB/c skin by 2 weeks post-implantation, BALB-DBA chimeras were tolerant to BALB/c and DBA/2 skin grafts. As a secondary test, CFSE-labeled T cells were adoptively transferred from BALB-DBA chimeras to new cohorts of BALB/c, DBA/2 or CB6F1 mice (see e.g., FIG. 11B). Ninety percent of the transferred T cells were Ly5.1+(donor-derived cells from BALB/c-CD45.1 mice) and did not proliferate when infused into either BALB/c or DBA/2 mice. However, these cells proliferated robustly upon infusion into CB6F1 mice heterozygous for the foreign H-2b haplotype. Taken together, these results verify that the mixed chimeric mice develop cross-tolerance to donor and recipient tissue.

CD45-SAP Combined with the JAK1/JAK2 Inhibitor Baricitinib Promotes Multilineage Engraftment in Allo-HSCT Recipients without In Vivo T Cell Depletion These studies using in vivo TCD in miHA- and MHC-mismatched allo-HSCT provide proof-of-principle evidence that ADC-based conditioning regimens can permit engraftment provided that immune barriers are sufficiently suppressed. However, the variability of donor chimerism observed, the high incidence of graft loss, and the potential risk of opportunistic infections, would limit the clinical utility and translatability of a strategy requiring prolonged TCD. Therefore, it was sought to refine the ADC-based allo-HSCT conditioning regimens with these issues in mind.

Figure 12A:
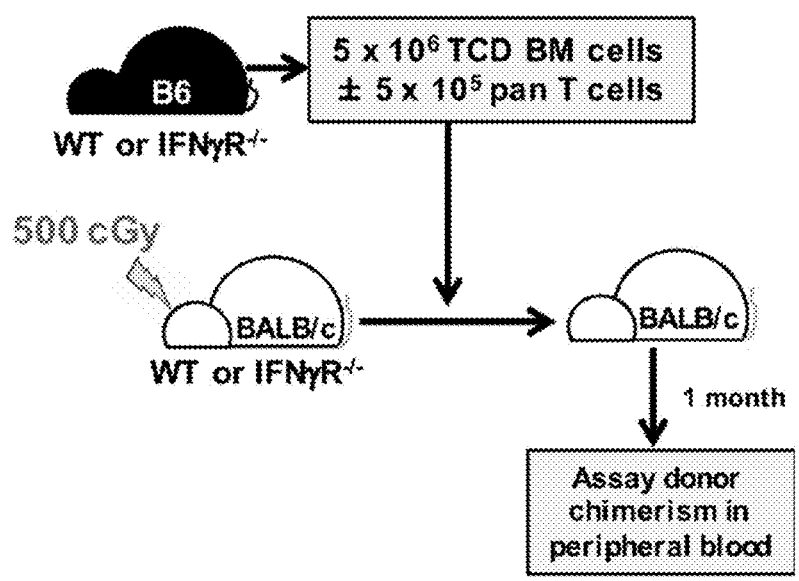
FIG. 12A-FIG. 12B. Deficiency of IFNγ signaling permits engraftment of fully-mismatched HSC in a model of reduced-intensity alloHSCT. (A) Schema for reduced-intensity conditioning HSCT model in which WT or IFNγR–/– BALB/c recipients were sublethally irradiated then transplanted with bone marrow with or without T cells from WT or IFNγR–/– B6 mice. (B) Peripheral blood chimerism at 1 month post-HSCT. Results are pooled from three independent experiments; the frequency of mice in each group with greater than 50% donor chimerism is indicated above each dataset. For statistical comparisons, *=p<0.05, =p<0.01, *=p<0.001, and ****=p<0.0001.
Figure 12B:
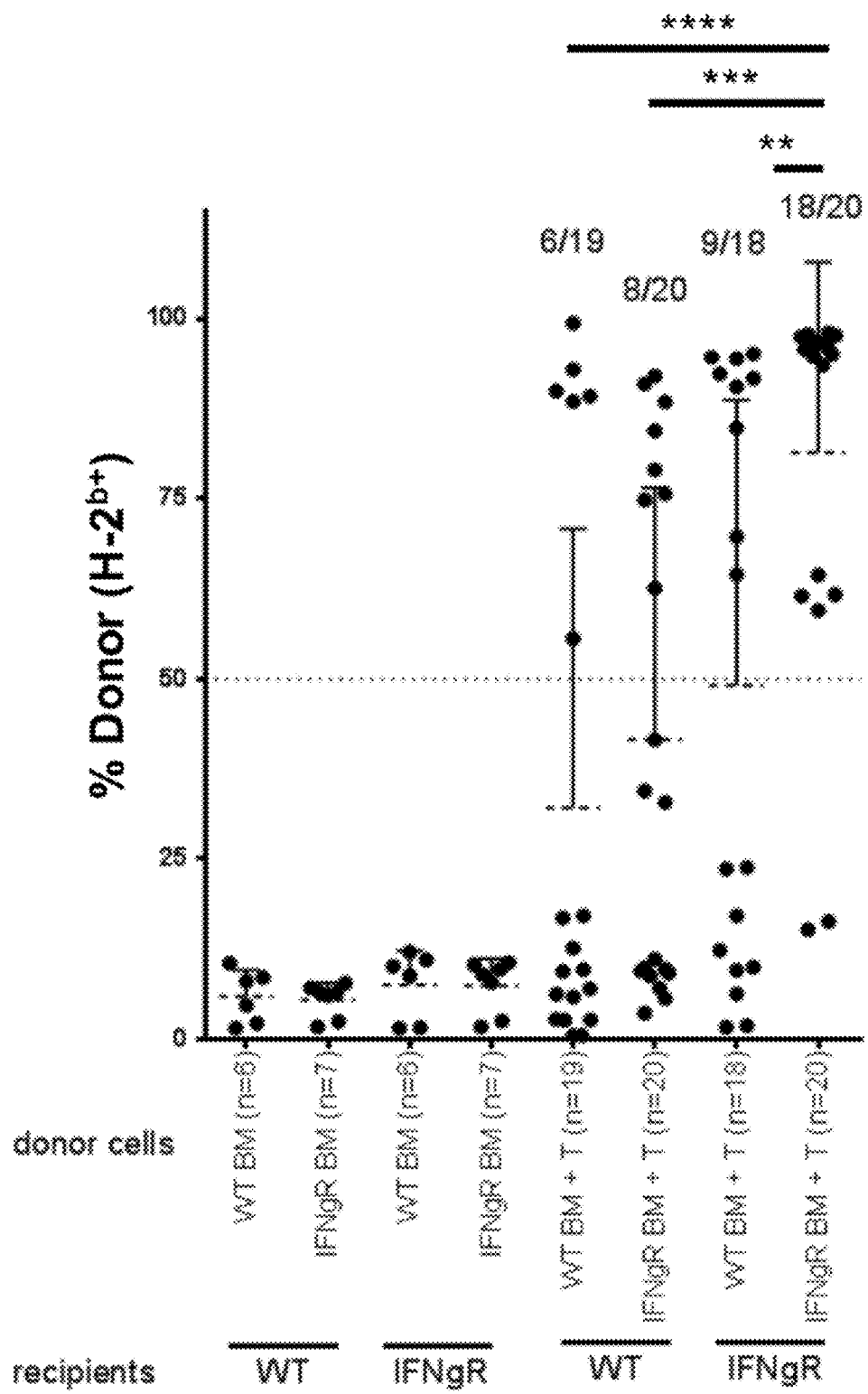

Prior work demonstrated that the selective JAK1/2 inhibitor, baricitinib, prevents and even reverses established GvHD, while enhancing GvL effects. The complete prevention of GvHD seen with baricitinib phenocopied that seen in IFNγR-deficient mice treated with αIL-6R, implicating these cytokines' signaling pathways as important targets of baricitinib effect. Interestingly, mice that received baricitinib showed somewhat improved donor chimerism, although this was in lethally-irradiated mice with donor chimerism already near 100%. However, in a fully-mismatched allo-HSCT model utilizing sublethal irradiation for conditioning (see e.g., FIG. 12A-FIG. 12B), IFNγR deficiency in donor and/or recipient cells markedly improved donor chimerism.

This result suggested that disabling IFNγR permitted engraftment in the context of reduced-intensity conditioning. It was hypothesized that baricitinib, which also blocks IFNγR signaling, may promote engraftment in allo-HSCT when combined with CD45-SAP.

Figure 3A:
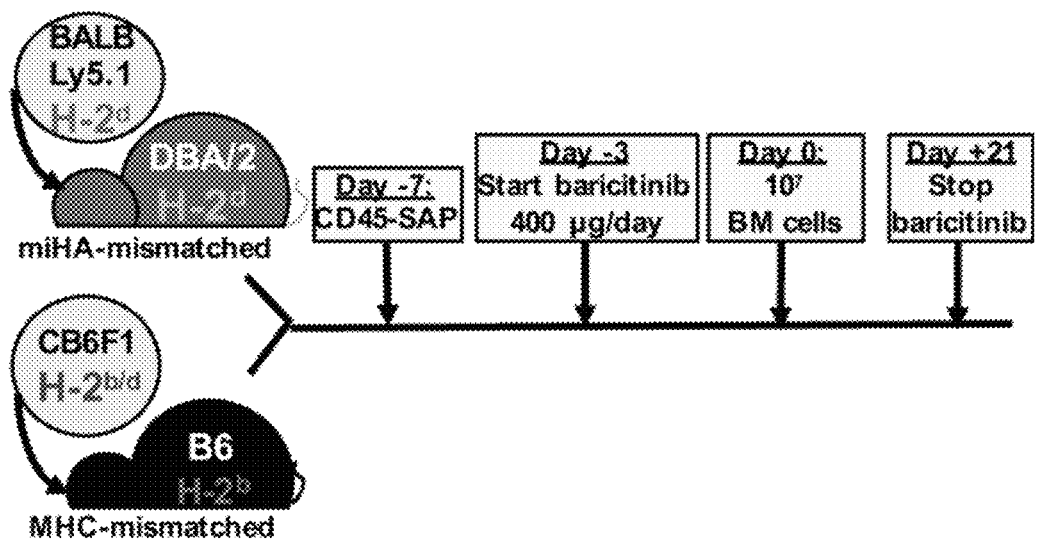
FIG. 3A-FIG. 3E. The selective JAK1/2 inhibitor baricitinib permits engraftment in CD45-SAP conditioned mice. (A) Schema for baricitinib and CD45-SAP treatment in the miHA- and MHC-mismatched allo-HSCT models. (B and C) Peripheral blood donor chimerism for individual mice in the miHA-mismatched (B) and MHC-mismatched (C) models. Differences between baricitinib and vehicle groups were statistically significant at all timepoints in the miHA model ($p<0.001$ at month 3, $p<0.01$ all other timepoints) and at month 1 only in the MHC-mismatched model ($p<0.01$). (D) Schema and results for MHC-mismatched HSCT combining CD45-SAP, daily baricitinib, and pre-transplant TCD. Differences between baricitinib and vehicle groups were statistically significant at all timepoints ($p<0.05$ months 1-2, $p<0.01$ months 3-6). Data point marked with "X" indicates mouse euthanized early to assess rapid loss of donor engraftment. (E) Schema and results for MHC-mismatched HSCT combining CD45-SAP conditioning with continuously-infused JAK1/2 inhibitors. Differences between baricitinib and vehicle groups were significant at all timepoints ($p<0.001$ months 1-4; $p<0.01$ months 5-6); differences between ruxolitinib and vehicle groups were significant at months 1 and 2 ($p<0.0001$ and $p<0.001$, respectively). Data point marked with "X" indicates mouse death one week prior to collection of final timepoint. Insets represent the numbers of successfully engrafted mice at t=6 months. For statistical comparisons: ns=not significant, *=$p<0.05$, =$p<0.01$, *=$p<0.001$, ****=$p<0.0001$.
Figure 3B:
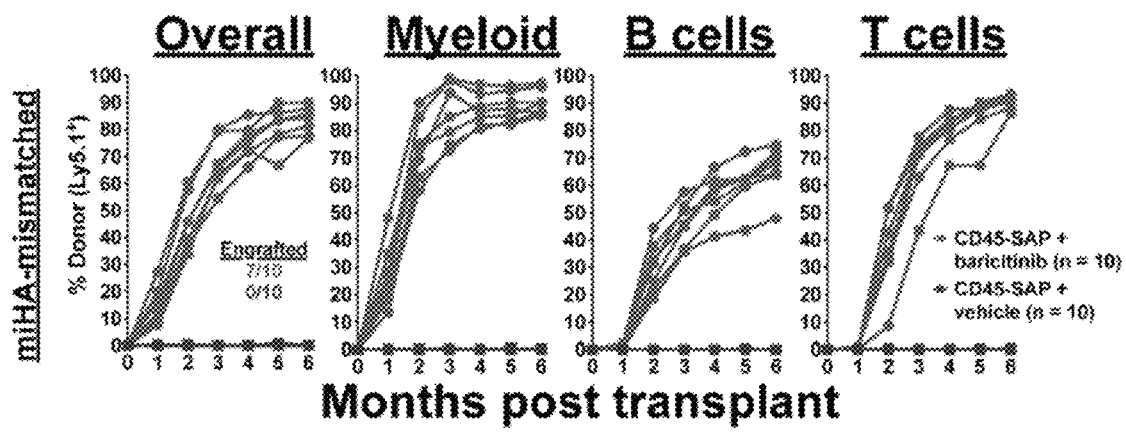
Figure 3C:
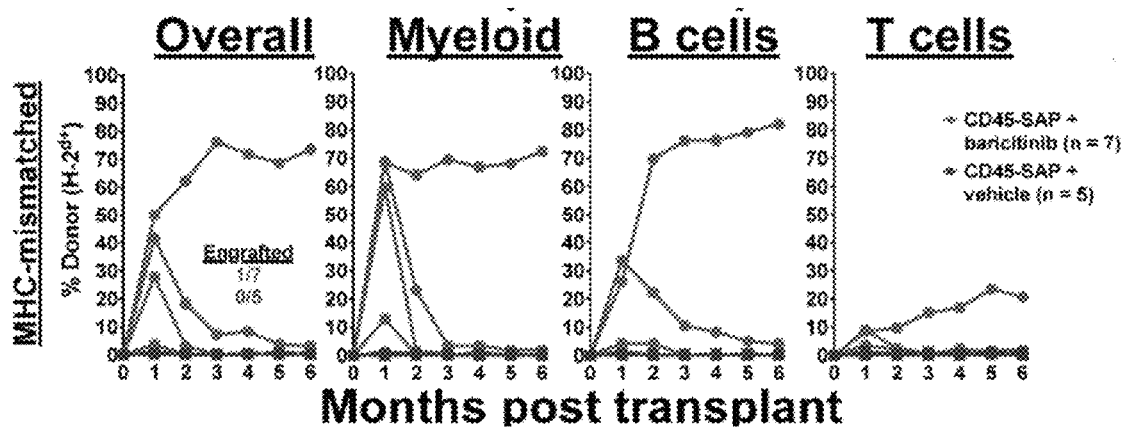

Therefore, baricitinib was tested in the miHA- and MHC-mismatched allo-HSCT models, first using it in lieu of TCD (see e.g., FIG. 3A). CD45-SAP conditioning plus daily baricitinib administered during the peritransplant period was highly effective in the miHA-mismatched model (see e.g., FIG. 3B). Seven of 10 mice engrafted, all of which showed stable multilineage donor chimerism of ~80% overall. In the MHC-mismatched model, however, daily baricitinib treatment plus CD45-SAP led to donor chimerism in four of seven mice that was stable in only one of those four (see e.g., FIG. 3C). Thus, while daily baricitinib treatment was effective at overcoming immune barriers in miHA-mismatched allo-HSCT, it was ineffective in the MHC-mismatched setting.

Figure 3D:
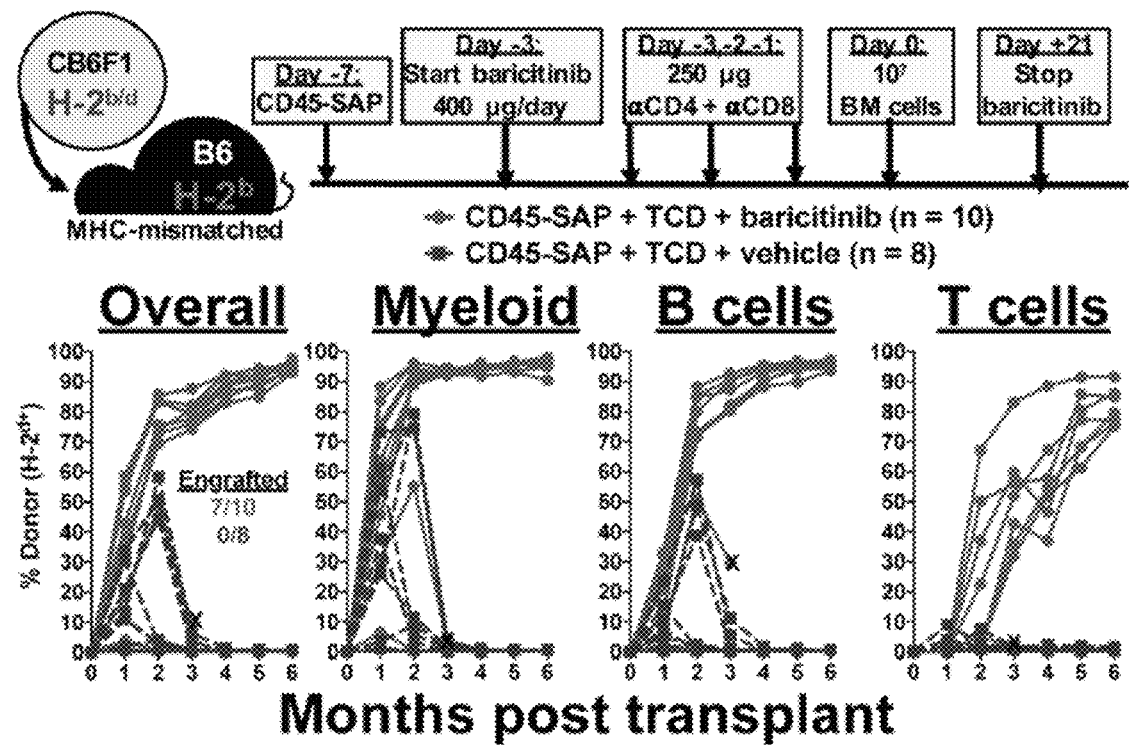

Since T cells comprise the major barrier to engraftment in the both miHA- and MHC mismatched models, failed engraftment in mice receiving baricitinib daily likely reflects insufficient host T cell immunosuppression to prevent rejection. It was reasoned that reducing the strength of the alloresponse by other means may improve baricitinib efficacy. Therefore, CD45-SAP and daily baricitinib therapy were combined with pre-transplant pan-TCD, essentially substituting in baricitinib for post-transplant TCD (see e.g., FIG. 3D). This regimen was highly effective, achieving stable engraftment in 7 of 10 mice, with overall donor chimerism>90%. The donor chimerism in all lineages, particularly T cells, was superior to that seen with baricitinib or pan-TCD alone. By contrast, mice receiving vehicle instead of baricitinib engrafted temporarily but experienced graft failure or rejection by three months post-HSCT.

Figure 13:
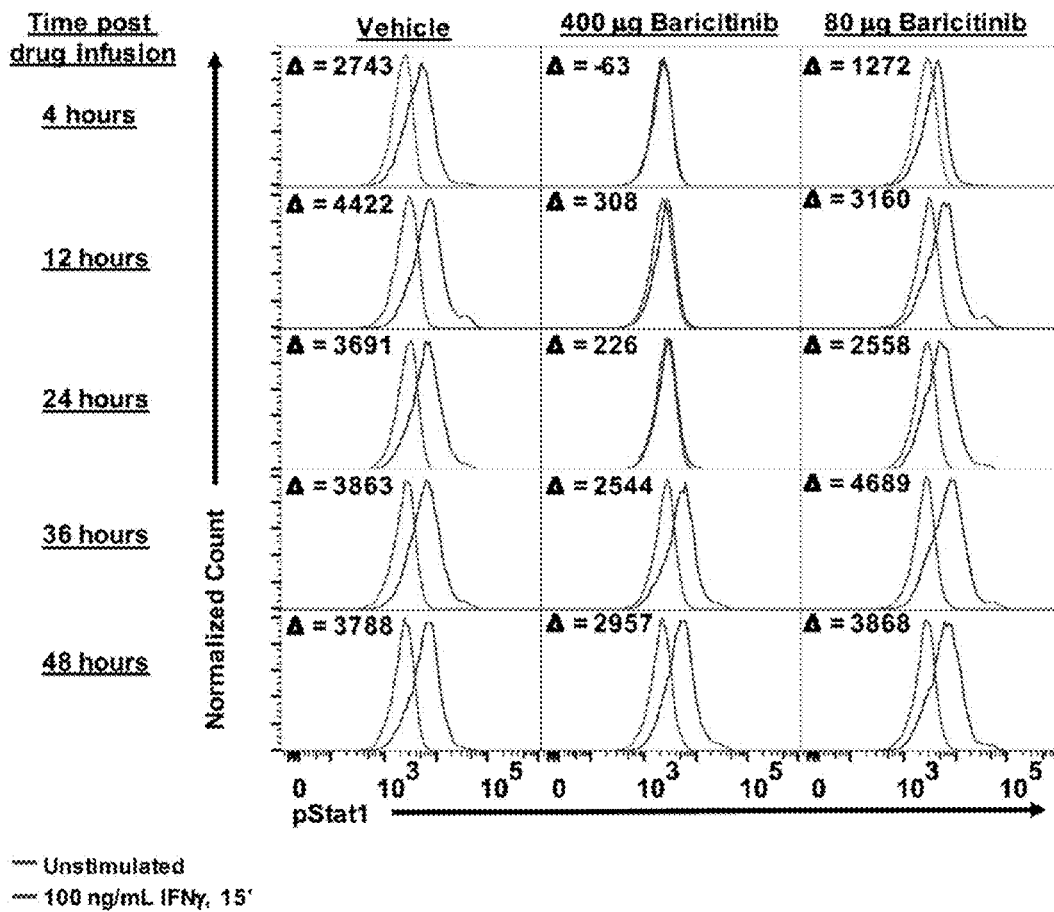
FIG. 13. Pharmacodynamics of subcutaneously-administered baricitinib. B6 mice received a single subcutaneous injection of baricitinib (400 μg or 80 μg) or vehicle, and Stat1 phosphorylation of whole blood leukocytes (CD45+ gated) in response to IFNγ stimulation (100 ng/mL, 15 minutes) was assayed at the indicated times post-drug infusion. Data from a single mouse in each treatment group are displayed and are representative of 2 (vehicle group) or 4 (baricitinib groups) mice analyzed over two experiments. Inset numbers are the difference in MFI between IFNγ-stimulated and unstimulated samples.

Pharmacokinetics may also have impacted the efficacy of baricitinib monotherapy in MHC-mismatched HSCT. Data from a prior study showed that subcutaneous baricitinib has a plasma half-life in B6 mice of approximately one hour, suggesting a prolonged absence of circulating drug if dosed every 24 hours. To test the duration of baricitinib effect, a pharmacodynamic study was conducted in which mice received a single baricitinib dose, then were followed over time with a whole blood assay for IFNγ-induced Stat1 phosphorylation (see e.g., FIG. 13). Baricitinib at 400 μg completely suppressed Stat1 phosphorylation at 4 hours post-infusion, an effect that was diminished slightly at 12 and 24 hours and absent by 36 hours. By comparison, 80 μg baricitinib provided only partial suppression at 4 hours post-infusion that was absent at later timepoints.

Figure 14A:
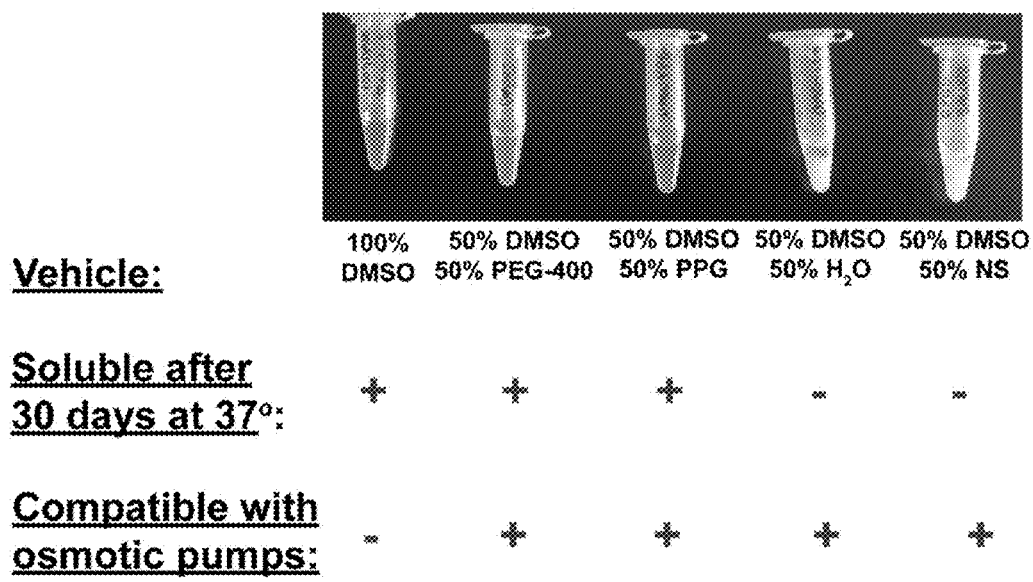
FIG. 14A-FIG. 14C. Baricitinib is compatible with in vivo drug delivery via osmotic pump. (A) Solubility testing of baricitinib (70 mg/mL) in various test solvents after 30 days incubation at 37° C. Vehicle compatibility is as per the manufacturer. PEG=polyethylene glycol, PPG= polypropylene glycol, NS=normal saline (0.9% NaCl). (B) Baricitinib in 50% DMSO/50% PEG-400 that had been incubated at 37° C. for 30 days was then tested for inhibitory activity against IL-6-induced Stat3 phosphorylation in human peripheral blood CD4$^+$ T cells. (C) B6 mice implanted with baricitinib- or vehicle-loaded osmotic pumps were assayed immediately prior to HSCT (four days post-pump implantation) for IFNγ-induced Stat1 phosphorylation using a whole blood assay.
Figure 14B:
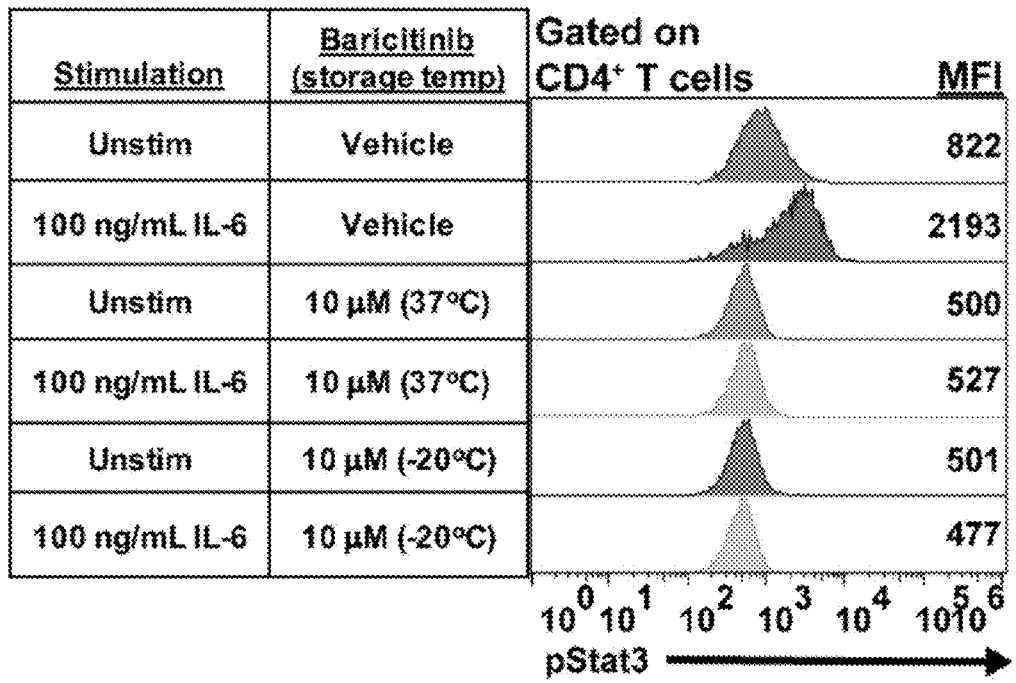
Figure 14C:
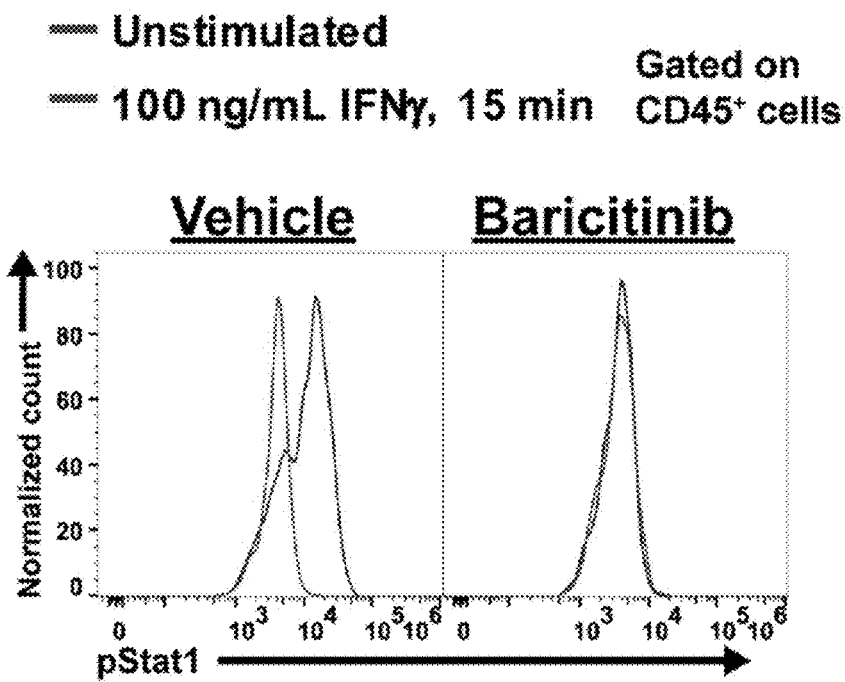

It was hypothesized that a continuous presence of baricitinib would provide more sustained immunosuppression. Therefore, the same 400 μg daily dose of baricitinib was administered continuously via subcutaneous osmotic pumps. Baricitinib was readily soluble in DMSO mixed 1:1 with PEG-400 (see e.g., FIG. 14A), and remained soluble and bioactive in this vehicle after a 30-day incubation at 37° C. (see e.g., FIG. 14B). Peripheral blood leukocytes from B6 mice implanted with baricitinib-loaded pumps showed impaired Stat1 phosphorylation in response to IFNγ, confirming drug release in vivo (see e.g., FIG. 14C).

Figure 3E:
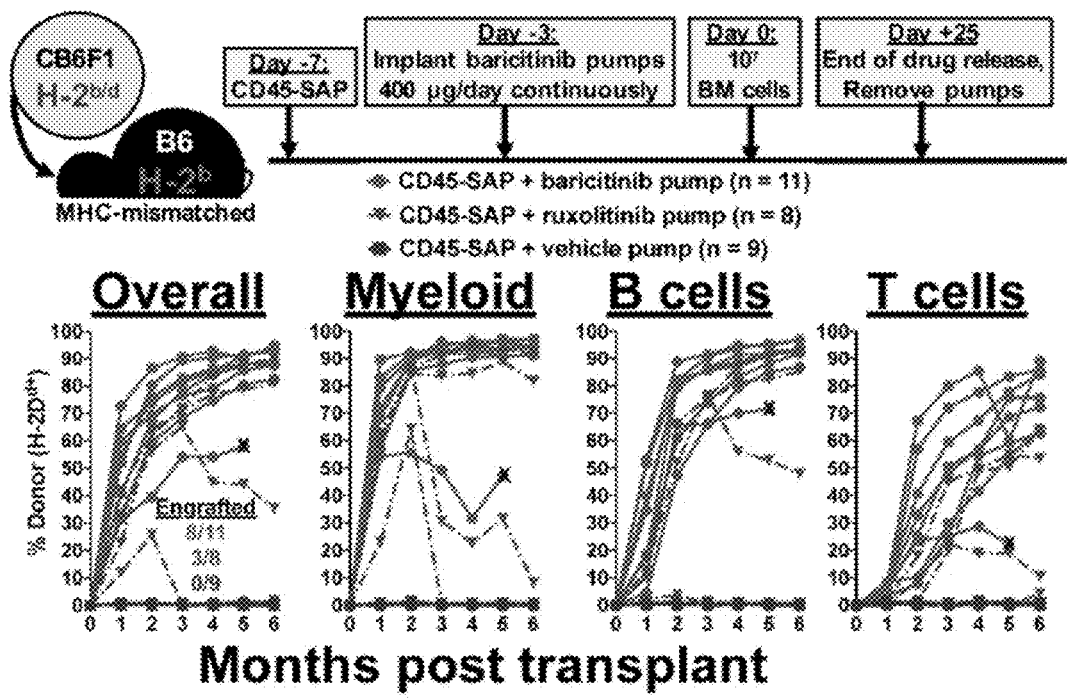
Figure 15:
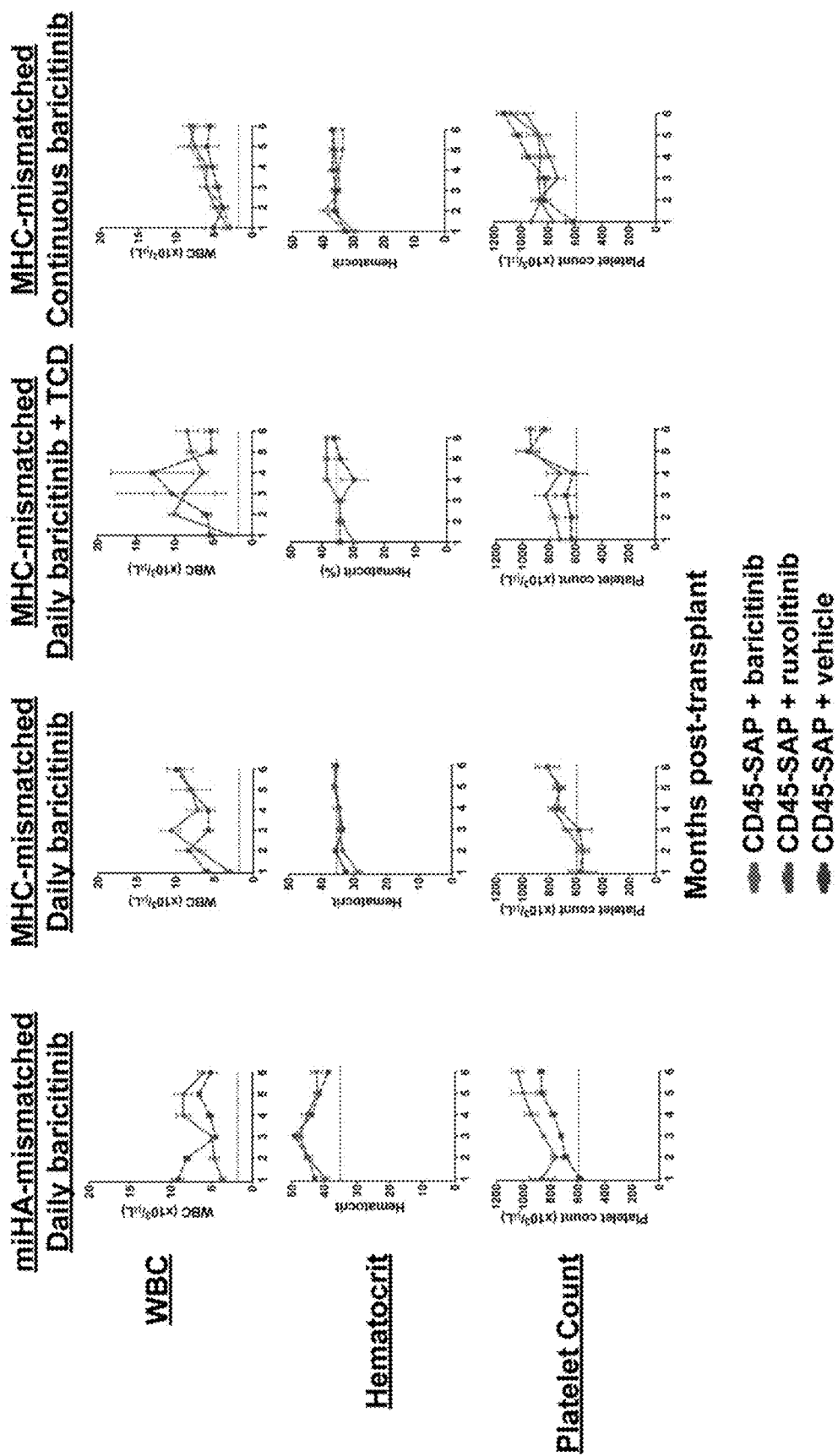
FIG. 15. Complete blood counts in allo-HSCT models conditioned with CD45-SAP and JAK1/2 inhibitors. CBC data for miHA- and MHC-mismatched alloHSCT models dosed daily with baricitinib (first and second columns from left), MHC-mismatched alloHSCT receiving pre-transplant CD4$^+$ and CD8$^+$ TCD plus daily baricitinib (third column), and MHC-mismatched alloHSCT receiving continuously-infused baricitinib via osmotic pump (fourth column) are shown. Dotted lines indicate the lower reference limits for the CBC assays.

Continuously-infused baricitinib (see e.g., FIG. 3E) was more effective than daily baricitinib (see e.g., FIG. 3C) in promoting multilineage engraftment in MHC-mismatched allo-HSCT, achieving >80% overall donor chimerism in 8 of 11 mice. This appeared to be a class effect of JAK1/2 inhibitors, as the related inhibitor ruxolitinib also permitted engraftment, albeit less effectively than baricitinib. As was consistently observed in the MHC-mismatched model when JAK inhibitors were dosed daily, mice with baricitinib pumps developed a mild anemia at the earliest time points which corrected by the later timepoints; otherwise, CBCs were at or above the lower reference limit (see e.g., FIG. 15).

Taken together, these studies demonstrate multiple effective, feasible strategies using CD45-SAP and JAK1/2 inhibitors to achieve high-level donor chimerism in both miHA- and MHC-mismatched allo-HSCT without prolonged, global T cell ablation.

Figure 4A:
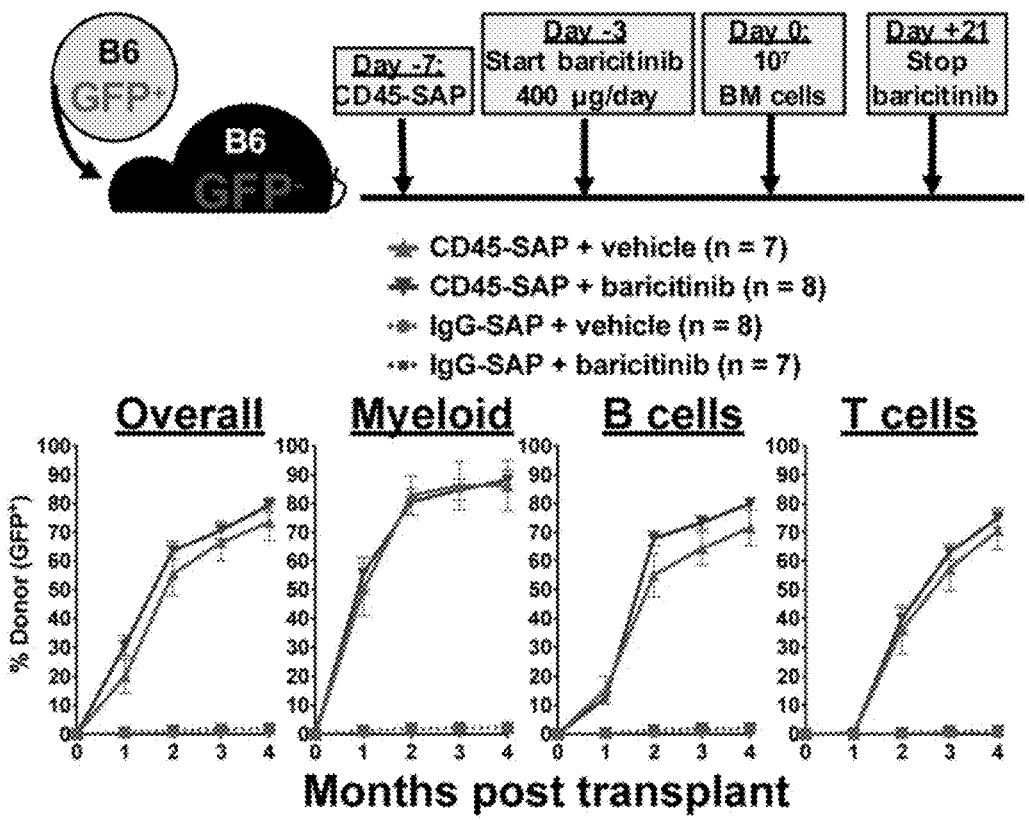
FIG. 4A-FIG. 4E. Baricitinib suppresses T cell function and viability, and minimally impacts syngeneic HSCT. (A) Schema and results for syngeneic HSCT model in which recipients were conditioned with CD45-SAP or inactive ADC with or without daily baricitinib injections. (B) Donor chimerism in spleen and bone marrow of mice from panel (A). (C) In vitro expansion of αCD3-stimulated (1 µg/mL, 72 hours), CFSE-labeled B6 T cells in the presence of varying concentrations of baricitinib. (D) Proliferation and viability of cultures in (C). (E) Cytokines present in supernatants collected from cultures described in (C) after 24 hours incubation. For (C-E), data from three technical replicates are shown from one representative of four experiments. For all panels, data points and error bars represent mean±SEM. For statistical comparisons: ns=not significant, *=$p<0.05$, =$p<0.01$, *=$p<0.001$, ****=$p<0.0001$.
Figure 4B:
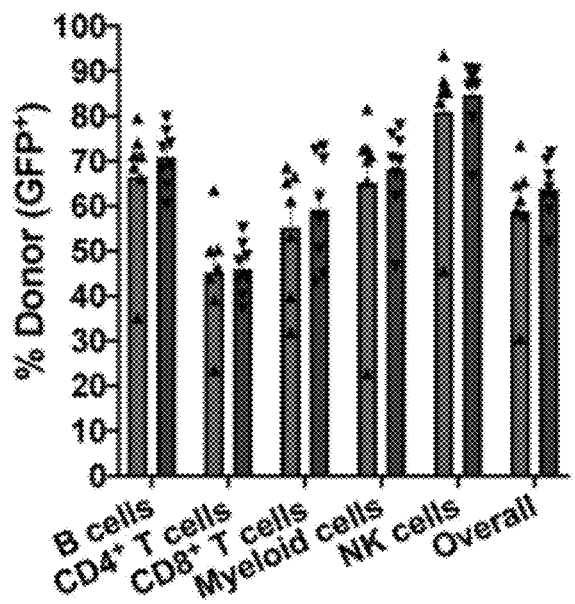
Figure 4B:
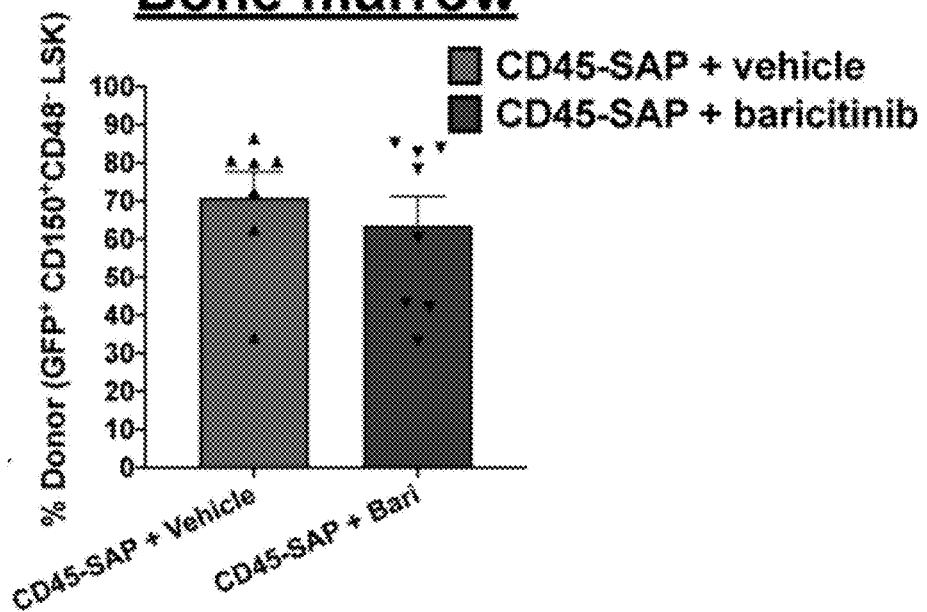

Baricitinib Promotes Engraftment Via Suppression of T and NK Cell-Mediated Rejection Next the mechanisms by which baricitinib promotes engraftment in allo-HSCT were pursued. While it was hypothesized that suppression of T cell alloreactivity is an important component, disruption of JAK1/2 signaling may impact engraftment in other ways, such as direct effects on donor hematopoiesis. To investigate the degree to which immunosuppression versus other mechanisms contributes to engraftment, baricitinib was applied to CD45-SAP-conditioned syngeneic HSCT, in which immune barriers to engraftment are absent. In peripheral blood and lymphoid organs (see e.g., FIG. 4A and FIG. 4B), no significant difference in donor chimerism was observed between CD45-SAP-conditioned mice receiving baricitinib versus vehicle. Importantly, no engraftment was observed in baricitinib-treated mice conditioned with inactive ADC, indicating that baricitinib alone cannot make space for donor HSCs.

Figure 16A:
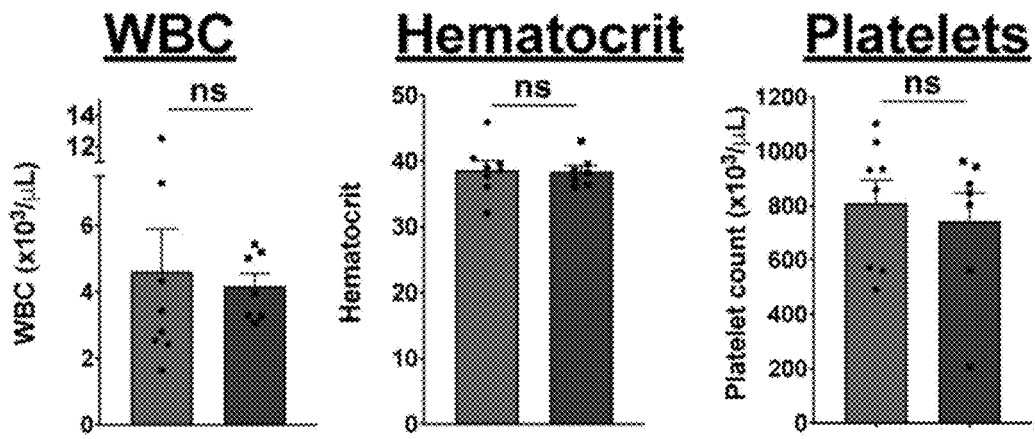
FIG. 16A-FIG. 16G. Acute effects of baricitinib on the pre-HSCT recipient environment. B6 mice were treated daily with baricitinib or vehicle for four days prior to analysis of blood and lymphoid organs. The color scheme in the legend (upper-right) is used throughout the figure. (A and B) Complete blood counts (A) and organ cellularity of spleen and bone marrow (B). (C) Proportions of HSPC subsets in bone marrow. (D) Absolute B, T, and myeloid (Gr1+ and/or CD11b+) cell counts in spleen, blood, and bone marrow. (E) Frequencies of FoxP3+ Tregs (relative to total CD4+ T cells) in spleen, blood and bone marrow. (F and G) Cell surface phenotyping of splenic T cells (F) and APCs (G). Data points and error bars represent mean±SEM, with mice pooled across 3 experiments. For statistical comparison: ns=not significant, * is p<0.05,  is p<0.01, * is p<0.001, and **** is p<0.0001.
Figure 16B:
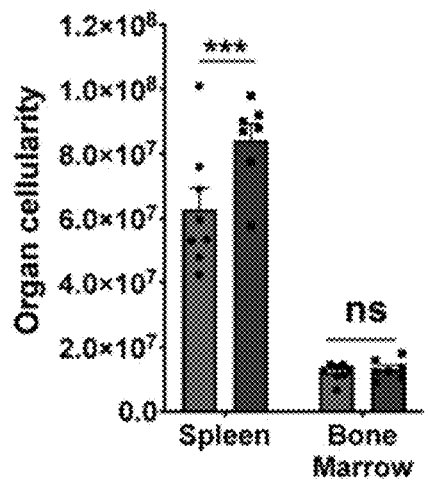
Figure 16C:
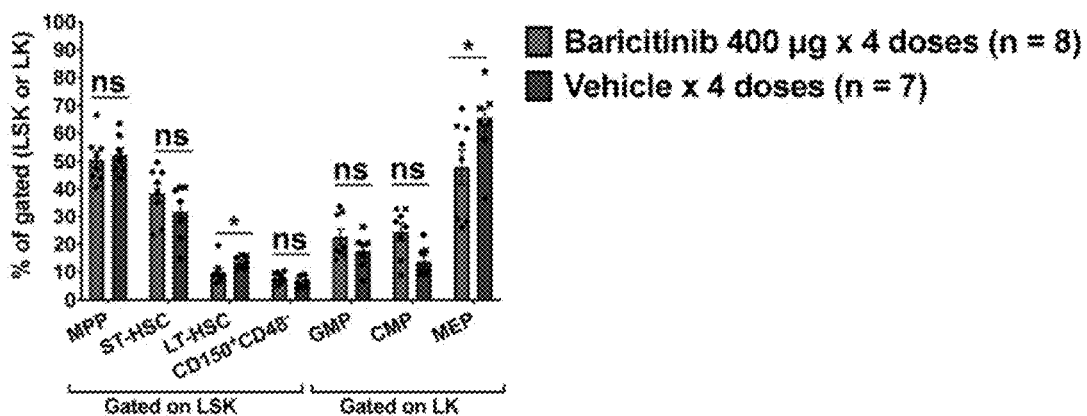
Figure 16D:
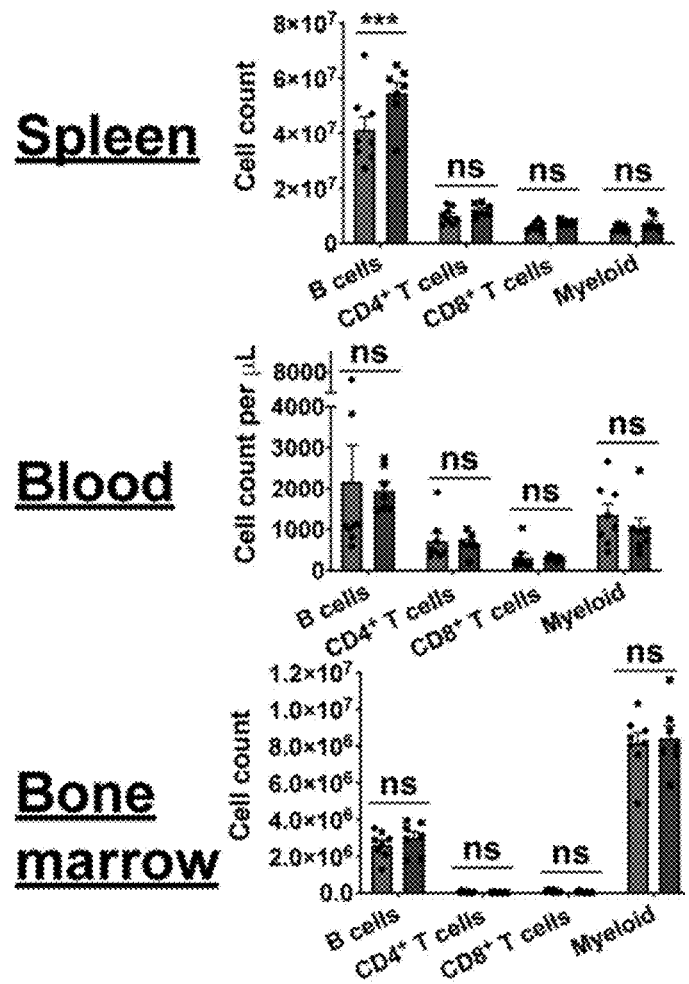
Figure 16E:
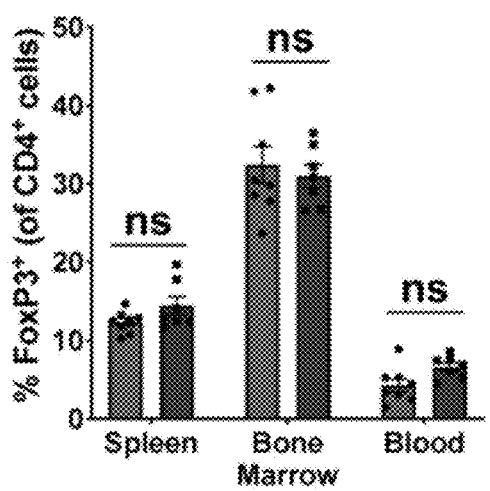
Figure 16F:
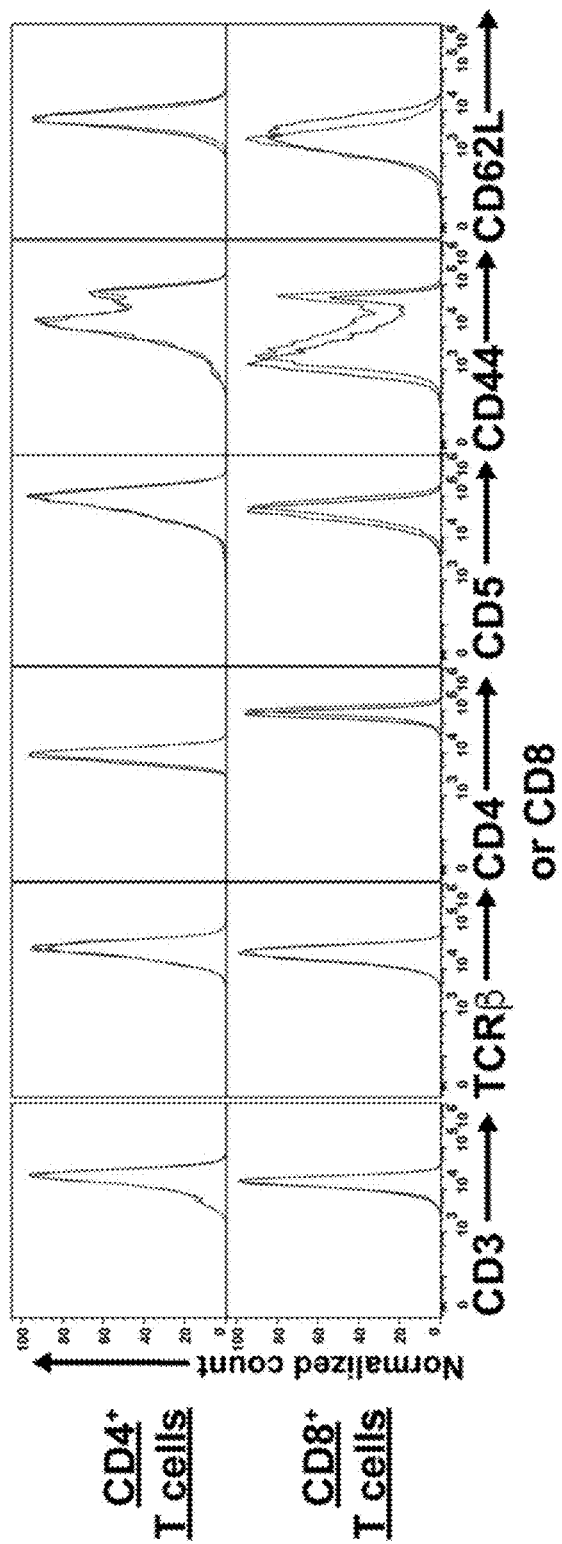
Figure 16G:
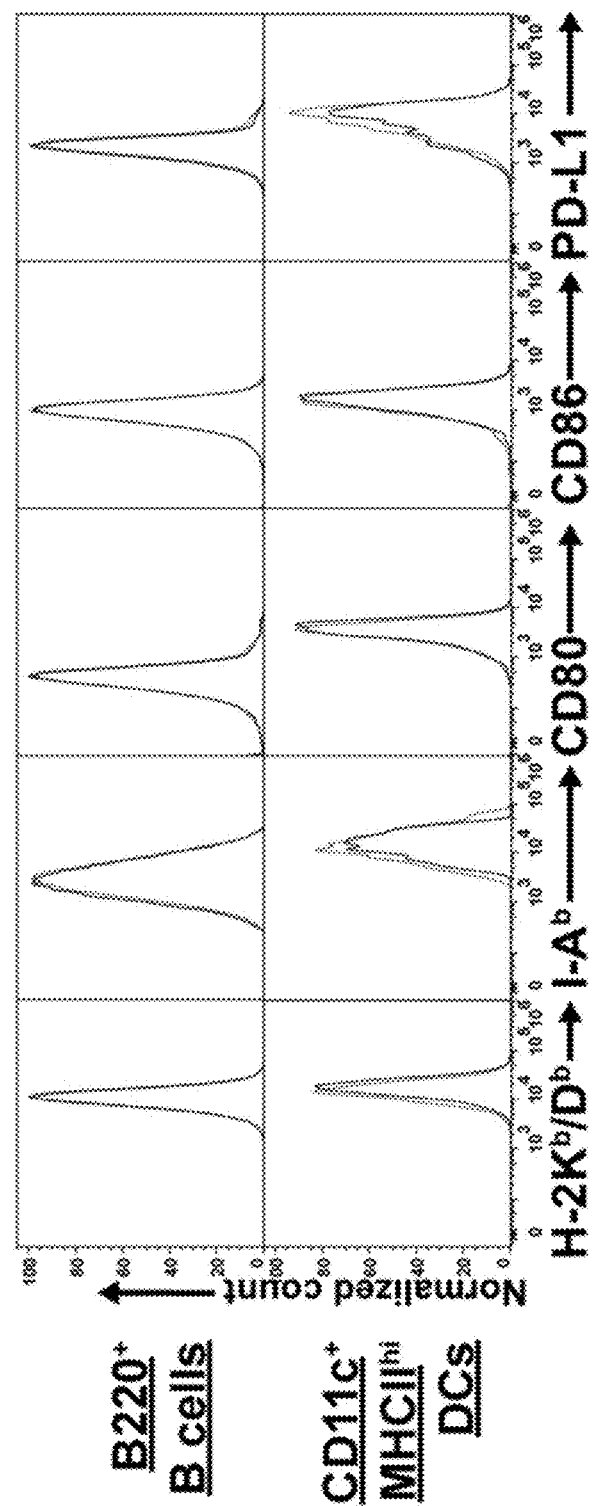

To characterize the acute effects of baricitinib treatment on HSCT recipients, peripheral blood and lymphoid organs of B6 mice that received daily baricitinib were analyzed for 4 days, the same time period baricitinib is administered before HSCT. Baricitinib treatment minimally affected CBCs or bone marrow cellularity but was associated with a significant reduction in spleen cellularity (see e.g., FIG. 16A and FIG. 16B). Bone marrow hematopoietic stem and progenitor cell (HSPCs) numbers were largely unaffected by baricitinib, except for somewhat lower frequencies of long-term HSC ($CD34^-CD135^-$ LSK) and megakaryocyte-erythroid progenitors ($CD16/32^-CD34^-$LK; FIG. 16c). Absolute myeloid, conventional T cell, and $FoxP3^+$ Treg counts were similar in all examined organs, but lower frequencies of B cells were noted in baricitinib-treated mouse spleens (see e.g., FIG. 16D and FIG. 16E). Finally, immunophenotyping of the splenic T cell and antigen presenting cell (APC) compartments revealed no differences between baricitinib- and vehicle-treated mice (see e.g., FIG. 16F and FIG. 16G).

Figure 4C:
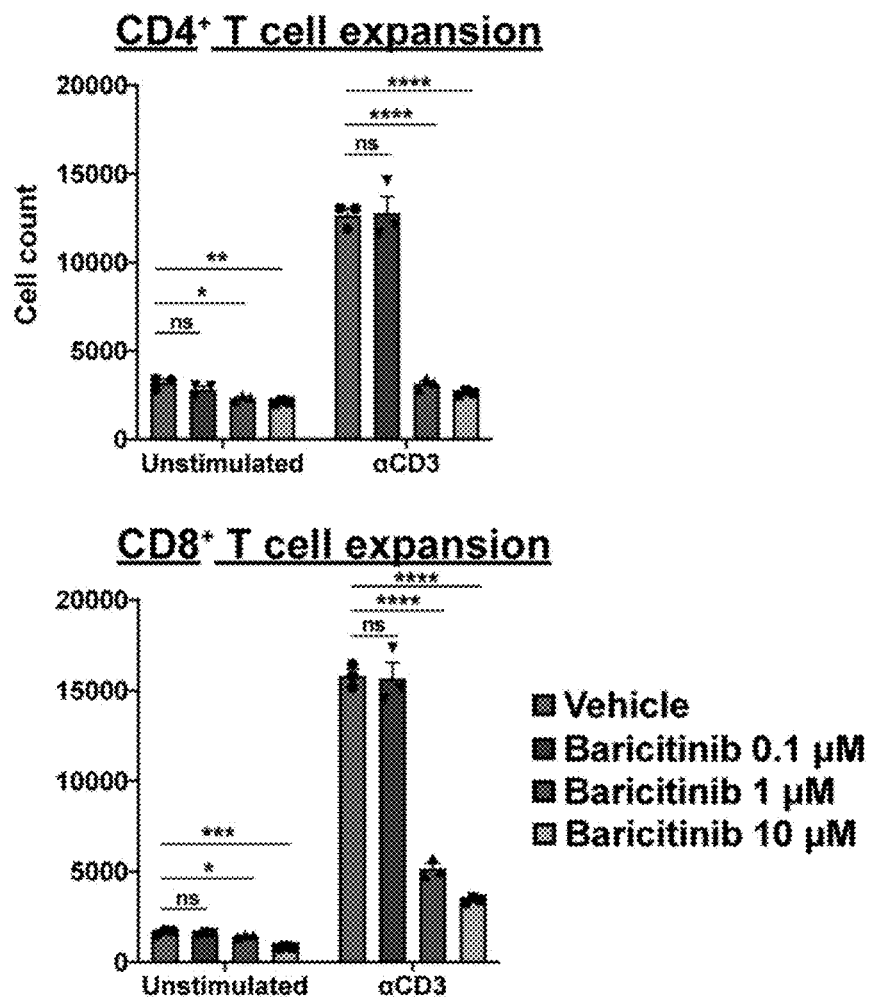
Figure 4D:
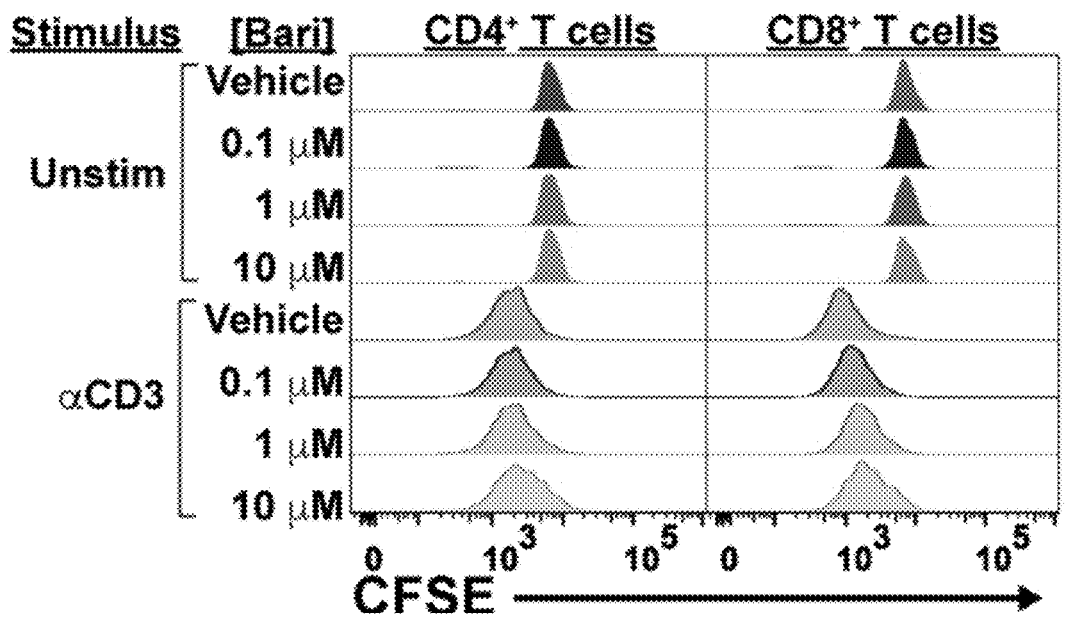
Figure 4D:
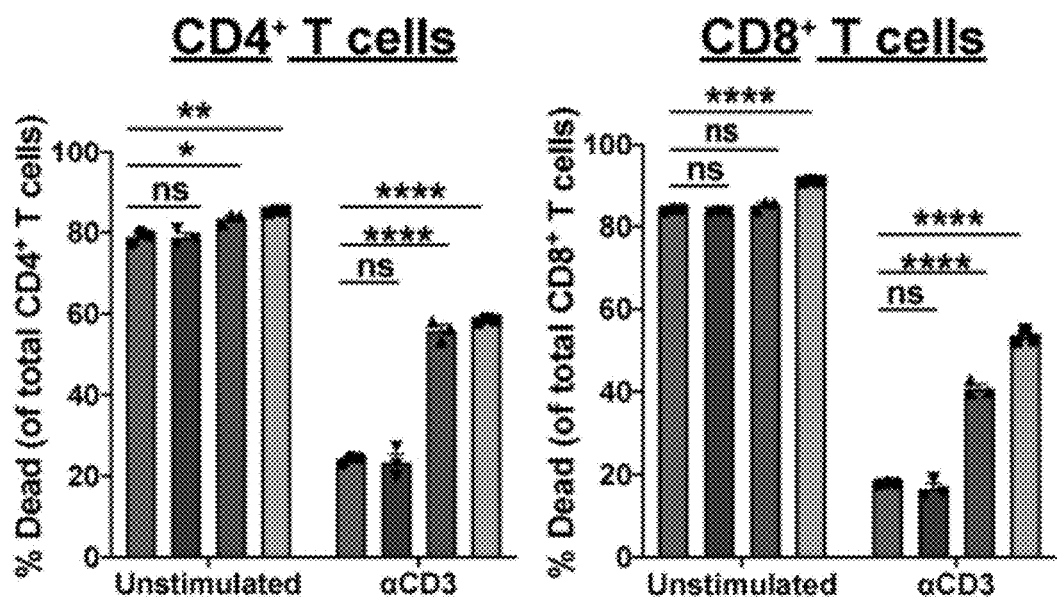
Figure 4E:
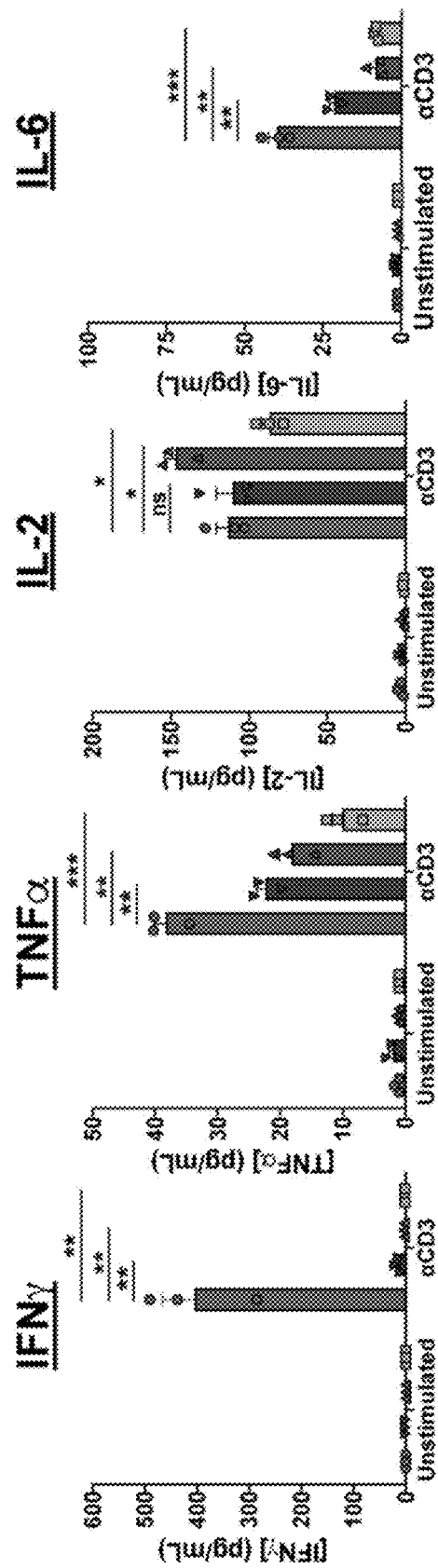

To examine how baricitinib impacts T cell responses, polyclonally-stimulated, CFSE-labeled B6 T cells were cultured in vitro with baricitinib or vehicle. Baricitinib impaired expansion of αCD3-stimulated $CD4^+$ and $CD8^+$ T cells in a dose-dependent manner (see e.g., FIG. 4C), due to increased cell death and mildly reduced cell proliferation (see e.g., FIG. 4E and FIG. 4D). As expected with primary murine cells, unstimulated cultures showed significant T cell death after 72 hours; importantly, the degree of cell death in these cultures was only subtly increased by baricitinib at the highest tested dose, suggesting against nonspecific toxicity. Concentrations of TNFα, IL-6 and, particularly, IFNγ in the culture supernatants were reduced by baricitinib during the culture period (see e.g., FIG. 4E). This reduction was not generalizable, as IL-2 secretion was unaffected by baricitinib. In summary, although baricitinib minimally affects resting T cells in pre-HSCT recipients, activated T cell function is more adversely affected. This is consistent with the hypothesis that baricitinib acts predominantly via immunosuppression, exerting its major therapeutic function on alloreactive T cells that become activated in response to donor HSCs.

Figure 5A:
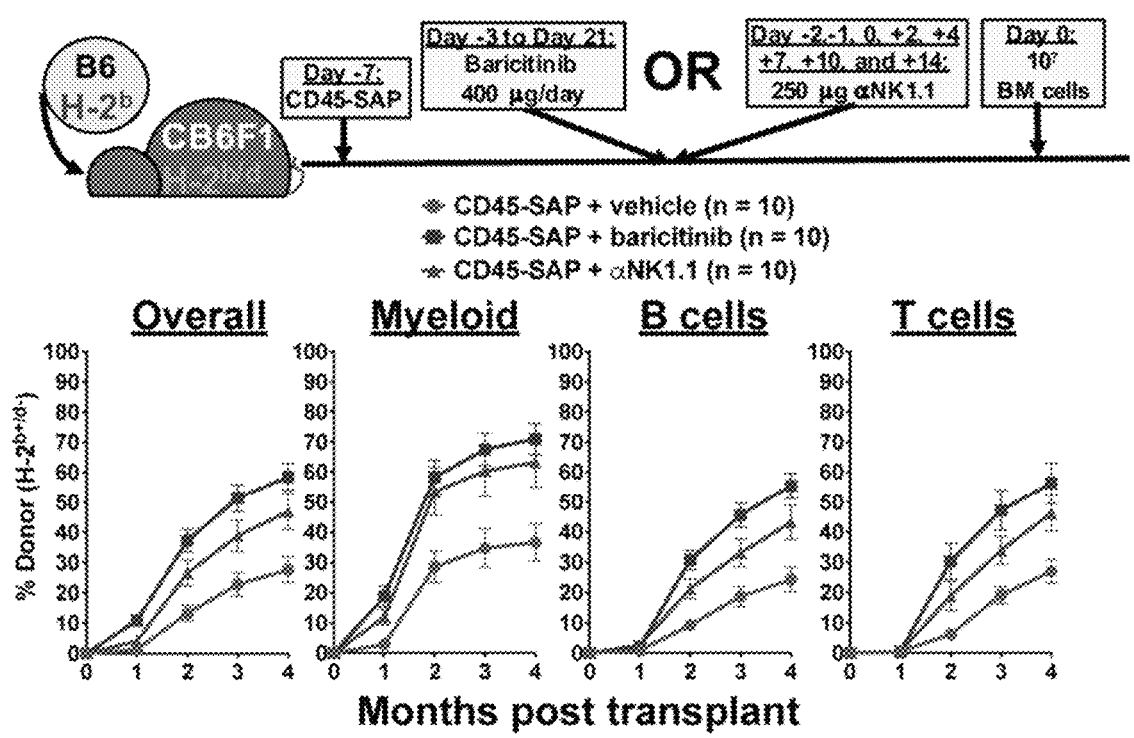
FIG. 5A-FIG. 5H. Baricitinib overcomes NK cell-mediated rejection by impairing NK cell survival and effector function. (A) Schema and results for parent-to-F1 HSCT model to study baricitinib effect on NK-mediated rejection. Overall peripheral blood donor chimerism was significantly higher for the baricitinib and αNK1.1 groups compared to vehicle at all timepoints (baricitinib vs. vehicle: $p<0.001$ months 1, 3 and 4, $p<0.0001$ month 2; αNK1.1 vs. vehicle: $p<0.05$ months 1-3, $p<0.01$ month 4). (B) Peripheral blood NK cell frequencies of recipients in (A) immediately before HSCT. (C) NK cell counts by organ in B6 mice receiving four once-daily doses baricitinib or vehicle. (D-F) Functional assays of IL-15-stimulated B6 splenic NK cells incubated with baricitinib or vehicle: IFNg production and survival after 15 hours (D), expansion after 72 hours (E), and cytolytic enzyme expression after 24 hours (F). (G) YAC-1 killing by NK cells primed with IL-15 for 48 hours without baricitinib, then washed and plated with target cells for 4 hours with baricitinib or vehicle. (H) Stat5 phosphorylation in NK cells after IL-15 stimulation with baricitinib or vehicle present. For (D-H), two (H) or three (D-G) technical replicates from one of three experiments are shown; for (F), inset numbers are the percentage of events in each quadrant. Data points and error bars represent mean±SEM. For statistical comparisons: ns=not significant, *=$p<0.05$, =$p<0.01$, *=$p<0.001$, and ****=$p<0.0001$.

In order to extend baricitinib-based conditioning to fully haploidentical (F1→F1) and fully MHC-mismatched models (i.e., BALB/c→B6), inhibition of both T and NK cells is necessary. Multiple reports have shown that ruxolitinib depletes NK cells in mice and humans, impairing NK cell proliferation, cytotoxicity and cytokine production. It was hypothesized that baricitinib, via inhibition of JAK1/2 signaling, would show similar biological effects and protect against NK cell-mediated rejection. To test this, CD45-SAP plus baricitinib was administered as conditioning for B6→CB6F1 (parent-to-F1) allo-HSCT (see e.g., FIG. 5A). In this model, engraftment of parental HSCs is resisted by CB6F1 NK cells, which react to the absence of $H-2^d$ on the donor-derived cells ("missing self" recognition). This phenomenon, termed hybrid resistance, provides an opportunity to isolate NK cell-mediated host-versus-graft responses and investigate how baricitinib affects them.

Figure 5B:
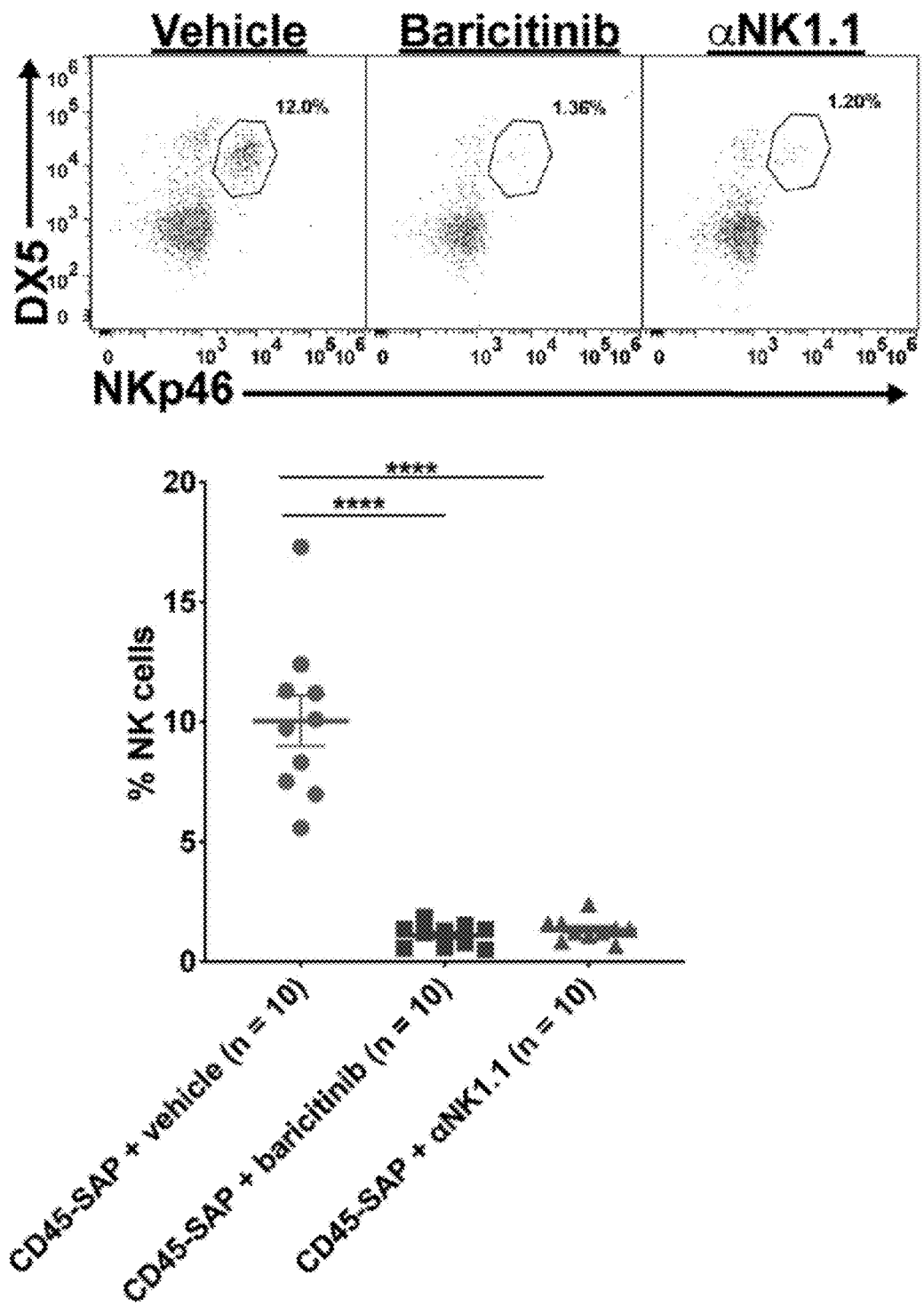
Figure 5C:
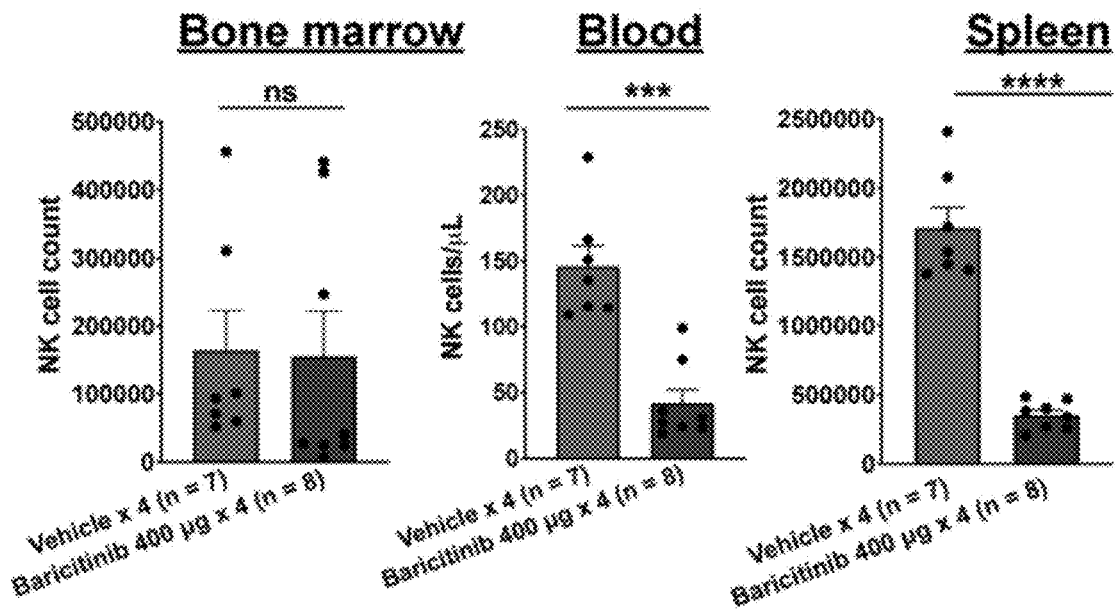

Overall donor chimerism in B6→CB6F1 transplants treated with CD45-SAP plus vehicle was approximately 25% four months post-HSCT (see e.g., FIG. 5A), considerably lower than that obtained in syngeneic HSCT (see e.g., FIG. 10). As expected, engraftment was improved by αNK1.1 depletion. Mice conditioned with baricitinib showed overall donor chimerism approaching 60%, surpassing that obtained with αNK1.1 depletion. Pre-HSCT analysis of peripheral blood revealed that both αNK1.1 treatment and baricitinib markedly depleted CB6F1 recipients' circulating NK cells (see e.g., FIG. 5B). It was confirmed this finding in the spleen and peripheral blood, but not bone marrow, of B6 mice treated with daily baricitinib (see e.g., FIG. 5C). Thus, baricitinib overcame NK cell-mediated barriers to HSCT due to efficient in vivo NK cell depletion.

Figure 5D:
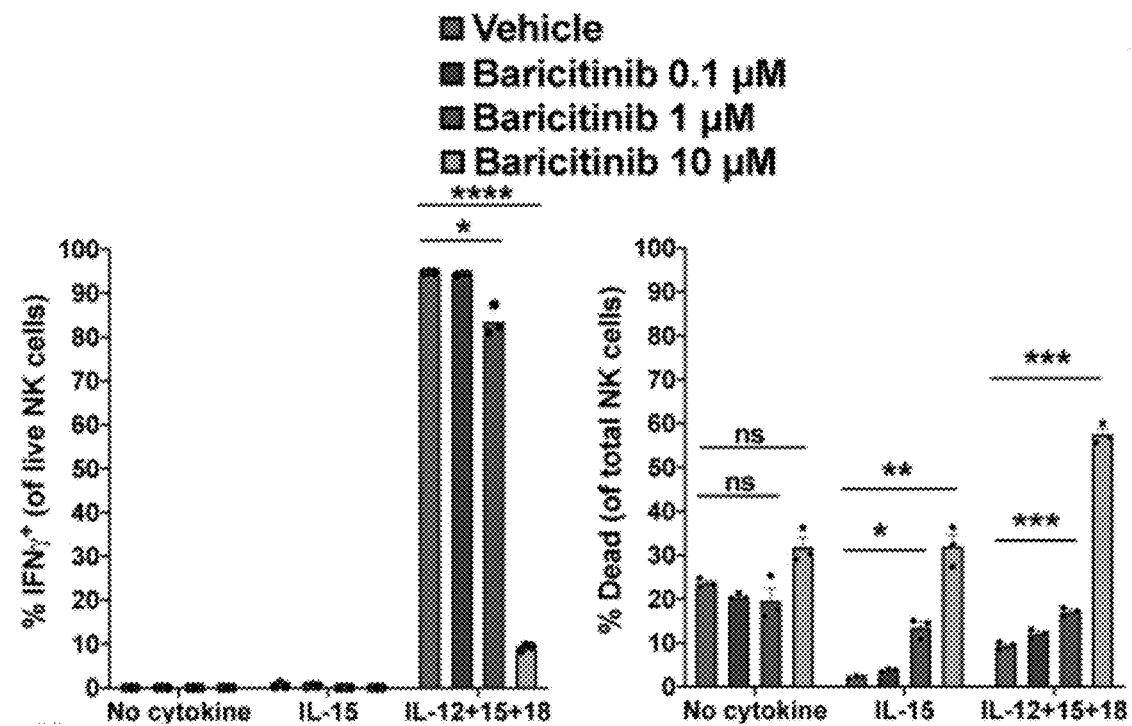
Figure 5E:
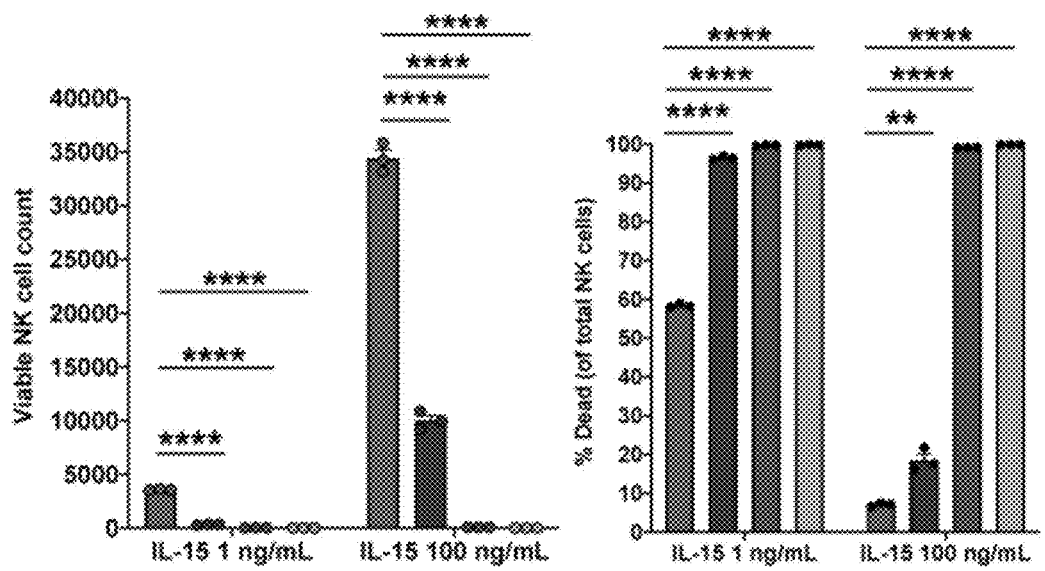
Figure 5E:
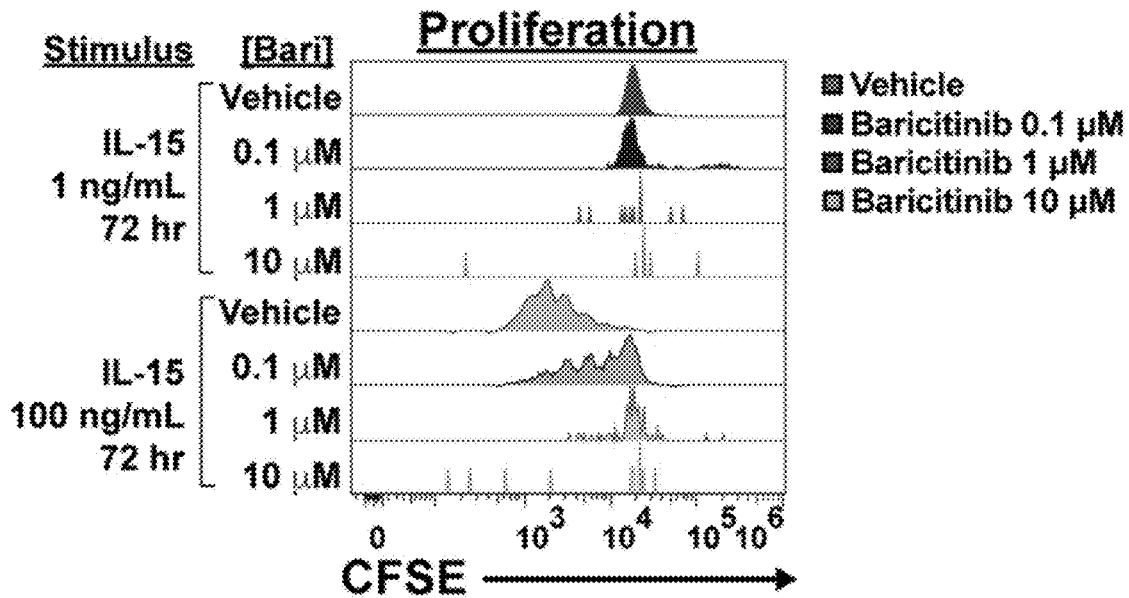
Figure 5F:
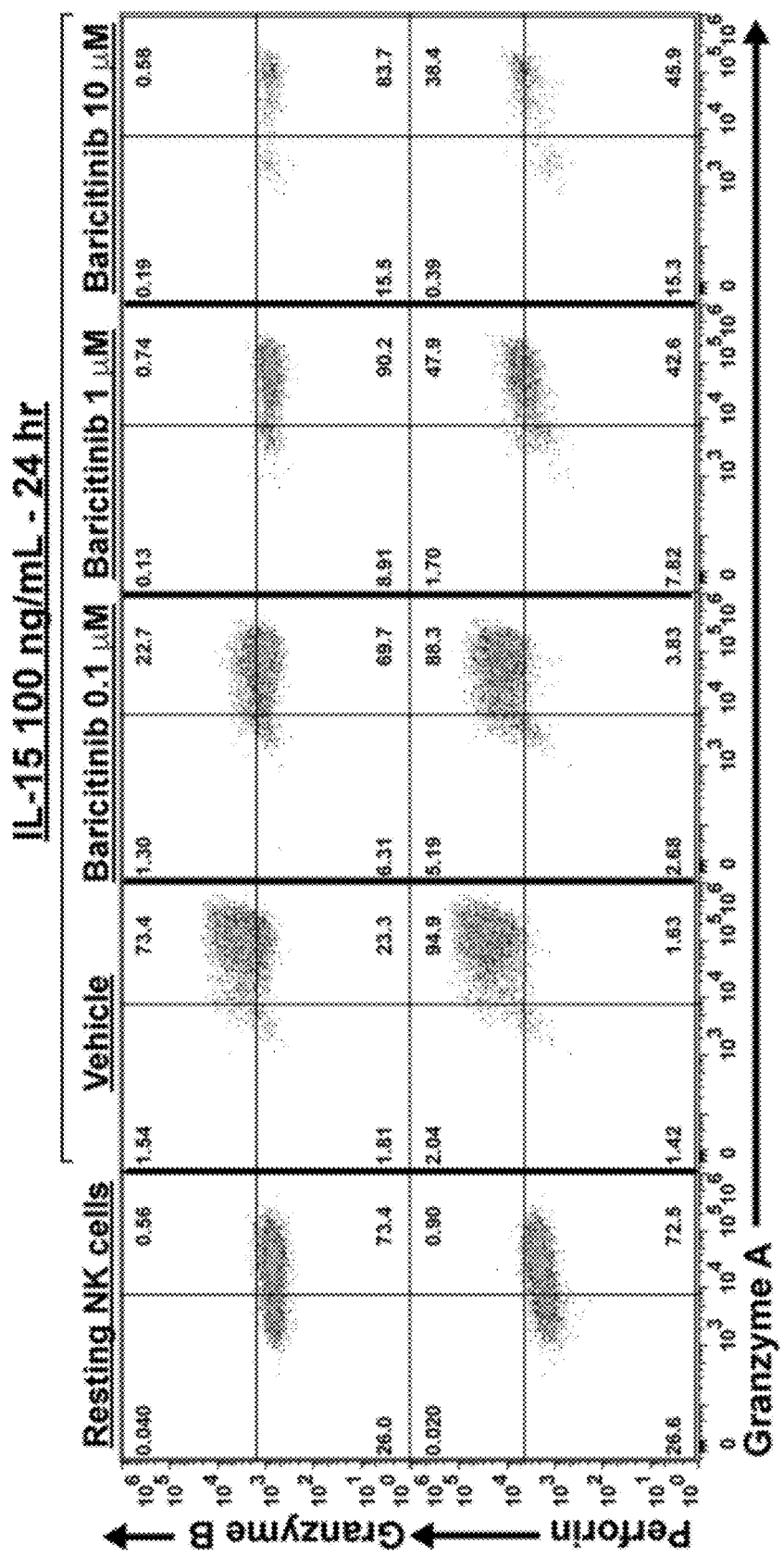
Figure 5G:
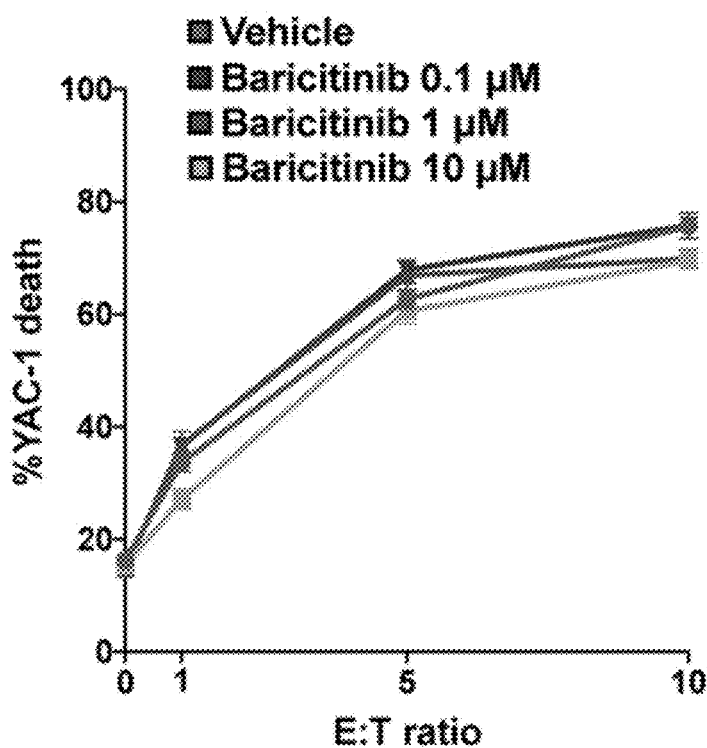
Figure 5H:
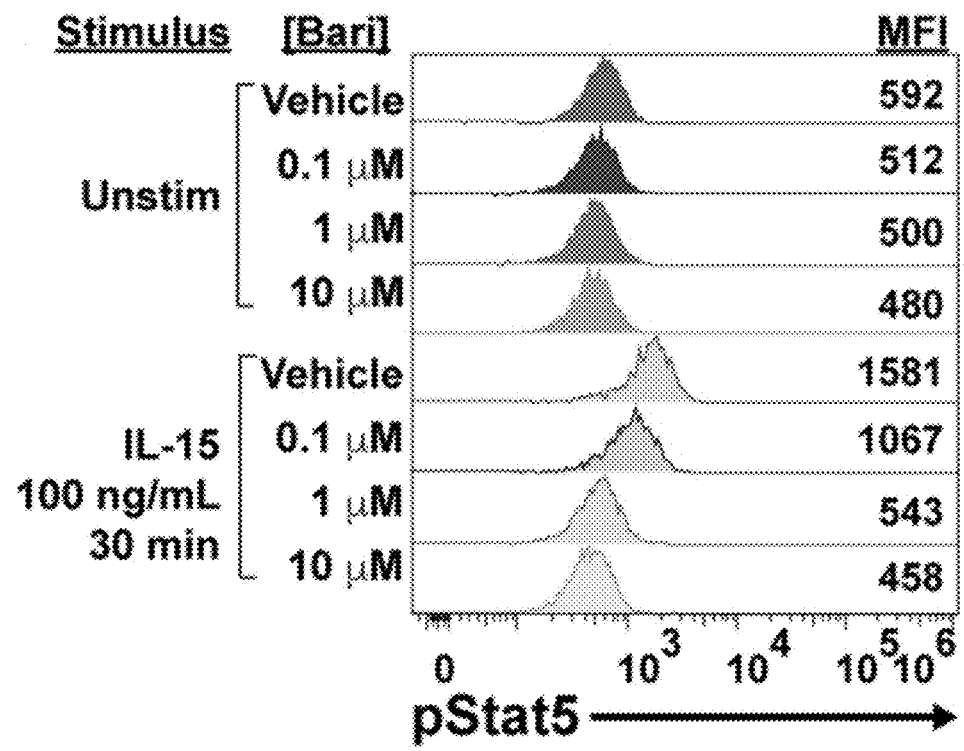

NK cell development, maturation, and function depend upon IL-15, which signals through JAK1 and JAK3 to activate Stat5. We asked whether baricitinib disrupts this critical signaling pathway to compromise NK cell survival and function. Murine NK cells stimulated in vitro with IL-15 alone or a cocktail of IL-12, IL-15 and IL-18 showed dose-dependent increases in cell death and decreases in IFNγ production in response to baricitinib (see e.g., FIG. 5D). As with T cells, nonspecific toxicity in unstimulated cultures was modest and noted only at the highest baricitinib doses. In longer cultures, baricitinib impaired IL-15-mediated NK cell expansion, an effect attributable to dramatically reduced proliferation and viability (see e.g., FIG. 5E). Baricitinib also strongly suppressed IL-15-induced upregulation of the lytic granule enzymes perforin and granzyme B (see e.g., FIG. 5F), which are required for full NK cell cytotoxicity. However, baricitinib did not prevent killing of YAC-1 target cells when added to NK cells that had been already primed with IL-15, suggesting that baricitinib inhibits the acquisition but not the execution of NK cytotoxicity (see e.g., FIG. 5G). Finally, analysis of IL-15 signaling confirmed that baricitinib inhibits IL-15-induced Stat5 phosphorylation in a dose-dependent manner (see e.g., FIG. 5H). These data collectively demonstrate that baricitinib potently impairs NK cell viability, proliferation, and effector function via interference with the IL-15-Stat5 signaling axis.

CD45-SAP Conditioning Poorly Stimulates Pathogenic Graft-Versus-Host Alloreactivity Compared to TBI The contribution of conditioning regimen intensity to the development of acute and chronic GvHD is well-studied. A multitude of variables modulate GvHD risk, including donor and recipient age, GvHD prophylaxis, donor HSC source and relatedness, and degree of HLA disparity, which can influence the choice of conditioning intensity. Theoretically, host tissue injury caused by chemotherapy and radiation amplifies GvHD via release of endogenous damage- and pathogen-associated molecular patterns from dying cells. These mediators activate innate immunity, arming APCs to prime vigorous alloreactive T cell responses. It was asked whether or not CD45-SAP, with its minimal tissue toxicities, would behave similarly.

Figure 6A:
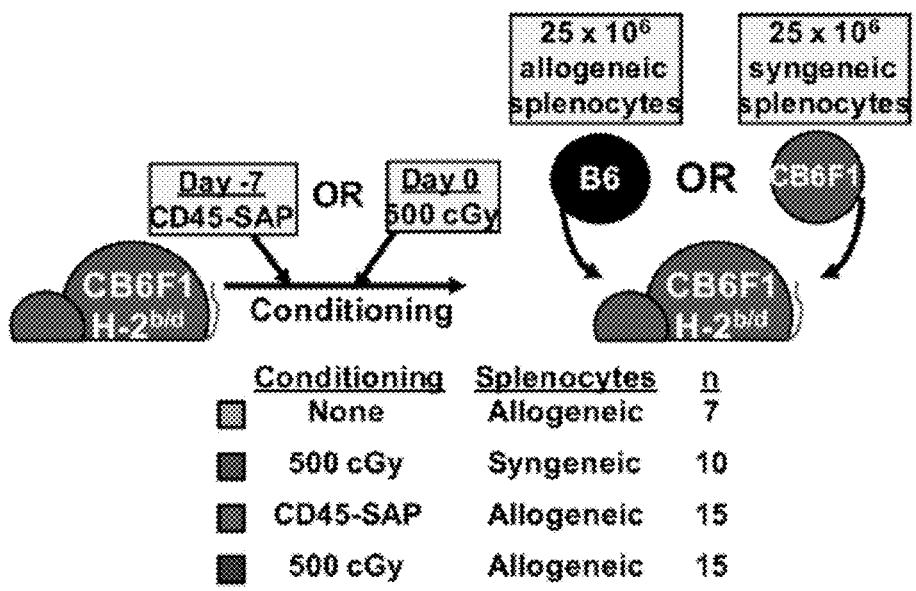
FIG. 6A-FIG. 6G. CD45-SAP conditioning does not promote graft-versus-host alloreactivity. (A) Schema for parent-to-F1 adoptive transfer model, with sublethal irradiation or CD45-SAP conditioning administered with the usual timing with respect to HSCT. Treatment groups are color-coded throughout the figure per the indicated legend. (B) Clinical outcomes for mice treated as per (A); "X" indicates death or euthanasia and dotted lines indicate euthanasia thresholds. (C) CBCs at 21 days post-splenocyte infusion. (D) Plasma inflammatory cytokine concentrations 7 days post-splenocyte infusion. (E) Circulating donor T cells at days 7 and 21 post-splenocyte infusion. (F and G) Flow cytometry (F; gated on 7-AAD$^-$Lineage$^-$ cells) and histology (G) of bone marrow from a CD45-SAP conditioned mouse 56 days after allogeneic splenocyte infusion compared with an irradiated mouse that succumbed at day 21. For clarity, weight changes shown in (A) are from a representative sample of five mice per group; for the other plots, all mice analyzed over 2 or 3 independent experiments are included. Data points and error bars represent mean±SEM. For statistical comparisons: ns=not significant, *=$p<0.05$, =$p<0.01$, *=$p<0.001$, ****=$p<0.0001$.

To study the effect of conditioning regimen on T cell alloresponses in vivo, a parent-to-F1 adoptive transfer model was used, in which alloreactivity is exclusively in the graft-versus-host direction (see e.g., FIG. 6A). In this system, F1 mice conditioned with sublethal irradiation that receive parental splenocytes develop pancytopenia secondary to T cell-mediated marrow aplasia. CD45-SAP was compared to sublethal rather than lethal irradiation (as is typically used in standard GvHD models) to more closely match the severity and degree of myeloablation of the conditioning regimens. Both CD45-SAP and 500 cGy irradiation are nonlethal and have been shown to permit similar levels of syngeneic HSC engraftment, suggesting a similar capacity to generate marrow HSC niche space.

Figure 6B:
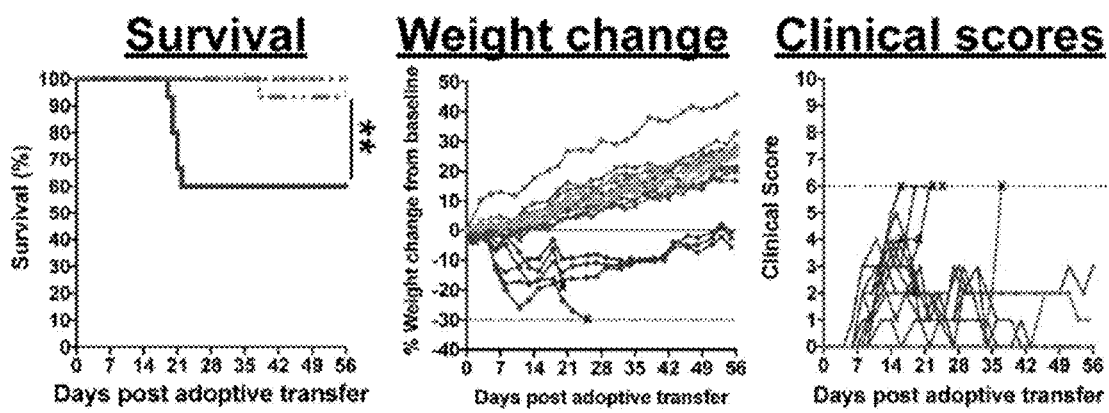
Figure 6C:
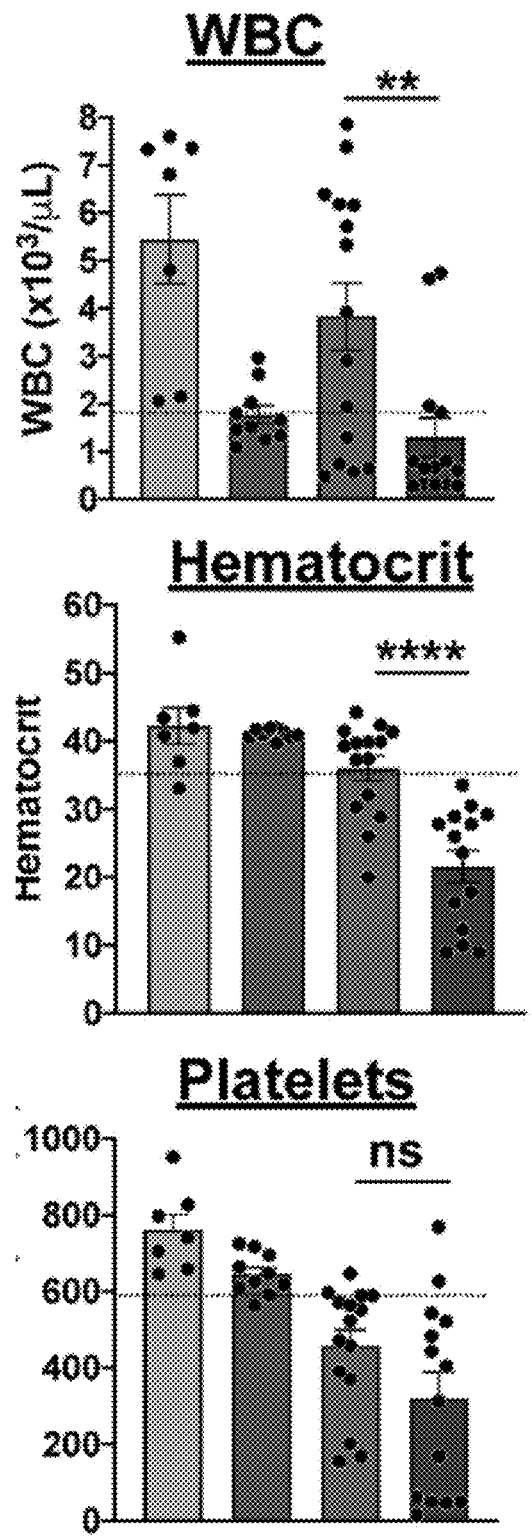
Figure 6D:
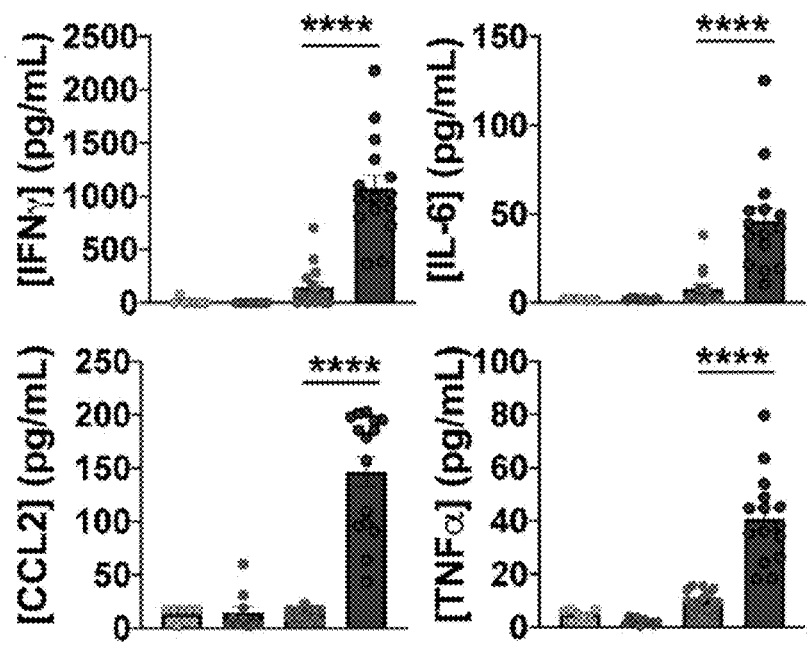
Figure 6E:
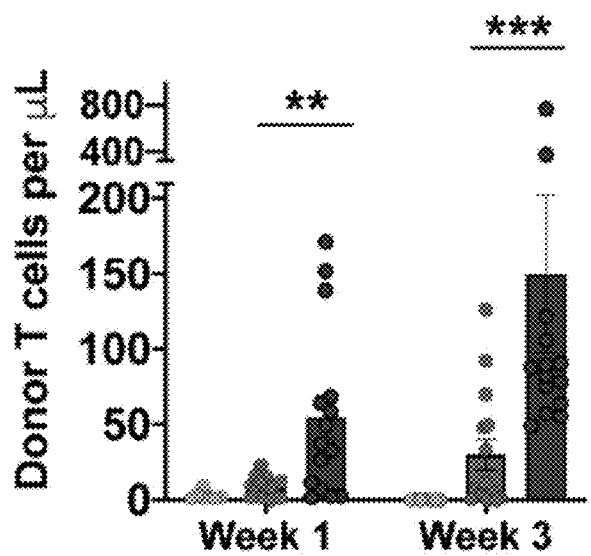
Figure 6F:
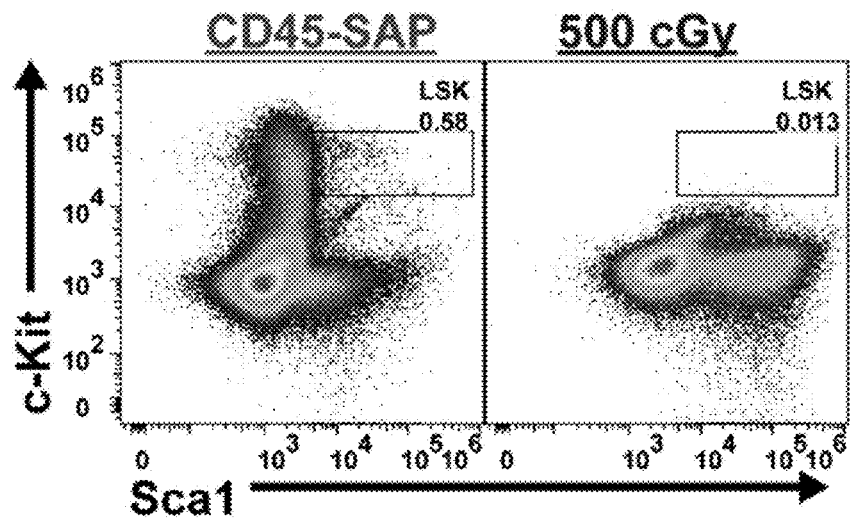
Figure 6G:
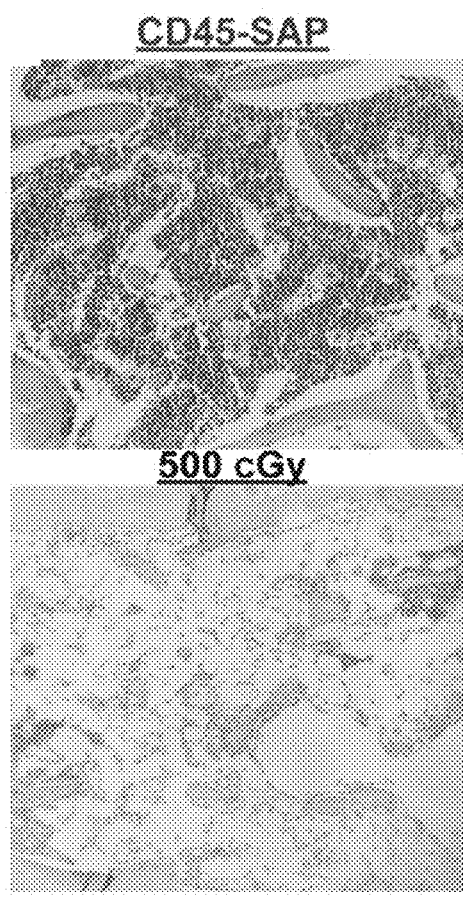

Compared to ADC-conditioned mice, TBI-conditioned mice infused with allogeneic splenocytes showed poorer survival and clinical courses along with greater weight loss (see e.g., FIG. 6B). At three weeks post-splenocyte infusion, TBI-conditioned, but not ADC-conditioned mice, developed pancytopenia (see e.g., FIG. 6C) and marked elevations in the plasma concentrations of several inflammatory cytokines, particularly IFNγ (see e.g., FIG. 6D). Importantly, TBI-conditioned mice receiving syngeneic splenocytes and unconditioned mice receiving allogeneic splenocytes showed no morbidity, mortality, cytopenias, or pro-inflammatory cytokinemia, confirming that irradiation plus allogeneic T cells are required for pathology. Circulating donor-derived T cells were present in ADC-conditioned mice but at lower frequencies than irradiated mice, indicating that the lack of disease in ADC-conditioned mice is not due to failure of these cells to engraft (see e.g., FIG. 6E). Finally, bone marrow histopathology and flow cytometry demonstrated profound marrow aplasia and HSPC depletion in TBI-conditioned mice that developed lethal disease (see e.g., FIG. 6F and FIG. 6G).

Figure 7A:
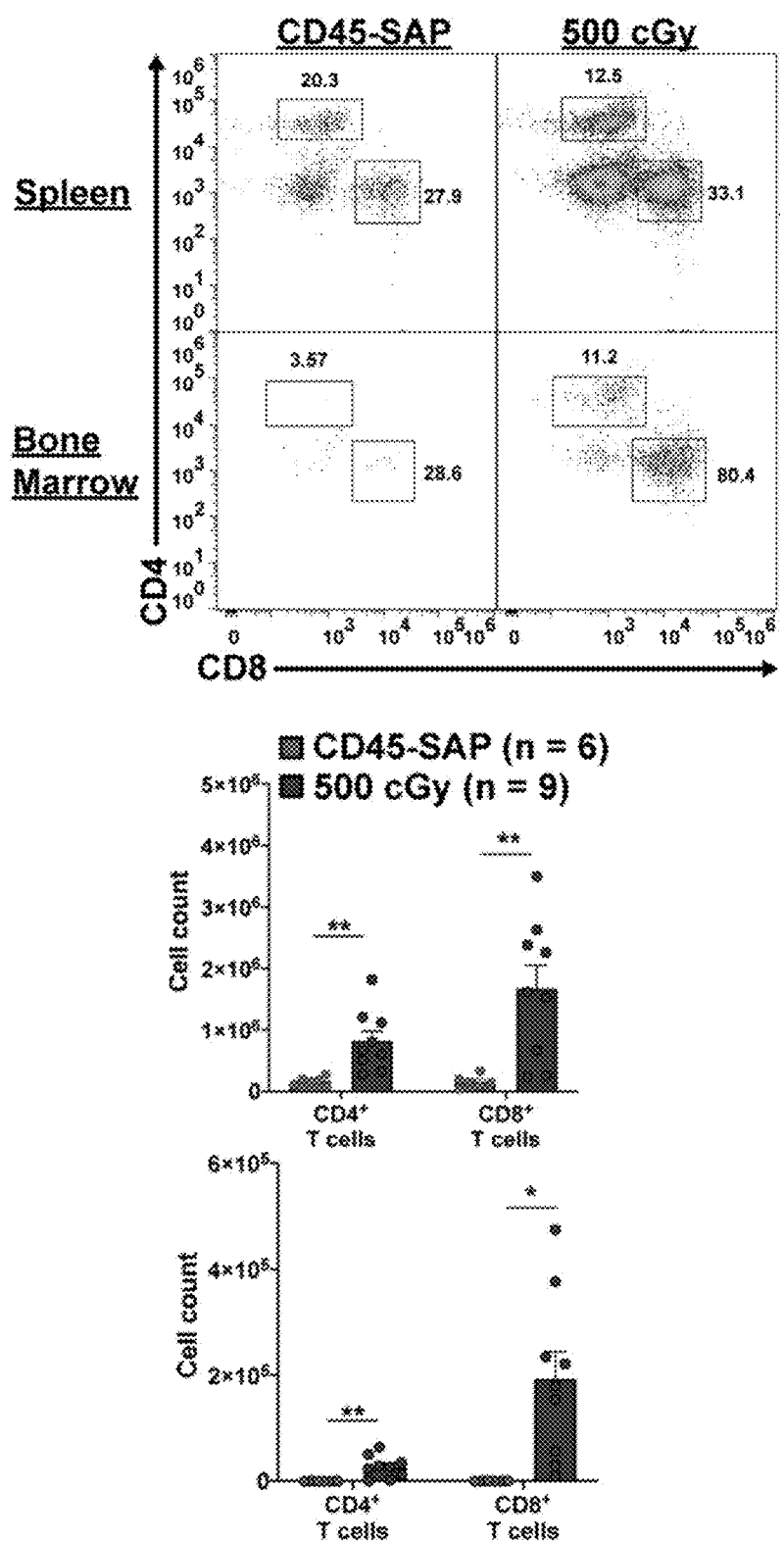
FIG. 7A-FIG. 7D. Irradiation, but not CD45-SAP, promotes alloreactive T cell expansion, effector function, and bone marrow infiltration. (A) Absolute counts of donor-derived (H-2K$^{b+/d-}$) CD4$^+$ and CD8$^+$ T cells in spleens and bone marrows of CB6F1 mice conditioned with 500 cGy total body irradiation (TBI) or CD45-SAP at 7 days post-infusion of allogeneic B6 splenocytes. (B) Cell surface phenotyping of donor T cells harvested from spleens of TBI-versus ADC-conditioned mice. (C) Intracellular staining of donor T cells harvested from spleens of TBI-versus ADC-conditioned mice for CD8$^+$ T cell cytolytic granule enzymes. (D) Cell surface phenotyping of the recipient (H-2K$^{b+/d+}$) APC compartment in spleens of TBI-versus ADC-conditioned mice. For (B) and (C), inset numbers indicate the percent of events in each quadrant; for (D), inset numbers are MFIs. FACS plots are from one representative mouse obtained across 2 (CD45-SAP) or 3 (500 cGy) experiments; data points and error bars represent mean±SEM. For statistical comparisons: ns=not significant, *=p<0.05, =p<0.01, *=p<0.001, ****=p<0.0001.
Figure 7B:
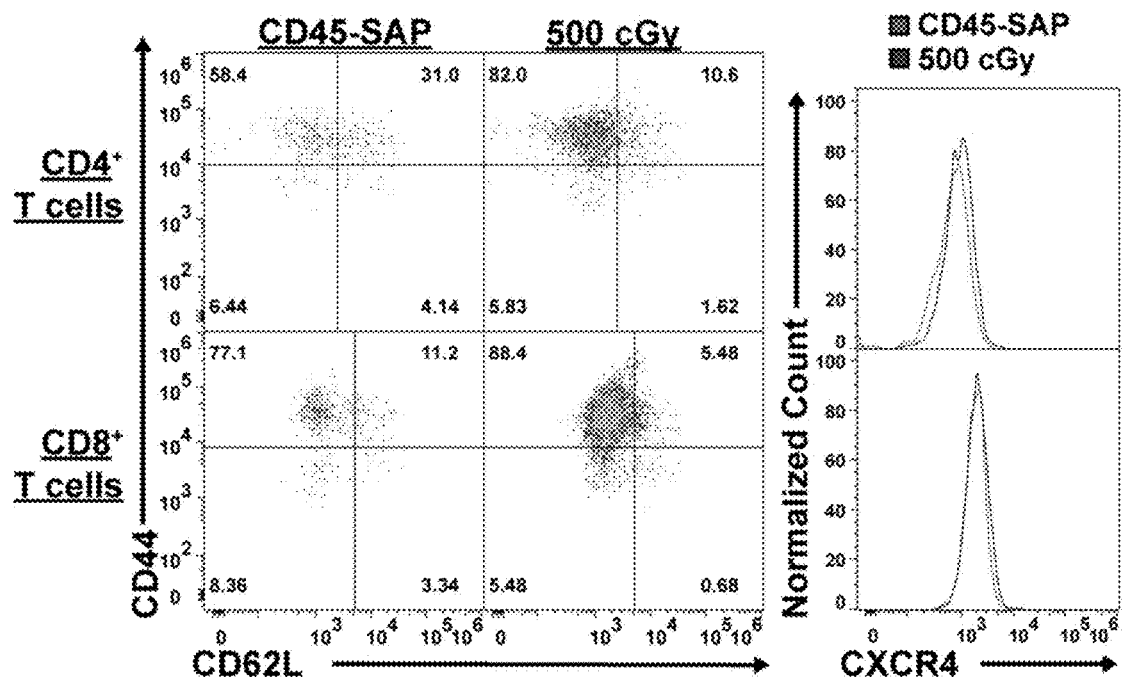
Figure 7C:
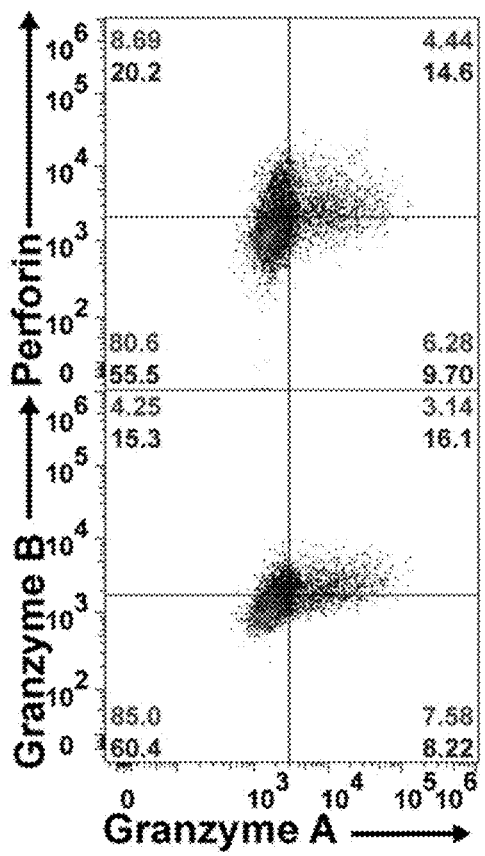
Figure 7D:
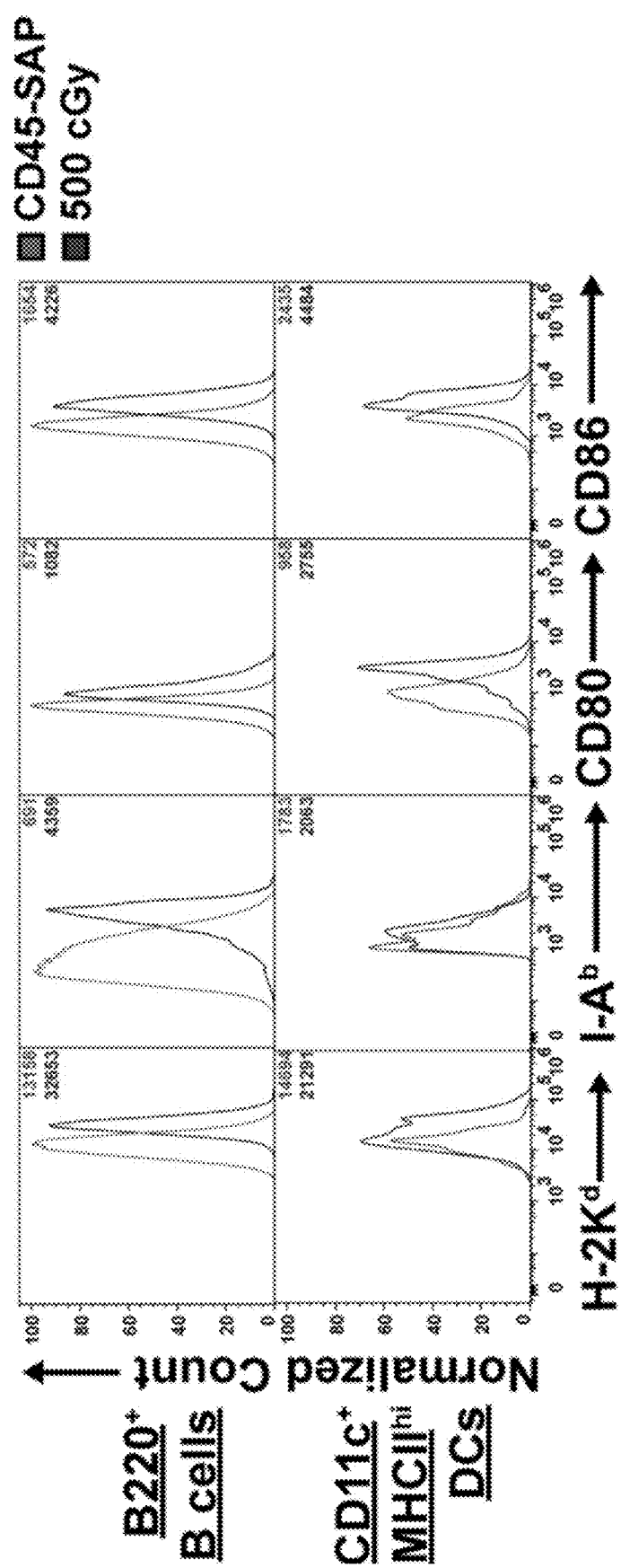

To understand why high doses of allogeneic T cells failed to elicit disease in CD45-SAP-conditioned mice, the donor T cell response was analyzed in the lymphoid organs of ADC-versus TBI-conditioned mice. While donor CD4+ and CD8+ T cells were identified in the spleens of both ADC- and TBI-conditioned mice, the bone marrows of ADC-conditioned mice were virtually devoid of donor T cells (see e.g., FIG. 7A). This contrasted starkly with irradiated mice, whose marrows were extensively infiltrated by donor T cells, mainly CD8+ T cells. While higher expression of the bone marrow homing chemokine receptor CXCR4 on CD8+ T cells could explain why these were the predominant marrow-infiltrating cells in irradiated mice, differences in CXCR4 expression cannot account for the differences observed between ADC- and TBI-conditioned mice (see e.g., FIG. 7B). Most T cells in ADC- and TBI-conditioned mice had a $CD44^{hi}CD62L^{lo}$ effector phenotype, with somewhat higher frequencies in irradiated mice. Donor CD8+ T cells in irradiated mice upregulated perforin and granzymes A and B relative to ADC-conditioned mice, indicating greater potential for cytotoxicity (see e.g., FIG. 7C). Higher expression of MHC and the costimulatory receptors CD80 and CD86 (see e.g., FIG. 7D) were noted in host-derived APCs from irradiated mice compared to ADC-conditioned mice. Collectively, these data suggest that ADC-conditioning produces a suboptimal environment for priming a pathogenic allogeneic T cell response.

Discussion

Toxicities from chemotherapy- and radiation-based conditioning remain a major obstacle to the broader application of HSCT for the treatment of hematopoietic diseases, particularly for elderly or infirmed patients. Reduced-intensity conditioning provides one way to extend HSCT to patients unable to tolerate more severe conditioning, and is a reasonable approach to treat non-malignant diseases or for autologous gene therapy, for which mixed donor chimerism may be sufficient for cure. However, for AML, reduced-intensity conditioning more poorly ablates residual malignant cells, potentially leading to relapse. In this setting, relapse control becomes more reliant on GvL effects, which is inextricably linked to GvHD development. These issues illustrate the complexity of managing treatment-related toxicity and relapse outcomes to achieve optimal outcomes for patients receiving allo-HSCT for leukemia.

Antibody-based HSCT conditioning presents a way to more favorably balance toxicity and therapeutic efficacy. By simultaneously targeting the stem cell compartment and malignant cells, the therapeutic goals of HSCT can hypothetically be achieved with toxicities largely confined to the hematopoietic system. Indeed, recent work in murine, non-human primates, and early human trials have demonstrated feasibility and limited toxicities of antibody and ADC-based therapies alongside high efficacy in depleting recipient HSCs and/or malignant cells. Optimization of these strategies for allo-HSCT and translation to human clinical trials will benefit from a greater mechanistic understanding of how they modulate donor and recipient immunity, with significant implications for treating high-risk malignancies like AML.

In the present study, mouse allo-HSCT models were used to identify ADC-based conditioning regimens able to achieve robust donor engraftment, and to understand the immunobiology underlying their effect. T cells were the primary immune barriers to miHA- and MHC-mismatched HSCT, and engraftment was achievable by combining CD45-SAP with pan-TCD. The transient donor chimerism often encountered in the MHC-mismatched model could be explained by incomplete T cell elimination at all tissue sites, even with prolonged depleting antibody treatment. This issue is particularly relevant for developing thymocytes, which not only require higher antibody doses than peripheral T cells for depletion, but also include a $CD4^-CD8^-$ subset unable to bind αCD4 or αCD8 antibodies. Upon maturation and thymic egress, these cells could mediate alloreactivity in the periphery. Given the high frequency of T cells estimated to be alloreactive, even a small residual population of functional host T cells could reject donor HSCs.

The use of baricitinib in combination with CD45-SAP as conditioning improved significantly upon the shortcomings of pan-TCD, suppressing host T and NK cell responses to enable robust, high-level, multilineage engraftment without requiring prolonged antibody depletion. As baricitinib relatively spares JAK3, its inhibitory activity against T and NK cells may result from antagonism of JAK1, which associates with the common beta chain (CD122) used by the IL-2 and IL-15 receptors. Interference with IL-15 signaling led to the poorer in vitro proliferation, survival and function observed with baricitinib-treated NK cells, and an analogous mechanism impacting IL-2 signaling may affect baricitinib-treated T cells. Future studies utilizing inhibitors targeting individual JAKs will help further dissect the mechanisms of baricitinib effect on T and NK cell biology and identify the relevant signaling pathways.

While daily baricitinib monotherapy was sufficient to permit engraftment in miHA-mismatched HSCT, co-administration of pre-HSCT TCD or continuous infusion of baricitinib was required for the MHC-mismatched model, consistent with the expectation that more durable immunosuppression is necessary with increasing degrees of MHC disparity. Indeed, in the preliminary experiments with fully MHC-mismatched allo-HSCT (BALB/c→B6), continuous baricitinib plus CD45-SAP conditioning gave ~25% engraftment success (not shown), considerably lower than the ~70% engraftment rate for the MHC-mismatched model described herein. Continued optimization of our conditioning regimens aims to achieve robust, high-level engraftment in fully haploidentical (F1-to-F1) and fully MHC-mismatched allo-HSCT. ADCs with alternative toxic payloads able to produce greater myeloablation and lymphodepletion, or immunosuppressive treatments able to synergize with baricitinib, are potential avenues to improvement in this regard.

The finding that daily baricitinib synergized with pre-HSCT TCD in the MHC-mismatched model was in some respects surprising. That baricitinib could substitute for post-HSCT TCD is consistent with the hypothesis that T cell inhibition is crucial to its activity. However, this strategy succeeded in mice whose $CD4^+$ and $CD8^+$ T cells were ablated by pre-HSCT T cell depletion. While this could simply reflect baricitinib inhibiting the few cells surviving TCD, other explanations are possible, such as modulation of APC function or alterations of thymic selection or egress. Aside from NK cell depletion, gross immunologic alterations were not observed in mice acutely treated with baricitinib, yet there may be more subtle effects that impact allograft tolerance or effects which become apparent only with chronic treatment. Deeper immunophenotyping and transcriptomic profiling in baricitinib-treated mice, focusing on differences between daily versus continuous baricitinib administered either acutely or chronically, is central to rationally designing and optimizing allo-HSCT conditioning with baricitinib.

Finally, infusion of allogeneic T cells did not elicit pathogenic alloreactivity in CD45-SAP conditioned mice due to poor donor cell expansion, effector function, and target organ infiltration. This outcome likely reflects poorer priming of the donor alloresponse by innate immune signals in ADC-conditioned mice, signals that are more abundantly generated by TBI-induced injury. Given the large numbers of T cells in peripheral blood-mobilized stem cell preparations, an ADC-based conditioning regimen that minimizes collateral tissue damage might prevent amplification of T cell alloreactivity leading to GvHD. However, donor T cells unable to elicit GvHD may also be unable to mount a GvL response, which could offset the benefit of reduced GvHD with a greater risk of leukemia relapse. Murine leukemia models utilizing allo-HSCT with ADC-based conditioning would provide a relevant preclinical platform on which to integrate in vivo studies of engraftment, GvHD and GvL effects and understand the underlying biology.

In conclusion, the studies presented herein exemplify the promise of immunotherapy to provide safe, effective conditioning for HSCT. Importantly, our studies provide insights to the unique immunobiology of ADC-conditioned allo-HSCT and an experimental foundation on which further basic and translational investigations can be conducted.

Methods

Mice

Mice were handled in accordance with an animal protocol approved by the Institutional Animal Care and Use Committee (IACUC) at Washington University School of Medicine. The following strains were used in the studies: C57BL6/J, BALB/cJ, DBA/2J, CB6F1/J (C57BL6/J× BALB/cJ F1), C57BL/6-Tg(UBC-GFP)30Scha/J (B6-GFP), CByJ.SJL(B6)-Ptprca/J (BALB-Ly5.1). All mice were bred within specific-pathogen free colonies at Washington University School of Medicine or purchased from Jackson Laboratories (Bar Harbor, ME) and maintained on ad libitum water and standard chow (LabDiet 5053; Lab Supply, Fort Worth, TX). Age and gender-matched mice were used for all experiments, with all animals aged 6-12 weeks old; no selection was applied to assign mice to experimental treatment groups. For all experiments involving lethal irradiation, mice received trimethoprim-sulfamethoxazole (SulfaTrim, 5 mL per 250 mL drinking water) for two weeks beginning two days prior to irradiation. For retroorbital injections, mice were anesthetized with 3% isoflurane in O2 delivered by vaporizer at a flow rate of 1 L/min. For survival surgery procedures (skin grafting and osmotic pump implantation), mice were anesthetized via intraperitoneal injection of 80-100 mg/kg ketamine plus 5-10 mg/kg xylazine. Prior to first incision, the surgical site was shaved, disinfected, and draped in sterile fashion. Skin closure was done using 9 mm autoclips and buprenorphine (0.1 mg/kg) was provided for post-operative analgesia.

Mouse Tissue Preparation

Spleens, lymph nodes, or thymi harvested from euthanized mice were processed into single-cell suspensions by gentle homogenization with a syringe plunger through a 70 μm filter in PBS containing 0.5% BSA and 2 mM EDTA (Running buffer). Bone marrow was harvested from femurs and tibias by centrifugation as previously described. Mouse peripheral blood samples were drawn from the facial vein using Goldenrod 5 mm animal lancets (Medipoint; Mineola, NY) and collected into K3EDTA-coated tubes (BD). Erythrocytes were removed from all mouse tissue specimens using ammonium chloride-potassium bicarbonate (ACK) lysis.

Cell Culture and In Vitro Assays

Primary murine T cells were grown in R10 media—RPMI plus 10% fetal bovine serum (FBS; R&D Systems, Minneapolis, MN) supplemented with GlutaMAX (Gibco) and penicillin/streptomycin (Gibco)—at 37° C./5% $CO_2$. For mouse NK cell cultures, R10 media was supplemented with 10 mM HEPES, 0.1 mM non-essential amino acids, 1 mM sodium pyruvate and 55 μM 2-mercaptoethanol (K10 medium). YAC-1 cells for NK cell cytotoxicity assays were obtained from ATCC, tested negative for *Mycoplasma*, and maintained in R10 media. Human peripheral blood mononuclear cells (PBMCs) were harvested from leukoreduction chambers by Ficoll density gradient centrifugation and cryopreserved.

For ex vivo stimulation of primary mouse T cells, $1\times10^5$ T cells purified from spleen and lymph nodes with the EasySep Mouse T cell Isolation Kit (Stem Cell Technologies; Vancouver, BC, Canada) were cultured with $4\times10^5$ T-depleted splenocytes in 96-well round bottom plates in R10 media with 1 μg/mL αCD3. Supernatants were collected for cytokine analysis after 24 hours incubation, and cultured cells were analyzed for expansion by flow cytometry at 72 hours.

For primary NK cell assays, splenic NK cells were enriched to >80% purity using the EasySep Mouse NK Cell Isolation Kit (Stem Cell Technologies), and $1.0\text{-}2.5\times10^4$ NK cells were cultured in K10 media along with either IL-15 alone (1-100 ng/mL; BioLegend), or a cocktail of IL-12 (10 ng/mL; BioLegend), IL-15 (10 ng/mL), and IL-18 (50 ng/mL; BioLegend). For cytotoxicity assays, purified NK cells were stimulated with 100 ng/mL IL-15 for 48 hours, washed twice to remove cytokines, then incubated for 4 hours at multiple effector-to-target ratios with a fixed number of YAC-1 target cells (2000 YAC-1 cells per well of a 96 well, round-bottom plate) with or without baricitinib. YAC-1 cell death was assessed with Zombie viability dye staining and analyzed by flow cytometry.

For colony forming unit (CFU) assays, murine whole bone marrow was resuspended at 10× final concentration in IMDM+2% FBS with single doses or concentration series of ADC or control conjugate. Then, 300 μL of each suspension was diluted into 3 mL complete methylcellulose medium (R&D), vigorously vortexed, and 1.1 mL of the resulting methylcelluose suspension was plated in duplicate and incubated 12 days at 37° C.

Complete Blood Counts (CBC)

CBC analysis was performed using a Hemavet 950 analyzer (Drew Scientific). Total white blood cell (WBC) count plus differential, hematocrits (Hct), and platelet (PLT) counts were obtained. Reference ranges were as follows: WBC $1.8\text{-}10.7\times10^3$ cells per μL, Hct 35.1-45.4%, PLT $592\text{-}2972\times10^3$ cells/μL. Absolute counts of circulating leukocyte subsets were calculated by multiplying the WBC by the frequency of each specific cell type as measured by flow cytometry.

Flow Cytometry

Flow cytometry was performed with a Beckman Coulter Gallios instrument equipped with Kaluza acquisition software. Post hoc compensation and data analysis were done using FlowJo version 10.7 (Treestar; Ashland, OR). All flow cytometry reagents are listed in TABLE 1.

TABLE 1

| Flow cytometry antibodies and related reagents used in this study. | | | | |
| --- | --- | --- | --- | --- |
| Reagent name or target | Species reactivity | Clone | Fluorophore | Vendor(s) |
| CD3 | Mouse | 145-2C11 | FITC | BioLegend |
|  |  |  | APC | BioLegend |
|  |  |  | Purified - LEAF | BioLegend |
| CD4 | Mouse | GK1.5 | FITC | BioLegend |
|  |  |  | PE-Cyanine7 | BioLegend |
|  |  |  | APC | BioLegend |

TABLE 1-continued

Flow cytometry antibodies and related reagents used in this study.

| Reagent name or target | Species reactivity | Clone | Fluorophore | Vendor(s) |
|---|---|---|---|---|
| | | | APC-eFluor 780 | eBioscience |
| | | | eFluor 450 | eBioscience |
| | | | Biotin | BioLegend |
| | | | Purified - InVivoPlus | BioXcell |
| CD4 | Mouse | RM4-4 | FITC | BioLegend |
| CD4 | Mouse | RM4-5 | PerCP-Cyanine5.5 | BioLegend |
| CD4 | Human | RPA-T4 | FITC | BioLegend |
| CD5 | Mouse | 53-7.3 | PE | BioLegend |
| CD8 | Mouse | 53-6.7 | FITC | BioLegend |
| | | | APC | BioLegend |
| | | | APC-eFluor 780 | eBioscience |
| | | | eFluor 450 | eBioscience |
| | | | Brilliant Violet 510 | BioLegend |
| | | | BioLegend | BioLegend |
| | | | Purified - InVivoPlus | BioXcell |
| CD11b | Mouse | M1/70 | FITC | BioLegend |
| | | | PerCP-Cyanine5.5 | BD |
| | | | APC | BioLegend |
| CD11c | Mouse | N418 | PE | BD |
| CD16/32 | Mouse | 93 | Purified - Fc Block | BioLegend |
| | | | PE-Cyanine7 | BioLegend |
| CD25 | Mouse | 3C7 | PE | BD |
| CD28 | Mouse | 37.51 | Purified - LEAF | BioLegend |
| CD34 | Mouse | HM34 | FITC | BioLegend |
| CD44 | Mouse/human | IM7 | Brilliant Violet 421 | BioLegend |
| CD45 | Mouse | 30-F11 | PE | BD |
| CD45 | Human | HI30 | Purified | BioLegend |
| | | | Biotin | BioLegend |
| CD45 | Human | BC8 | Purified | Leinco |
| | | | Biotin | Leinco |
| CD45.1 | Mouse | A20 | PE | BioLegend |
| | | | PE-Cyanine7 | BioLegend |
| | | | eFluor 450 | eBioscience |
| CD45.2 | Mouse | 104 | Biotin | BioLegend |
| | | | Brilliant Violet 421 | BioLegend |
| | | | Brilliant Violet 605 | BioLegend |
| | | | Purified - InVivoPlus | BioXcell |
| CD45R (B220) | Mouse/human | RA3-6B2 | FITC | BioLegend |
| | | | PerCP-Cyanine5.5 | BD |
| | | | APC | BioLegend |
| | | | APC-eFluor 780 | eBioscience |
| | | | eFluor 450 | eBioscience |
| | | | Brilliant Violet 605 | BioLegend |
| CD48 | Mouse | HM48-1 | APC | BioLegend |
| CD49b | Mouse | DX5 | FITC | BD |
| CD62L | Mouse | MEL-14 | APC | BioLegend |
| | | | Brilliant Violet 650 | BioLegend |
| CD80 | Mouse | 16-10A1 | BV421 | BioLegend |
| CD86 | Mouse | GL-1 | APC-eFluor 780 | eBioscience |
| CD117 (c-Kit) | Mouse | 2B8 | Biotin | BioLegend |
| CD117 (c-Kit) | Mouse | ACK2 | PE | BioLegend |
| | | | APC-eFluor 780 | eBioscience |
| CD135 (Flt3) | Mouse | A2F10 | PE | BioLegend |
| CD150 | Mouse | TC15-12F12.2 | PE-Cyanine7 | BioLegend |
| CD161 (NK1.1) | Mouse | PK136 | PE | BioLegend |
| | | | APC | BioLegend |
| | | | Purified - InVivoPlus | BioXcell |
| CD274 (PD-L1) | Mouse | MIH1 | APC-eFluor 780 | eBioscience |
| CD336 (NKp46) | Mouse | 29A1.4 | PE | BioLegend |

TABLE 1-continued

Flow cytometry antibodies and related reagents used in this study.

| Reagent name or target | Species reactivity | Clone | Fluorophore | Vendor(s) |
|---|---|---|---|---|
| | | | PerCP-Cyanine5.5 | BioLegend |
| CFSE | N/A | N/A | CFSE | BioLegend |
| EOMES | Mouse | Dan11mag | Alexa Fluor 488 | eBioscience |
| FoxP3 | Mouse | FJK-16 | APC | eBioscience |
| Granzyme A | Mouse | 3G8.5 | PE | BioLegend |
| Granzyme B | Mouse/human | GB11 | Pacific Blue | BioLegend |
| IgG2a, κ Isotype, rat | N/A | 2A3 | Purified - InVivoPlus | BioXcell |
| IgG2a, κ Isotype, mouse | N/A | C1.18.4 | Purified - InVivoPlus | BioXcell |
| IgG2b, κ Isotype, rat | N/A | LTF-2 | Purified - InVivoPlus | BioXcell |
| H-2D$^d$ | Mouse | 34-2-12 | Biotin | BioLegend |
| | | | Brilliant Violet 421 | BD |
| H-2K$^b$/D$^b$ | Mouse | 28-8-6 | PE-Cyanine7 | BioLegend |
| H-2K$^b$ | Mouse | AF6-88.5 | FITC | BD |
| | | | PE | BioLegend |
| | | | PE-Cyanine7 | BioLegend |
| H-2K$^d$ | Mouse | SF1-1.1 | FITC | BioLegend |
| | | | APC | BioLegend |
| | | | Brilliant Violet 421 | BioLegend |
| I-A$^b$ | Mouse | AF6-120.1 | PE | BioLegend |
| IFNγ | Mouse | XMG1.2 | APC | BioLegend |
| Lineage cocktail (CD3, Gr1, B220, TER-119, CD11b) | Mouse | 17A2, RB6-8C6, RA3-6B2, TER-119, M1/70 | Pacific Blue | BioLegend |
| Ly-6A/E (Sca1) | Mouse | D7 | FITC | BioLegend |
| | | | PE | BD |
| | | | Brilliant Violet 605 | BioLegend |
| Ly-6G/Ly-6C (Gr1) | Mouse | RB6-8C5 | FITC | BD |
| | | | APC | BioLegend |
| | | | APC-eFluor 780 | eBioScience |
| Perforin | Mouse | S16009A | APC | BioLegend |
| Phospho-Stat1 | Mouse | 58D6 | Purified | Cell Signaling |
| Phospho-Stat3 | Mouse | 13A3-1 | Brilliant Violet 421 | BioLegend |
| Phospho-Stat5 | Mouse | 47 | PE | BD |
| Streptavidin | N/A | N/A | Alexa Fluor 488 | Invitrogen |
| | | | Brilliant Violet BV421 | BD |
| T-bet | Mouse/human | 4B10 | PE-Cyanine7 | BioLegend |
| TCRβ | Mouse | H57-597 | PE-Cyanine7 | BioLegend |
| TER-119 | Mouse | TER-119 | FITC | BioLegend |
| Viability stains | N/A | N/A | 7-AAD | BioLegend |
| | | | Zombie Aqua | BioLegend |
| | | | Zombie Violet | BioLegend |

For routine preparation of fresh, unfixed samples, single cell suspensions were stained with fluor-conjugated antibodies to surface antigens in 100 μL Running buffer at room temperature for 15-20 minutes. For staining with biotinylated antibodies, samples were first incubated with biotinylated antibody, washed, then stained with fluor-conjugated streptavidin plus any other fluor-conjugated antibodies as above. For viability staining of fresh samples, 7-aminoactinomycin D (7-AAD; BioLegend, San Diego, CA) was added at 1 μg/mL immediately before analysis. For intracellular cytokine and cytotoxic granule staining, cells were stained with Zombie fixable viability dye (BioLegend; 1:400 final dilution) in PBS for 15 minutes, then stained 15 minutes for surface markers and fixed for 20 minutes with 4% paraformaldehyde (PFA) in PBS (BioLegend). Cells were then permeabilized with 0.5% saponin in Running buffer and stained for intracellular markers. FoxP3 staining was done using the FoxP3/Transcription Factor Staining Buffer Set per the manufacturer's instructions (eBioscience).

Phosphoflow Analysis

For phospho-Stat1 analysis, whole blood from baricitinib- or vehicle-treated mice was stimulated for 15 minutes with 100 ng/mL murine IFNg at 37° C., then immediately fixed with 1 mL Lyse/Fix Buffer (BD) for 10 minutes at 37° C. For phospho-Stat3 analysis, cryopreserved human PBMC were thawed and rested overnight at 37° C. in R10, stimulated with 100 ng/mL human IL-6 for 15 minutes at 37° C. in the presence of baricitinib or vehicle (0.1% DMSO), then fixed in 4% PFA in PBS. For phospho-Stat5 analysis, purified B6 mouse splenic NK cells were incubated for 30 minutes with 100 ng/mL IL-15 in K10 medium in the presence of baricitinib or vehicle, then fixed in 4% PFA.

After stimulation and fixation, all samples were permeabilized in ice-cold Perm Buffer III (BD) and held at −20° C. overnight. Samples were then washed thrice with Running buffer and stained for phospho-Stat molecules. For phospho-Stat1, samples were incubated 1 hour at room temperature with primary rabbit anti-phospho Stat1 (Y701, Cell Signaling Technology #9167, clone 58D6), then washed and stained 1 hour with Alexa Fluor 647-conjugated anti-rabbit secondary antibody (Cell Signaling Technology #4414). For phospho-Stat3, samples were stained with anti-human CD4 and anti-phospho Stat3 (Y705, BD Biosciences) for 1 hour at room temperature. For phospho-Stat5, samples were stained with anti-NK1.1 (BioLegend) and anti-phospho Stat5 (Y694, BD Biosciences).

Cytokine Analysis

Cytokine concentrations in culture supernatant or mouse plasma were measured with the LegendPLEX Inflammation Panel (13-plex) or the Mouse Th1 Panel (5-plex) per the manufacturer protocols (BioLegend). Quantification was done using LegendPLEX software v8.0 for Windows. If a cytokine concentration was too low to be quantified, the sample was assigned the value of the lower limit of quantitation. For intracellular IFNγ analysis of splenic NK cells, cells were cultured in K10 media with or without cytokine stimulation for 15 hours, with 5 μg/mL Brefeldin A (BioLegend) added to each well for the last 2.5 hours. After this incubation period, cells were fixed, saponin-permeabilized, and stained as described above.

Preparation of Saporin Antibody-Drug Conjugates (ADC)

Saporin conjugated to streptavidin (sAV-SAP, Advanced Targeting Systems, San Diego, CA) was used to indirectly couple biotinylated antibodies to saporin to generate the ADCs used in this study. The average saporin-to-streptavidin ratio was 2.4, yielding an effective molecular weight of 127 kDa. A total molecular weight of 287 kDa (127 kDa for sAV-SAP+160 kDa for IgG) was used for conversions between molar and mass concentrations.

Saporin-linked ADCs targeting murine CD45.2 (CD45-SAP) and cKit (cKit-SAP) were generated by incubating biotinylated anti-mouse CD45.2 (clone 104, BioLegend) or biotinylated anti-mouse cKit (clone 2B8, BioLegend) with sAV-SAP in a 1:1 molar ratio for 15 minutes at room temperature. Afterwards, ADCs were diluted to their final concentration in endotoxin-free PBS (Sigma-Millipore) and injected intravenously via the retroorbital sinus (100-150 μL per injection). Prior to ADC generation, sodium azide and endotoxin were removed from the biotinylated antibodies with Zeba desalting spin columns and High-Capacity Endotoxin Removal spin columns (ThermoFisher) per the manufacturer's instructions, then filter-sterilized using an 0.22 μm PES syringe filter.

For control experiments in which free antibody and free sAV-SAP were administered together, non-interaction of these two components was ensured by using non-biotinylated antibodies and sAV-SAP whose biotin-binding sites were occupied by an irrelevant biotinylated 11-mer peptide (BLANK Streptavidin-SAP, Advanced Targeting Systems). For experiments in which free antibody or sAV-SAP were administered alone, the equivalent mass of each component alone in the ADC was administered to each mouse (i.e., the doses of CD45.2 antibody and sAV-SAP corresponding to a CD45-SAP dose of 75 μg would be 41.8 μg and 33.2 μg, respectively). To avoid interference by cKit-SAP, bone marrows analyzed by flow cytometry were stained for c-Kit using clone ACK2, which does not compete for binding with clone 2B8.

Hematopoietic Stem Cell Transplantation with ADC Conditioning

Mice were injected with CD45-SAP or cKit-SAP at doses indicated in each figure at 7 days pre-transplant (d-7). In general, 3 mg/kg (75 μg) CD45-SAP, and 0.4 mg/kg or 2 mg/kg (10 or 50 μg, respectively) cKit-SAP were used. On transplant day (d0), mice received 10×10$^6$ whole donor bone marrow cells via the retroorbital injection. Mice conditioned with saporin-ADCs did not receive antibiotic prophylaxis.

For serial transplantation experiments, mice received a single dose of lethal irradiation (1100 cGy for B6 mice, 950 cGy for DBA/2 mice) from a Mark I Model 30 irradiator (J. L. Shepherd and Associates, $^{137}$Cs source, 73.69 cGy/min as tested on 1/1/2020) and transplanted with 10×10$^6$ whole bone marrow cells from primary transplant recipients 8-16 hours post-irradiation.

In Vivo Lymphocyte Depletion

Antibodies for in vivo T and NK cell depletion and isotype controls were obtained from BioXcell (West Lebanon, NH) in azide-free, low-endotoxin formulations confirmed to be murine pathogen-negative for (InVivoPlus grade). CD4$^+$ and CD8$^+$ T cell depletion was done using clones GK1.5 and YTS169.4, respectively, and NK cell depletion done using clone PK136. Mouse IgG2ak (clone C1.18.4) and rat IgG2bk (clone LTF-2) were used as isotype controls. All antibodies were administered intraperitoneally at 250 μg per dose following the schema for each experiment. Depletion of target cell populations was routinely confirmed by flow cytometry of peripheral blood immediately prior to HSCT, to avoid interference with depleting antibodies, CD4$^+$ T cells were stained for flow cytometry with clone RM4-4, CD8$^+$ T cells with clone 53-6.7, and NK cells with a combination of CD3, CD49b (DX5) and NKp46.

Daily Infusion with JAK Inhibitors

The selective Janus kinase 1 and 2 (JAK1/2) inhibitors baricitinib (LY3009104, INCB028050) and ruxolitinib (INCB18424) were obtained from MedChemExpress (Monmouth Junction, NJ). For subcutaneous administration, baricitinib was dissolved in 100% DMSO at 20 mg/mL and stored at −20° C. Immediately prior to injection, these DMSO stocks were thawed, diluted 1:10 in PBS, and injected at 200 μl/mouse subcutaneously (400 μg daily dose). For HSCT experiments, mice were treated with baricitinib or vehicle (10% DMSO in PBS) for a total of 25 days, beginning at d-3 relative to transplant and ending at d+21.

Osmotic Pump Administration of JAK Inhibitors

ALZET subcutaneous osmotic pumps (Model 2004) were used to continuously deliver JAK1/2 inhibitors to mice for 28 days at a rate of 0.25 μL/hour (6 μL/day). A vehicle of 50% dimethyl sulfoxide (DMSO)/50% polyethylene glycol 400 (PEG-400) was used for all experiments. JAK1/2 inhibitors were prepared at 2× concentration (133.3 mg/mL) in 100% DMSO then diluted to 1× with an equal volume of PEG-400 (66.7 mg/mL, 400 μg total daily dose). Prepared compounds were then loaded into osmotic pumps per the manufacturer's instructions and surgically implanted in accordance with our IACUC-approved protocol.

Skin Grafting

Surgical engraftment of donor ear skin to recipient mice was performed as described. Briefly, donor BALB/cJ and DBA/2J mice were euthanized, and ear skin was harvested and held in ice-cold PBS in preparation for transplant. Skin graft recipients were DBA/2J mice that either successfully engrafted with BALB-Ly5.1 bone marrow (BALB-DBA mixed chimeras) or those that failed to engraft. Mice were prepped for survival surgery as described above and had a small patch of dorsal skin resected and replaced with donor ear skin. Recipients were then bandaged, single-housed, and monitored for 4 days to ensure the bandage and graft bed remained undisturbed. Bandages were then removed, and graft recipients monitored daily for signs of rejection (scabbing, wound contraction).

Graft-Versus-Host Alloreactivity Model

A parent-to-F1 adoptive transfer model was used to study T cell alloreactivity in vivo, as previously described. In this model, irradiated CB6F1 mice receiving allogeneic B6 splenocytes develop immune-mediated bone marrow aplasia, with lethality occurring approximately 3 weeks post-T cell infusion. Recipients were conditioned either with CD45-SAP 7 days before adoptive transfer, or with 500 cGy irradiation delivered 8-16 hours pre-adoptive transfer. After conditioning, recipients were infused with $25 \times 10^6$ splenocytes from B6 mice. As negative controls, irradiated CB6F1 mice were treated with CB6F1 (syngeneic) splenocytes, and non-conditioned CB6F1 mice were treated with B6 splenocytes. Clinical scoring of mice was done based on a 10-point scale (0-2 points each for posture, activity, fur ruffling, weight loss, and skin lesions), with higher scores indicating worse disease as previously described. No mice in these studies received antibiotic prophylaxis.

In Vivo Mixed Leukocyte Reactions (MLR)

Recipient mice were infused with $2-3 \times 10^6$ purified donor T cells that were labeled with 5 µM CFSE (BioLegend) as previously described. Recipients were euthanized at 72 h post-T cell infusion and splenocytes analyzed for CFSE dilution of the infused donor T cells.

Histopathology

Femurs (for bone marrow histology) were preserved in neutral buffered formalin (PBS plus 3.7% formaldehyde) and incubated at room temperature with gentle rocking for at least 48 hours. Fixed samples were submitted to the Washington University Department of Comparative Medicine Animal Diagnostic Lab for decalcification and preparation of formalin-fixed paraffin embedded sections and staining with hematoxylin and eosin. A trained veterinary pathologist who was blinded to the experimental treatments provided descriptive reports of any pathological findings.

Data Analysis and Statistics

Sample size determinations and analysis parameters were based on general guidelines for laboratory animal research. Data for all experiments were compiled and statistically analyzed using GraphPad Prism version 8.0 for Mac. IC50 values for cytotoxicity studies were calculated by curve-fitting the dose response data to a three- or four-variable inhibition model. The Shapiro-Wilk test for normality was used to assess conformity of each dataset to a normal distribution. For comparison of two normally distributed datasets, unpaired, two-tailed Student's t tests with Welch's correction (no assumption of equal variance between groups) were used; if either dataset was not normally distributed, the Mann-Whitney U test was used instead. Survival analysis was done with the Mantel-Cox log-rank test. For comparisons of CBC values with the lower reference limit, a one-sample t test was used. The criterion for statistical significance for all comparisons was p 0.05.

Abbreviations

7-AAD: 7-aminoactinomycin D
Allo-HSCT: allogeneic hematopoietic stem cell transplantation
ACK: Ammonium chloride-potassium bicarbonate
ADC: antibody-drug conjugate
AML: acute myeloid leukemia
APC: antigen presenting cell
BSA: bovine serum albumin
CBC: Complete blood count
CD: Cluster of differentiation
CFU: colony forming unit
FBS: fetal bovine serum
EDTA: ethylenediaminetetraacetic acid
FACS: fluorescence-activated cell sorting
GFP: green fluorescent protein
vGHD: graft-versus-host disease
GvL: graft-versus-leukemia
Hct: hematocrit
HEPES: A-2-hydroxyethylpiperazine-N'-2-ethanesulfonic acid
HSC/HSCT: hematopoietic stem cell/hematopoietic stem cell transplantation
IFN: Interferon
Ig: immunoglobulin
IL: Interleukin
IMDM: Iscove's Modified Dulbecco's Media
JAK: Janus kinase
LK: Lineage$^-$Sca1$^-$cKit$^+$
LS K: Lineage$^-$Sca1$^+$cKit$^+$
miHA: minor histocompatibility antigen
MHC: major histocompatibility complex
MLR: mixed leukocyte reaction
PLTS: platelets
PBS: phosphate buffered saline
Running buffer: PBS+0.5% BSA+2 mM EDTA
NK: natural killer cell
RAG: recombinase activating gene
RPMI-1640: Roswell Park Memorial Institute-1640 media
sAV: streptavidin
SAP: saporin-conjugated
Stat: signal transducer and transactivator
TBI: Total body irradiation
TCD: T cell depletion/depleted
TNF: Tumor necrosis factor
WBC: white blood cells Example 2: Pyrrolobenzodiazepine (PBD) Conjugated to CD45 Antibodies Achieve Syngeneic HSCT This example describes the use of a different toxic payload, pyrrolobenzodiazepine (PBD), conjugated to CD45 antibodies to achieve syngeneic HSCT. This example is analogues to data in FIG. 1A-FIG. 1D except using a different drug (i.e., PBD) than saporin.

Figure 17A:
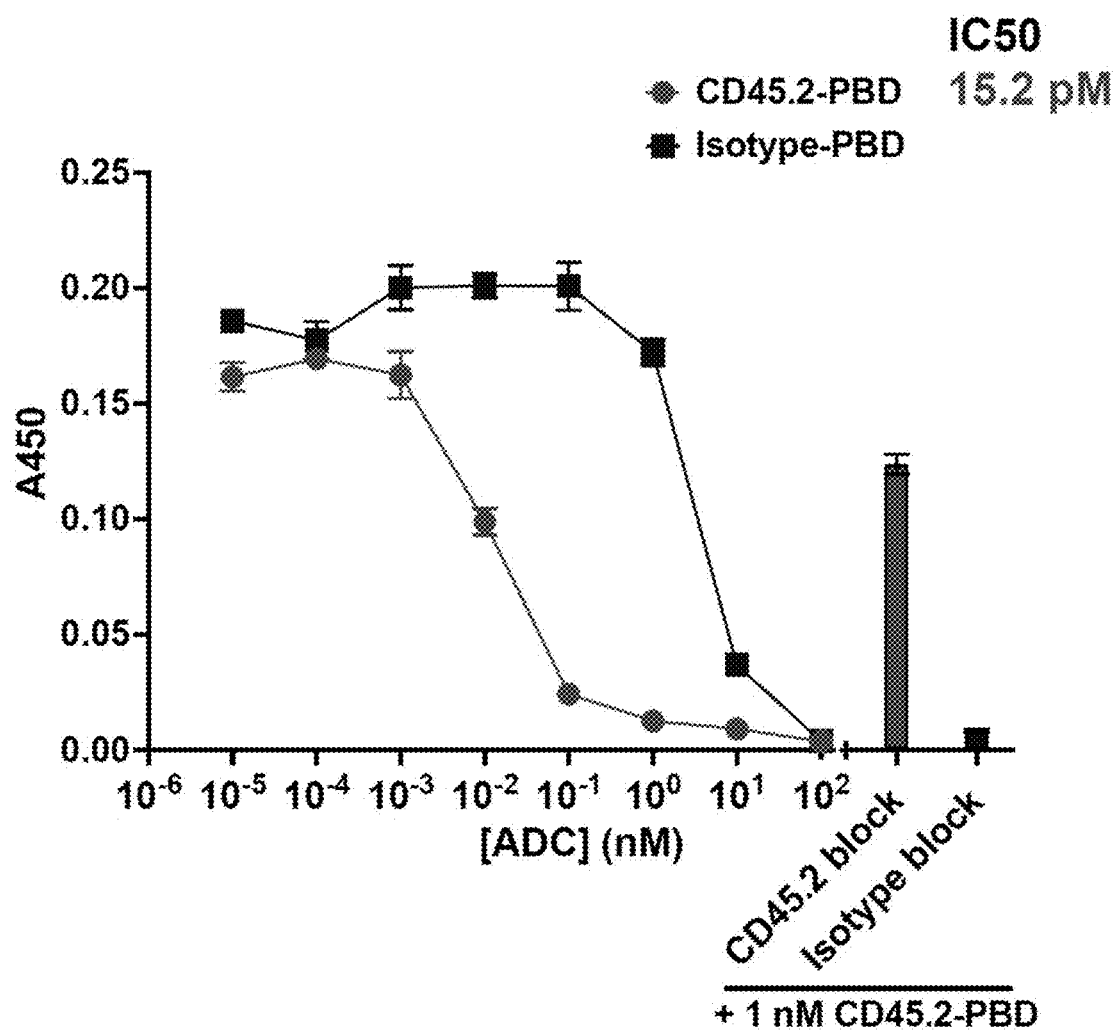
FIG. 17A-FIG. 17D. CD45.2-PBD specifically depletes murine cell lines, primary hematopoietic stem cells, and permits stable syngeneic HSCT. (A) $2.5 \times 10^3$ YAC-1 lymphoma cells were seeded in wells of a 96-well, flat-bottom plate with a concentration series of anti-CD45.2 or isotype control antibody conjugated to pyrrolobenzodiazepine (PBD). Cells were cultured for 72 hours at 37° C. then assayed for viability with an XTT assay, read out spectrophotometrically by absorbance at 450 nm. In some wells, cells were pre-incubated with an excess of CD45.2 or isotype control antibody before addition of 1 nM CD45.2-PBD. (B) $2.0 \times 10^4$ whole bone marrow cells from BALB/c mice were plated in complete methylcellulose medium with a concentration series of CD45.2-PBD or Isotype control-PBD. Total colony forming units were counted after 12 days incubation at 37° C. As a specificity control, BALB/c-CD45.1 bone marrow cells (which lack the CD45.2 antigen) were incubated with 1 nM CD45.2-PBD or Isotype-PBD. (C) B6 mice were infused with 50 μg CD45.2-PBD, Isotype control-PBD, or with no ADC, then bone marrow hematopoietic stem cell and progenitor populations were flushed from the femur and analyzed by flow cytometry. Dot plots are gated on viable cells lacking mature lineage markers (7AAD$^-$Lin$^-$). Bar graph indicates the numbers of long-term hematopoietic stem cells, defined phenotypically by flow cytometry (Lin$^-$Sca1$^+$cKit+CD150$^+$CD48$^-$). (D) B6 recipient mice were conditioned for HSCT with 50 μg CD45.2-PBD, Isotype control-PBD, or no ADC. Seven days later, $10 \times 10^6$ GFP-labeled B6 bone marrow cells were infused into each recipient. Conversion to donor-type hematopoiesis (GFP$^+$), stability of donor chimerism, and complete blood counts were followed longitudinally in the peripheral blood. Dotted lines indicate the lower reference limits of the CBC assays.
Figure 17B:
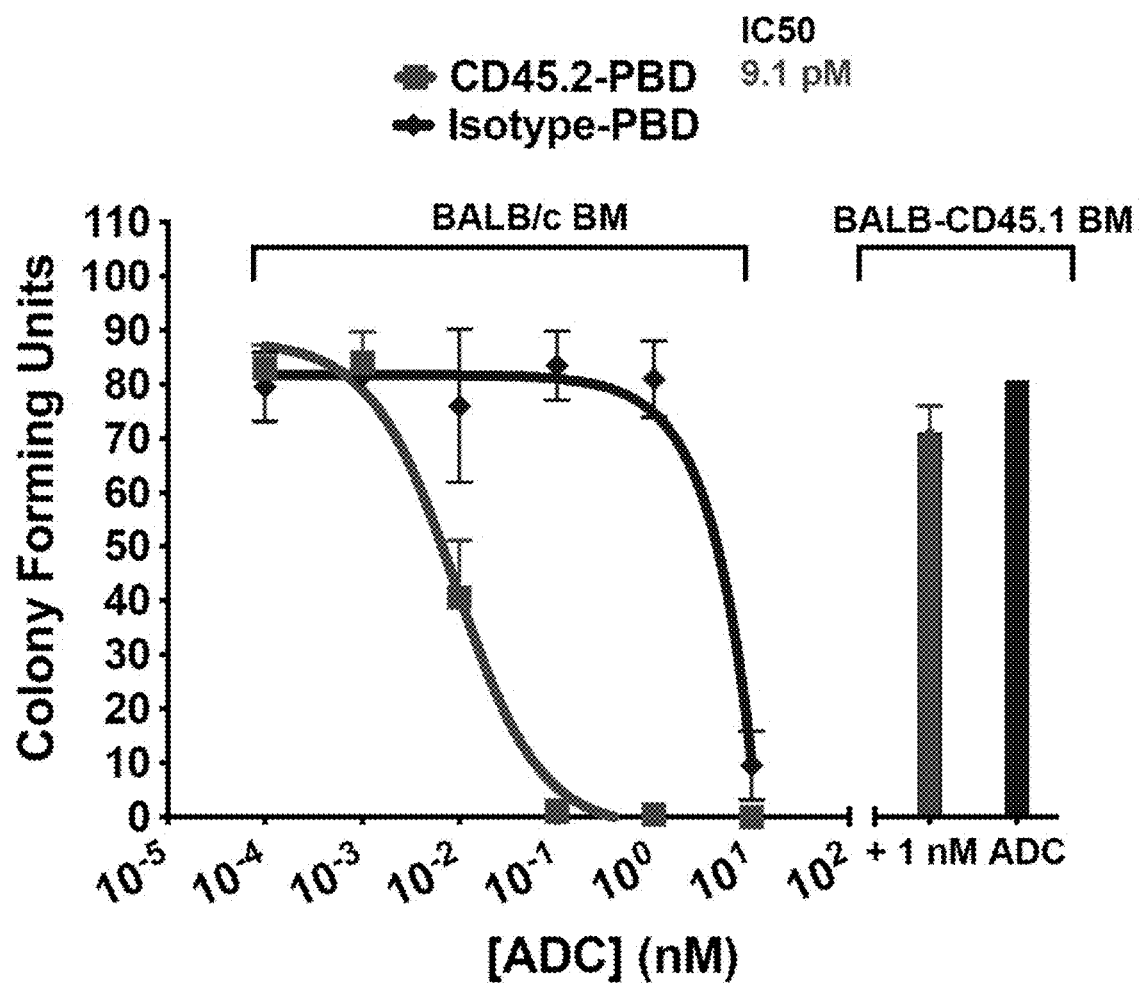
Figure 17C:
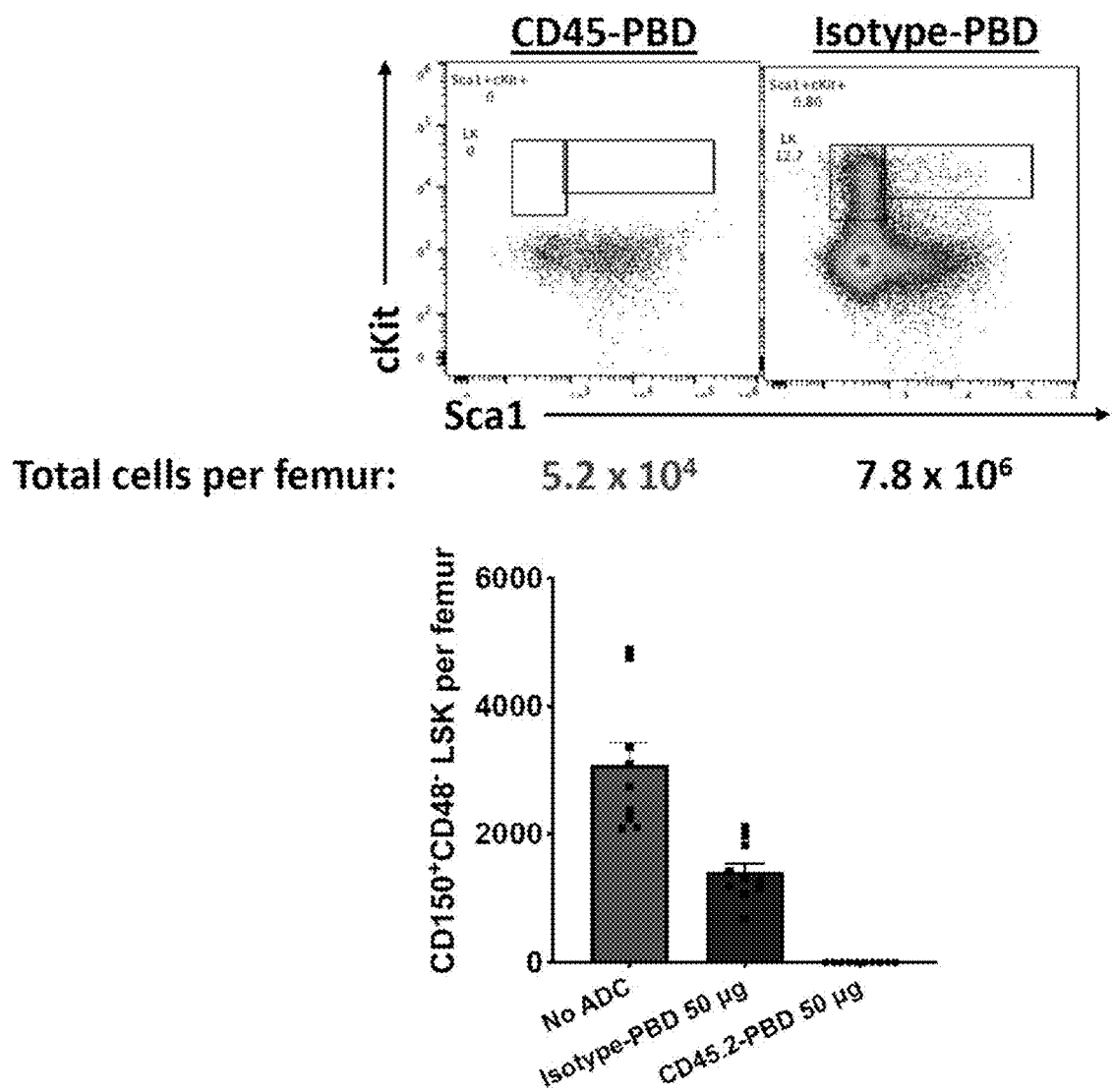
Figure 17D:
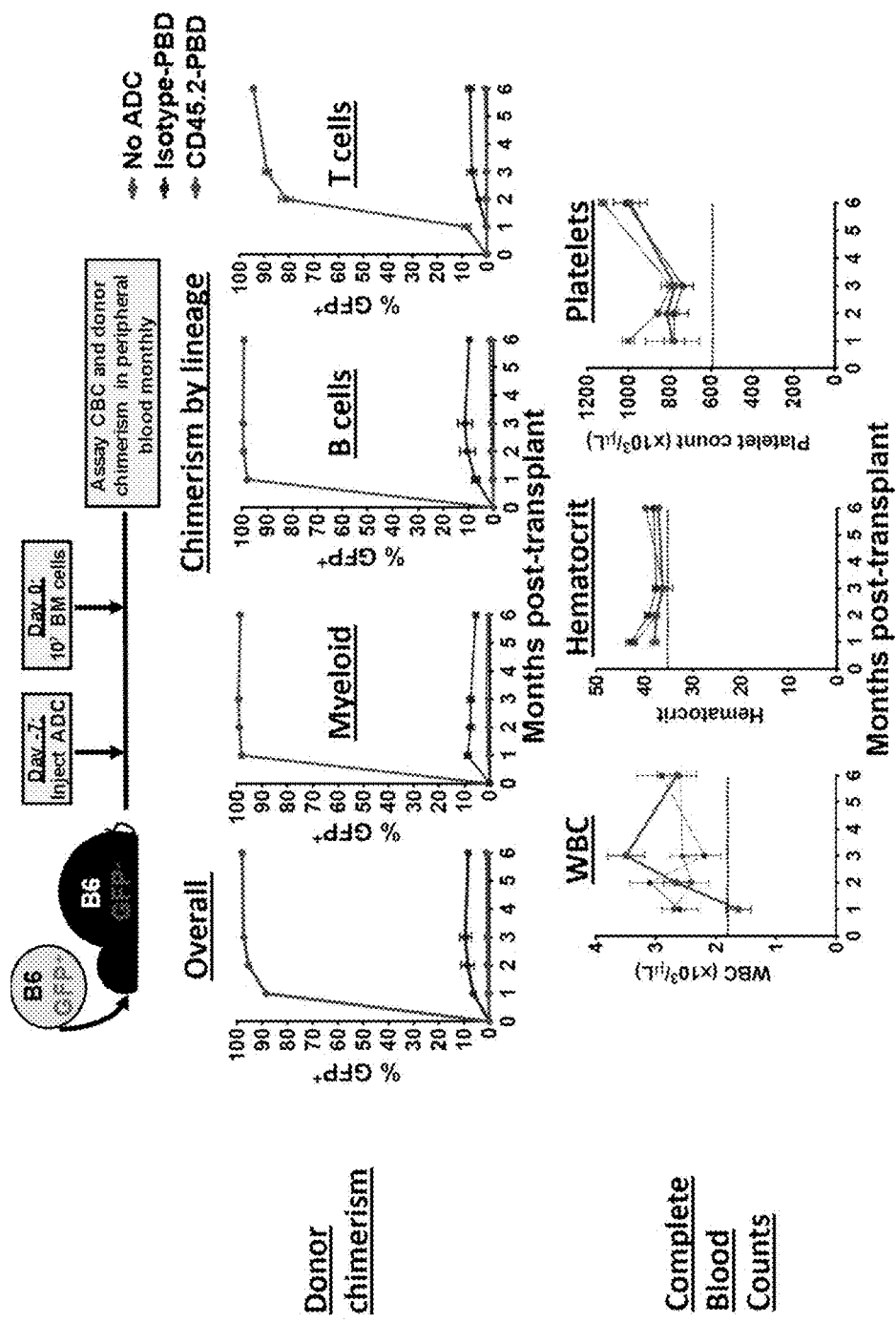

It was shown that PBD conjugated CD45.2 effectively kills YAC-1 target cells in a target-specific fashion (see e.g., FIG. 17A). CD45.2-PBD potently inhibits hematopoietic stem cell colony formation in vitro in a target-specific manner and is ineffective against CD45.1 marrow (see e.g., FIG. 17B). CD45.2-PBD effectively ablates bone marrow in vivo (see e.g., FIG. 17C). CD45.2-PBD permits syngeneic HSCT with stable donor chimerism and stable blood counts (see e.g., FIG. 17D).

What is claimed is:

1. A method of inhibiting alloreactivity in a subject prior to an allogeneic hematopoietic stem cell transplant (allo-HSCT), the method comprising:
administering, prior to the allo-HSCT, a hematopoietic stem cell (HSC)-depleting antibody-drug conjugate (ADC) in an amount effective to deplete hematopoietic stem cells (HSCs) in the subject and to create space for transplanted donor HSCs, wherein the HSC-depleting ADC targets CD45;

administering, prior to the allo-HSCT, an amount of a JAK1/JAK2 inhibitor in an amount effective to permit engraftment of allogeneic bone marrow; and administering the allo-HSCT to the subject, wherein the subject does not receive chemotherapy, irradiation, or pan T cell depletion (pan-TCD) prior to receiving the allo-HSCT.

2. The method of claim 1, wherein the JAK1/JAK2 inhibitor is continually infused for an amount of time before, during, and after administering the allo-HSCT effective to permit donor chimerism of at least about 80%.

3. The method of claim 2, wherein at least about 90% donor chimerism is achieved in the subject.

4. The method of claim 1, wherein the HSC-depleting ADC is administered in a single dose prior to administering the allo-HSCT.

5. The method of claim 1, wherein the JAK1/JAK2 inhibitor is baricitinib or ruxolitinib.

6. The method of claim 1, wherein the JAK1/JAK2 inhibitor is not injected as a bolus.

7. The method of claim 2, wherein the JAK1/JAK2 inhibitor is further administered continuously for between about three weeks and about four weeks after administering the allo-HSCT.

8. The method of claim 1, wherein administering of the HSC-depleting ADC and the JAK1/JAK2 inhibitor impairs T cell and NK cell survival, enables multilineage allo-engraftment, permits allogeneic donor engraftment, prevents graft versus host disease (GvHD), and enhances graft versus leukemia (GvL) effects.

9. The method of claim 1, wherein the subject has a cancer of the blood or bone marrow.

10. The method of claim 1, wherein the subject has a hematologic malignancy;
an autoimmune disease;
an immunodeficiency; or
a solid organ transplantation, a tolerance induction for solid organ transplantation (SOT), chronic infection, sickle cell disease, thalassemia, or hemophilia.

11. The method of claim 1, further comprising administering a cancer therapeutic to the subject, following the allo-HSCT.

12. A method of conditioning a subject prior to an allogeneic hematopoietic stem cell transplant (allo-HSCT) or preventing graft versus host disease (GvHD) or graft rejection in the subject, the method comprising:

administering, prior to the allo-HSCT, a hematopoietic stem cell (HSC)-depleting antibody-drug conjugate (ADC) in an amount effective to deplete hematopoietic stem cells (HSCs) in the subject and to create space for transplanted donor HSCs, wherein the HSC-depleting ADC targets CD45; and administering, prior to the allo-HSCT, a JAK1/JAK2 inhibitor in an amount effective to suppress the immune system of the subject; and administering the allo-HSCT to the subject, wherein the subject does not receive chemotherapy, irradiation, or pan T cell depletion (pan-TCD) prior to receiving the allo-HSCT.

13. The method of claim 12, wherein the JAK1/JAK2 inhibitor is continually infused for an amount of time before, during, and after administering the allo-HSCT effective to permit donor chimerism of at least about 80%.

14. The method of claim 13, wherein at least about 90% donor chimerism is achieved in the subject.

15. The method of claim 12, wherein the HSC-depleting ADC is administered in a single dose prior to administering the allo-HSCT.

16. The method of claim 12, wherein the JAK1/JAK2 inhibitor is not injected as a bolus.

17. The method of claim 13, wherein the JAK1/JAK2 inhibitor is administered continuously for between about three weeks and about four weeks after administering the allo-HSCT.

18. The method of claim 12, wherein administering the HSC-depleting ADC and the JAK1/JAK2 inhibitor impairs T cell and NK cell survival, enables multilineage allo-engraftment, permits allogeneic donor engraftment, prevents graft versus host disease (GvHD), and enhances graft versus leukemia (GvL) effects.

19. The method of claim 12, wherein the subject has a cancer of the blood or bone marrow.

20. The method of claim 12, wherein the subject has
a hematologic malignancy,
an autoimmune disease;
an immunodeficiency; or
a solid organ transplantation, a tolerance induction for solid organ transplantation (SOT), chronic infection, sickle cell disease, thalassemia, or hemophilia.

21. The method of claim 12, further comprising administering a cancer therapeutic to the subject, following the allo-HSCT.

* * * * *